United States Patent
Kim et al.

(10) Patent No.: US 9,104,275 B2
(45) Date of Patent: Aug. 11, 2015

(54) MOBILE TERMINAL TO DISPLAY AN OBJECT ON A PERCEIVED 3D SPACE

(75) Inventors: Jong Hwan Kim, Incheon-si (KR); Yeon Joo Kang, Seoul (KR); Seung Woo Nam, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 196 days.

(21) Appl. No.: 12/906,751

(22) Filed: Oct. 18, 2010

(65) Prior Publication Data

US 2011/0093778 A1    Apr. 21, 2011

(30) Foreign Application Priority Data

Oct. 20, 2009 (KR) .................... 10-2009-0099707
Nov. 16, 2009 (KR) .................... 10-2009-0110284
Nov. 17, 2009 (KR) .................... 10-2009-0110836

(51) Int. Cl.
| | |
|---|---|
| G06F 3/048 | (2013.01) |
| G06F 3/044 | (2006.01) |
| G06F 3/041 | (2006.01) |
| G06F 3/0488 | (2013.01) |
| G06F 3/0486 | (2013.01) |

(52) U.S. Cl.
CPC ............. *G06F 3/044* (2013.01); *G06F 3/041* (2013.01); *G06F 3/0486* (2013.01); *G06F 3/0488* (2013.01); *G06F 2203/04101* (2013.01)

(58) Field of Classification Search
CPC ... G06F 3/016; G06F 3/0488; G06F 3/04886; G06F 3/04883; G06F 3/0481
USPC ....................................................... 715/702
See application file for complete search history.

(56) References Cited

U.S. PATENT DOCUMENTS

| | | | | |
|---|---|---|---|---|
| 6,088,032 | A * | 7/2000 | Mackinlay | 715/848 |
| 6,151,028 | A * | 11/2000 | Kumagai et al. | 715/853 |
| 6,222,465 | B1 * | 4/2001 | Kumar et al. | 345/156 |
| 7,142,890 | B2 * | 11/2006 | Irimajiri et al. | 715/848 |
| 7,312,786 | B2 * | 12/2007 | Anderson et al. | 345/156 |
| 7,562,312 | B2 * | 7/2009 | Rochford et al. | 715/848 |

(Continued)

FOREIGN PATENT DOCUMENTS

| | | |
|---|---|---|
| KR | 2004/0082827 | 9/2004 |
| WO | WO 2007/121557 | 11/2007 |

OTHER PUBLICATIONS

"User Reference:CursorTask; From BCI2000 Wiki", http://www.bci2000.org/wiki/index.php/User_Reference:CursorTask, Jan. 28, 2009.*

(Continued)

*Primary Examiner* — Jennifer To
*Assistant Examiner* — Joseph R Burwell
(74) *Attorney, Agent, or Firm* — KED & Associates LLP

(57) ABSTRACT

A method may include displaying at least one first object on a perceived 3D space having at least a first layer and a second layer, wherein the first layer has a 3D level of a first depth and the second layer has a 3D level of a second depth, and wherein the at least one first object is arranged on the first layer. The method may also include receiving a user input for selecting one of the at least one first object while displaying the at least one first object, arranging at least one second object on the second layer when the 3D level of the second layer changes to the first depth, and displaying the at least one second object, wherein each of the at least one second object corresponds to a sub-menu of a menu corresponding to the selected first object.

12 Claims, 55 Drawing Sheets

(56) References Cited

U.S. PATENT DOCUMENTS

| | | | |
|---|---|---|---|
| 8,046,714 B2* | 10/2011 | Yahiro et al. | 715/848 |
| 8,050,492 B2* | 11/2011 | Bae et al. | 382/154 |
| 8,230,367 B2* | 7/2012 | Bell et al. | 715/863 |
| 2003/0206199 A1* | 11/2003 | Pusa et al. | 345/794 |
| 2004/0100479 A1* | 5/2004 | Nakano et al. | 345/700 |
| 2004/0104935 A1* | 6/2004 | Williamson et al. | 345/757 |
| 2007/0165027 A1* | 7/2007 | Nakadaira et al. | 345/426 |
| 2008/0089587 A1* | 4/2008 | Kim et al. | 382/190 |
| 2008/0168404 A1* | 7/2008 | Ording | 715/863 |
| 2008/0300055 A1* | 12/2008 | Lutnick et al. | 463/39 |
| 2009/0217209 A1* | 8/2009 | Chen et al. | 715/856 |
| 2009/0235206 A1* | 9/2009 | Hsu | 715/836 |
| 2009/0259975 A1* | 10/2009 | Asai | 715/850 |
| 2009/0303231 A1* | 12/2009 | Robinet et al. | 345/419 |
| 2010/0053151 A1* | 3/2010 | Marti et al. | 345/419 |
| 2010/0064259 A1* | 3/2010 | Alexanderovitc et al. | 715/852 |
| 2010/0115455 A1* | 5/2010 | Kim | 715/852 |
| 2010/0208033 A1* | 8/2010 | Edge et al. | 715/850 |
| 2011/0083106 A1* | 4/2011 | Hamagishi | 715/836 |
| 2012/0009981 A1* | 1/2012 | Bengtsson | 715/836 |
| 2012/0013613 A1* | 1/2012 | Vesely | 345/419 |
| 2012/0026166 A1* | 2/2012 | Takeda et al. | 345/419 |
| 2012/0113140 A1* | 5/2012 | Hilliges et al. | 345/633 |
| 2012/0113223 A1* | 5/2012 | Hilliges et al. | 348/46 |
| 2012/0229377 A1* | 9/2012 | Kim et al. | 345/173 |
| 2012/0287044 A1* | 11/2012 | Bell et al. | 345/158 |

OTHER PUBLICATIONS

Hui, "3D cursors for volume rendering applications", Proceedings of the 1992 IEEE Nuclear Science Symposium and Medical Imaging Conference, v. 2, pp. 1243-1245, Oct. 25, 1992.*

Upson et al., "The Application Visualization System: A Computational Environment for Scientific Visualization", IEEE Computer Graphics and Applications, v. 9, n. 4, pp. 30-42, Jul. 1989.*

3D Forums Stereoscopic discussion forums article, Ian, Aug. 10, 2009.

* cited by examiner (a)

(b)

(a)

(b)

(a)

(b)

(c)

(a)

(b)

(a)

(b)

(a)

(b)

(a)  (b)

(c)  (d)

(a)     (b)

(c)

(a)

(b)

(a)        (b)

MOBILE TERMINAL TO DISPLAY AN OBJECT ON A PERCEIVED 3D SPACE

CROSS-REFERENCE TO RELATED APPLICATION(S)

Pursuant to 35 U.S.C. §119(a), this application claims the benefit of earlier filing date and right of priority to Korean Application Nos. 10-2009-0110284, filed on Nov. 16, 2009, 10-2009-0110836, filed on Nov. 17, 2009 and 10-2009-0099707, filed on Oct. 20, 2009, the contents of which are hereby incorporated by reference herein in their entirety.

BACKGROUND

1. Field

The present invention relates to a mobile terminal, and more particularly, to a mobile terminal and controlling method thereof.

2. Background

Generally, terminals can be classified into mobile/portable terminals and stationary terminals. The mobile terminals can be classified into handheld terminals and vehicle mount terminals again according to possibility of user's direct portability.

As functions of the terminal are diversified, the terminal is implemented as a multimedia player provided with composite functions such as photographing of photos or moving pictures, playback of music or moving picture files, game play, broadcast reception and the like for example.

To support and increase of the terminal functions, it may be able to consider the improvement of structural parts and/or software parts of the terminal.

Recently, as a 3D (3-dimensional) image can be implemented in a display unit of a terminal, the demands for more convenient manipulating methods via a 3D user interface are ongoing to rise.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION

Figure 1:
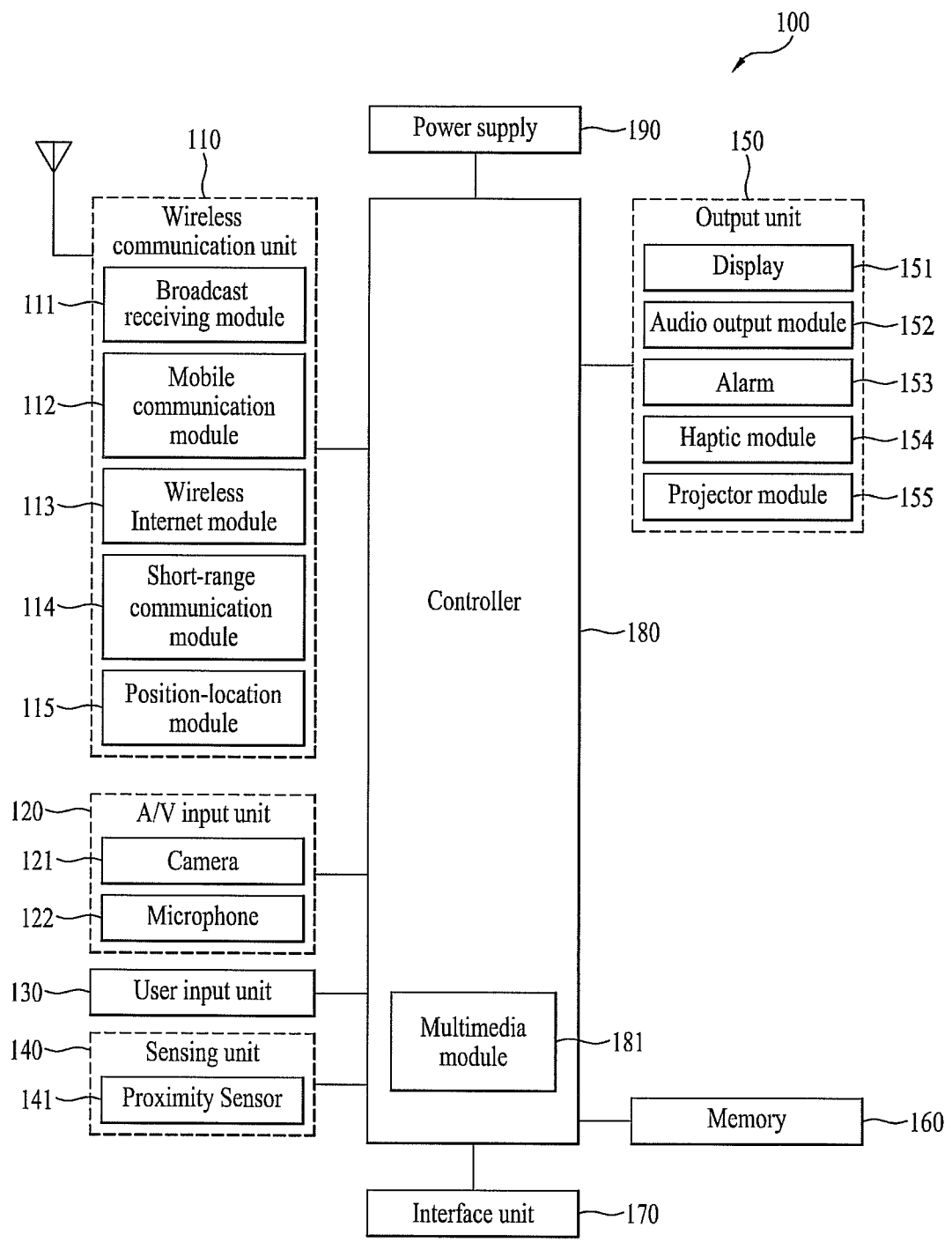
FIG. 1 is a block diagram of a mobile terminal according to one embodiment of the present invention.

Accordingly, the present invention is directed to a mobile terminal and controlling method thereof that substantially obviate one or more problems due to limitations and disadvantages of the related art.

An object of the present invention is to provide a mobile terminal and controlling method thereof, by which a more convenient stereoscopic user interface can be provided.

Another object of the present invention is to provide a mobile terminal and controlling method thereof, by which a stereoscopic user interface capable of providing a new visual effect using a 3D object arranged in a virtual 3D space can be provided.

A further object of the present invention is to provide a mobile terminal and controlling method thereof, by which a stereoscopic user interface can be provided via a plurality of layers provided in a 3D space.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of displaying a 3D icon in a mobile terminal according to the present invention includes the steps of displaying a first icon as the 3D icon having a first 3D depth and a second icon as a 2D or 3D icon having a second 3D depth, and displaying the first icon by being overlapped with the second icon. In this case, the first 3D depth has a 3D depth higher than that of the second 3D depth.

In another aspect of the present invention, a mobile terminal according to the present invention includes a display unit configured to display a first icon and a second icon, a 3D panel unit configured to display the first and second icons as 3D images, respectively, and a control unit displaying the first icon as a 3D icon having a first 3D depth and the second icon as a 2D or 3D icon having a second 3D depth lower than the first 3D depth, the control unit controlling the first icon to be displayed by being overlapped with the second icon.

In another aspect of the present invention, a mobile terminal includes a user input unit configured to receive an input of a command from a user, a controller, and a display unit including a liquid crystal display and a parallax generating means provided to a topside of the liquid crystal display, the parallax generating means for changing at least one of a propagating direction of a light generated from the liquid crystal display and a vibrating direction of the light under the control of the controller.

In this case, the controller arranges at least one 3D object having a prescribed 3D depth in a virtual stereoscopic space, generates a first stereoscopic display for changing at least one of a position and a 3D depth of each of the at least one 3D object according to the input of the command from the user via the user input unit, converts the first stereoscopic display to left and right eye images having a prescribed parallax in-between, and controls the display unit to deliver the left and right eye images to left and right eyes of the user, respectively.

In a further aspect of the present invention, a method of controlling a mobile terminal includes the steps of receiving an input of a command from a user via a user input unit, changing at least one of a propagating direction of a light generated from a liquid crystal display and a vibrating direction of the light, arranging at least one 3D object having a prescribed 3D depth in a virtual stereoscopic space, generating a first stereoscopic display for changing at least one of a position and a 3D depth of each of the at least one 3D object according to the input of the command from the user, converting the first stereoscopic display to left and right eye images having a prescribed parallax in-between, and delivering the left and right eye images to left and right eyes of the user, respectively.

Accordingly, the present invention provides the following effects and/or advantages.

First of all, a user is further facilitated to manipulate the mobile terminal via a stereoscopic user interface.

Secondly, the present invention provides a stereoscopic user interface using a 3D object arranged in a 3D space, thereby facilitating a user to manipulate the mobile terminal with a new visual effect.

Thirdly, the present invention facilitates a user to manipulate the mobile terminal via a stereoscopic user interface.

Finally, the present invention provides a stereoscopic user interface via a plurality of layers arranged in a 3D space, thereby facilitating a user to manipulate the mobile terminal.

It is to be understood that both the foregoing general description and the following detailed description of the present invention are exemplary and explanatory and are intended to provide further explanation of the invention as claimed.

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100.

As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmissive type, which can be named a transparent display. As a representative example for the transparent display, there is TOLED (transparent OLED) or the like. A rear configuration of the display 151 can be implemented in the optical transmissive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmissive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160. Moreover, data for various patterns of vibration and/or sound outputted in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2:
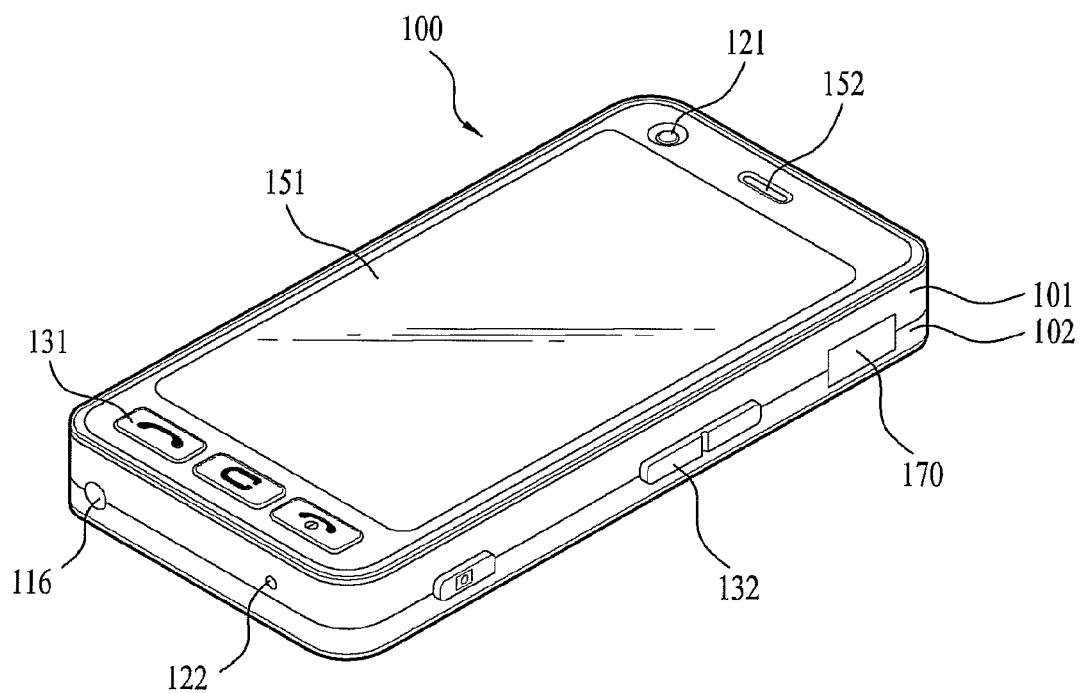
FIG. 2 is a front perspective diagram of a mobile terminal according to one embodiment of the present invention.

FIG. 2 is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Interconnected operational mechanism between the display 151 and the touchpad 135 are explained with reference to FIG. 3 as follows.

Figure 3:
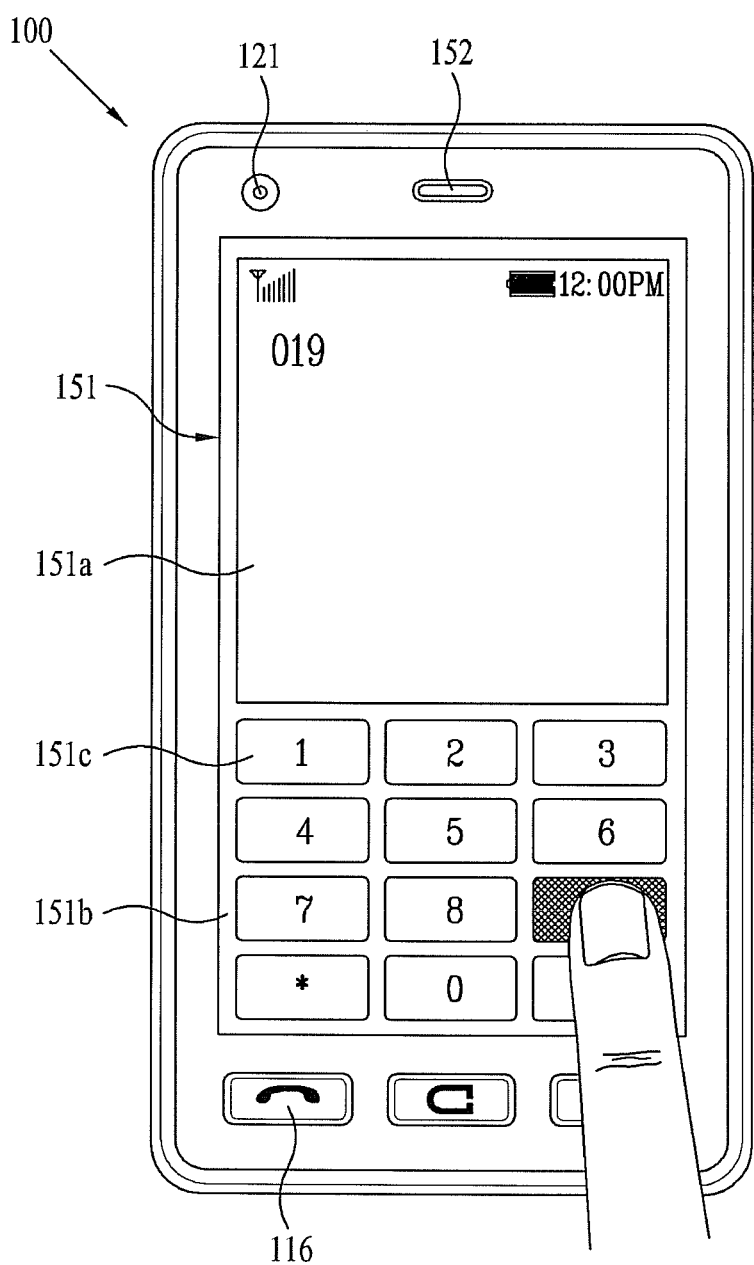
FIG. 3 is a front diagram of a mobile terminal according to one embodiment of the present invention for explaining one operational status of the mobile terminal, respectively.

FIG. 3 is a front-view diagram of a terminal according to one embodiment of the present invention for explaining an operational state thereof.

First of all, various kinds of visual information can be displayed on the display 151. And, theses information can be displayed in characters, numerals, symbols, graphics, icons and the like.

In order to input the information, at least one of the characters, numerals, symbols, graphics and icons are represented as a single predetermined array to be implemented in a keypad formation. And, this keypad formation can be so-called 'soft keys'.

FIG. 3 shows that a touch applied to a soft key is inputted through a front face of a terminal body.

The display 151 is operable through an entire area or by being divided into a plurality of regions. In the latter case, a plurality of the regions can be configured interoperable.

For instance, an output window 151a and an input window 151b are displayed on the display 151. A soft key 151c' representing a digit for inputting a phone number or the like is outputted to the input window 151b. If the soft key 151c' is touched, a digit corresponding to the touched soft key is outputted to the output window 151a. If the first manipulating unit 131 is manipulated, a call connection for the phone number displayed on the output window 151a is attempted.

Besides, the display 151 or the touchpad 135 can be configured to receive a touch input by scroll. A user scrolls the display 151 or the touchpad 135 to shift a cursor or pointer located at an entity (e.g., icon or the like) displayed on the display 151. Furthermore, in case that a finger is shifted on the display 151 or the touchpad 135, a path of the shifted finger can be visually displayed on the display 151. This may be useful in editing an image displayed on the display 151.

To cope with a case that both of the display (touch screen) 151 and the touchpad 135 are touched together within a predetermined time range, one function of the terminal can be executed. The above case of the simultaneous touch may correspond to a case that the terminal body is held by a user using a thumb and a first finger (clamping). The above function can include activation or deactivation for the display 151 or the touchpad 135.

The proximity sensor 141 described with reference to FIG. 1 is explained in detail with reference to FIG. 4 as follows.

Figure 4:
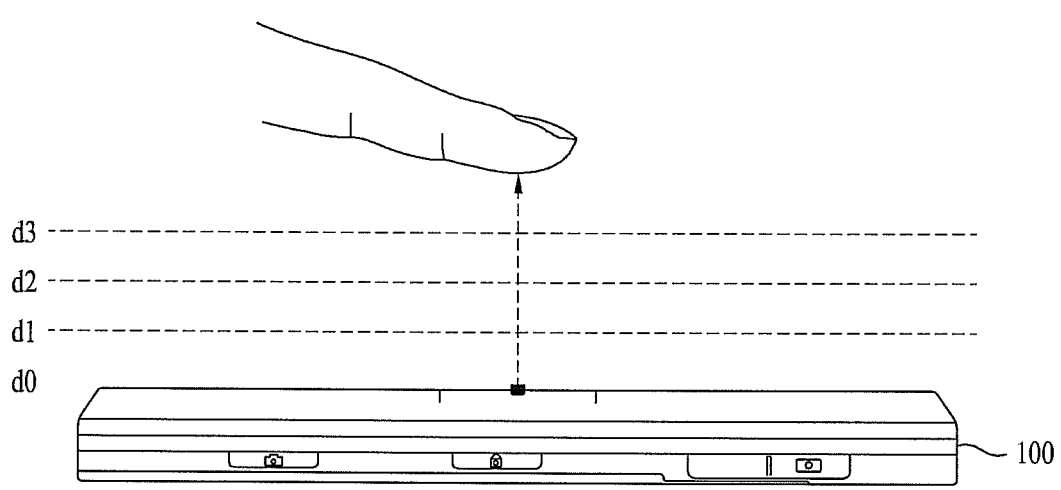
FIG. 4 is a diagram for explaining a proximity depth of a proximity sensor.

FIG. 4 is a conceptional diagram for explaining a proximity depth of a proximity sensor.

Referring to FIG. 4, when such a pointer as a user's finger, a pen and the like approaches the touchscreen, a proximity sensor 141 provided within or in the vicinity of the touchscreen detects the approach of the pointer and then outputs a proximity signal.

The proximity sensor 141 can be configured to output a different proximity signal according to a distance between the pointer and the proximity-touched touchscreen (hereinafter named 'proximity depth).

In FIG. 4, exemplarily shown is a cross-section of the touchscreen provided with a proximity sensor capable to three proximity depths for example. And, it is understood that a proximity sensor capable of proximity depths amounting to the number smaller than 3 or equal to or greater than 4 is possible.

In detail, in case that the pointer is fully contacted with the touchscreen (d0), it is recognized as a contact touch. In case that the pointer is located to be spaced apart from the touchscreen in a distance smaller than d1, it is recognized as a proximity touch to a first proximity depth. In case that the pointer is located to be spaced apart from the touchscreen in a distance between d1 and d2, it is recognized as a proximity touch to a second proximity depth. In case that the pointer is located to be spaced apart from the touchscreen in a distance smaller than d3 or equal to or greater than d2, it is recognized as a proximity touch to a third proximity depth. In case that the pointer is located to be spaced apart from the touchscreen in a distance equal to or greater than d3, it is recognized as a proximity touch is released.

Hence, the controller 180 is able to recognize the proximity touch as one of various input signals according to the proximity depth and position of the pointer. And, the controller 180 is able to perform various operation controls according to the various input signals.

Meanwhile, such a graphic for pointing at a specific object on a display unit or selecting a menu from the display unit as an arrow, a finger and the like is called a pointer or a cursor. Yet, the pointer is frequently used to mean a finger, a stylus pen or the like for a touch manipulation and the like. In order to clearly discriminate the pointer and the cursor from each other in this disclosure, a graphic displayed on a display unit is named a cursor and such a physical means for performing a touch, a proximity touch, a gesture and the like as a finger, a stylus pen and the like is named a pointer.

In the following description, a 3D image displaying method in a mobile terminal applicable to embodiments of the present invention and a display unit for the same are explained.

First of all, stereoscopic images implemented on the display unit 151 of the mobile terminal 100 can be mainly classified into two kinds of categories. In this case, the reference of this classification relates to whether different images are provided to both eyes, respectively.

The first stereoscopic image category is described as follows.

First of all, the first category is a monoscopic scheme of providing the same image to both eyes and is advantageous in that it can be implemented with a general display unit 151. In particular, the controller 180 arranges a polyhedron generated from combining at least one of dots, lines, surfaces or combination thereof in a virtual 3D space and enables an image, which is generated from seeing the polyhedron in a specific view, to be displayed on the display unit 151. Therefore, such a stereoscopic image can substantially include a planar image (2D image).

Secondly, the second category is a stereoscopic scheme of providing different image to both eyes, respectively, which uses the principle that a user can sense a stereoscopic effect in looking at an object with human eyes. In particular, human eyes are configured to see different planar images in looking at the same object due to a distance between both eyes. These different images are forwarded to a human brain via retinas. The human brain is able to sense depth and reality of a stereoscopic image by combining the different images together. Therefore, the binocular disparity attributed to the distance between both of the eyes enables the user to sense the stereoscopic effect despite that there is an individual difference of the binocular disparity more or less. Therefore, the binocular disparity becomes the most important factor of the second category. The binocular disparity is explained in detail with reference to FIG. 5 as follows.

Figure 5:
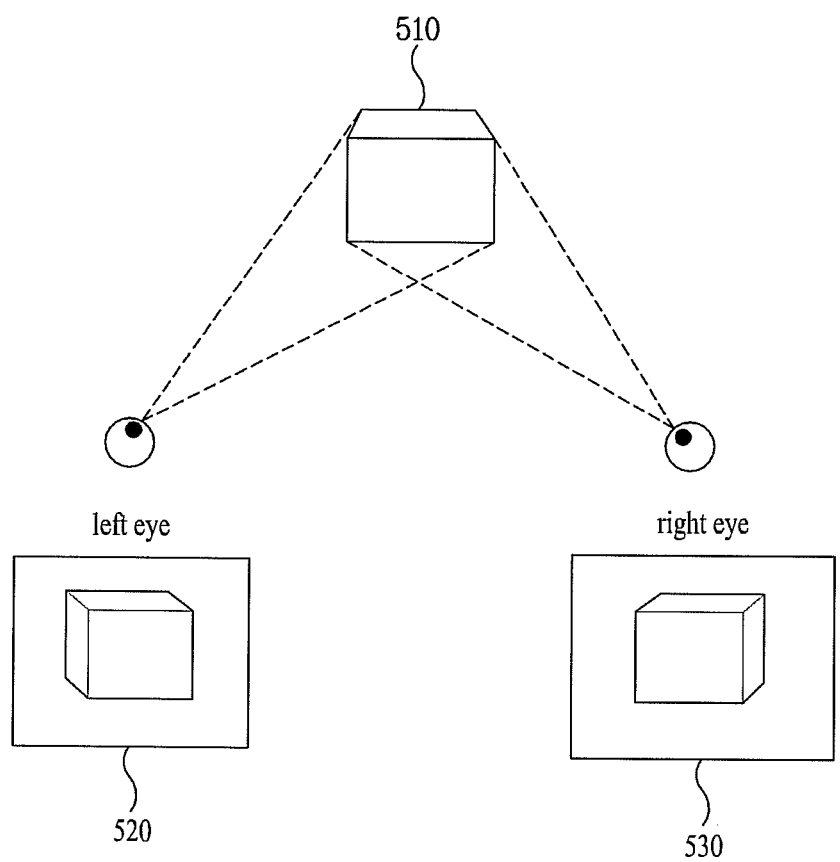
FIG. 5 is a diagram for explaining the principle of binocular disparity.

FIG. 5 is a diagram for explaining the principle of binocular disparity.

Referring to FIG. 5, assume a situation that a hexahedron 510 is positioned in front below an eye's height to be seen through human eyes. In this case, a left eye is able to see a left eye planar image 520 revealing three facets including a top side, a front side and a left lateral side of the hexahedron 510 only. And, a right eye is able to see a right eye planar image 530 revealing three facets including the top side, the front side and a right lateral side of the hexahedron 510 only.

Even if a real thing is not actually positioned in front of both eyes of a user, if the left eye planar image 520 and the right eye planar image 530 are set to arrive at the left eye and the right eye, respectively, a user is able to substantially sense the hexahedron 510 as if looking at the hexahedron 510 actually.

Thus, in order to implement the stereoscopic image belonging to the second category in the mobile terminal 100, images of the same object should arrive at both eyes in a manner of being discriminated from each other for the left and right eye images of the same object with a predetermined parallax.

For clarity and convenience of the following description, in order to discriminate the above mentioned two categories from each other, a 3D image in the first category shall be named a 2D stereoscopic image and a 3D image in the second category shall be named a 3D stereoscopic image.

A method of implementing a 3D stereoscopic image is described as follows.

As mentioned in the following description, in order to implement a 3D stereoscopic image, an image for a right eye and an image for a left eye need to arrive at both eyes in a manner of being discriminated from each other. For this, various methods are explained as follows.

1) Parallax Barrier Scheme

The parallax barrier scheme enables different images arrive at both eyes in a manner of controlling a propagating direction of light by electronically driving a cutoff device provided between a general display and both eyes. This is explained with reference to FIG. 6 as follows.

Figure 6:
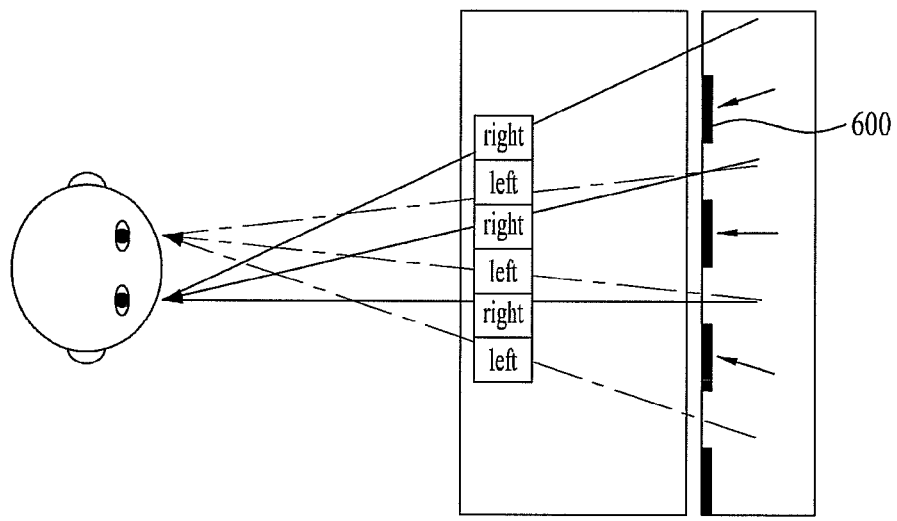
FIG. 6 is a diagram for a scheme of implementing a 3D stereoscopic image in a display unit of a parallax barrier type applicable to embodiments of the present invention.
Figure 6:
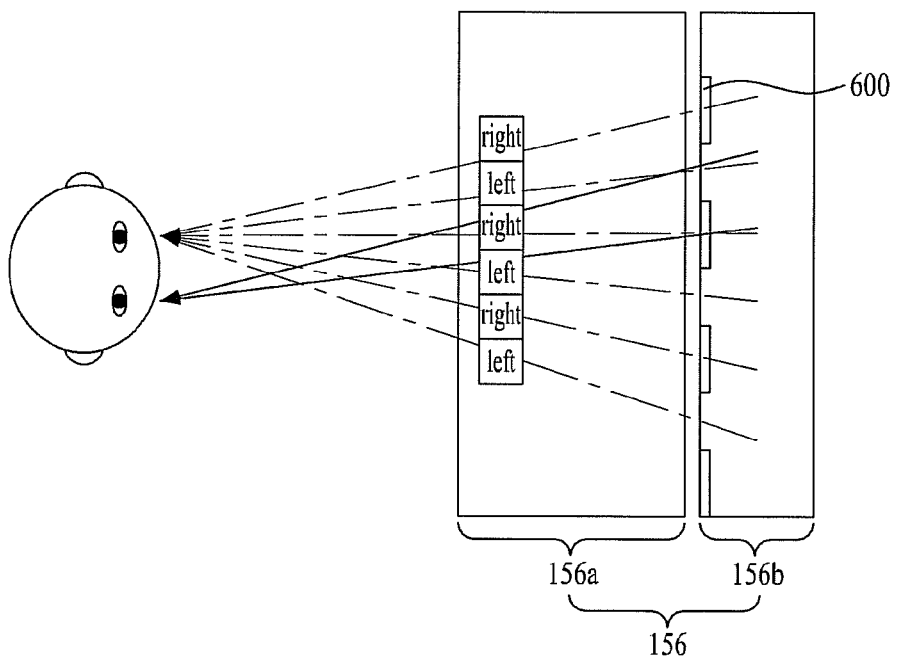

FIG. 6 is a diagram for a scheme of implementing a 3D stereoscopic image in a display unit of a parallax barrier type applicable to embodiments of the present invention.

Referring to FIG. 6, a structure of a parallax barrier type display unit 151 for displaying a 3D image can be configured in a manner that a general display device 151a is combined with a switch LC (liquid crystals) 151b. A propagating direction of light is controlled by activating an optical parallax barrier 600, as shown in FIG. 6 (a), using the switch LC 151b, whereby the light is separated into two different lights to arrive at left and right eyes, respectively. Thus, when an image generated from combining an image for the right eye and an image for the left eye together is displayed on the display device 151a, a user sees the images corresponding to the eyes, respectively, thereby feeling the 3D or stereoscopic effect.

Alternatively, referring to FIG. 6 (b), the parallax barrier 600 attributed to the switch is electrically controlled to enable entire light to be transmitted therethrough, whereby the light separation due to the parallax barrier is avoided. Therefore, the same image can be seen through left and right eyes. In this case, the same function of a conventional display unit is available.

In particular, FIG. 6 exemplarily shows that the parallax barrier performs parallel translation in one axial direction, by which the present invention is non-limited. Alternatively, the present invention is able to use a parallax barrier that enables parallel translation in at least two axial directions according to a control signal from the controller 180.

Figure 7:
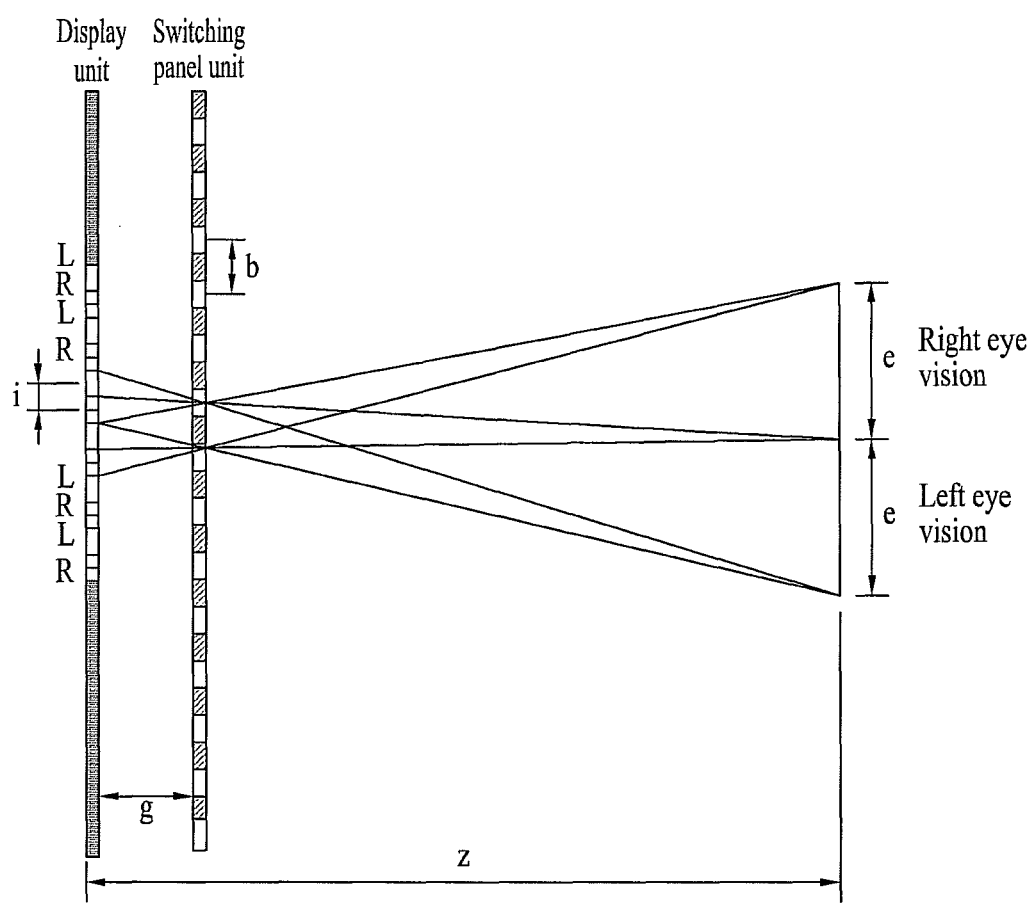
FIG. 7 is a diagram for explaining the principle of a 3D stereoscopic image displaying method using a binocular disparity applicable to embodiments of the present invention.

Meanwhile, the parallax barrier scheme can be implemented in the manner shown in FIG. 7.

FIG. 7 is a diagram for explaining the principle of a 3D stereoscopic image displaying method using a binocular disparity applicable to embodiments of the present invention.

Referring to FIG. 7, in order to display a 3D stereoscopic image, a switching panel unit is attached to a topside of the display unit 151. In this case, the switching panel unit performs a function similar to that of the parallax barrier 600 shown in FIG. 6. In FIG. 7, 'b' indicates a barrier gap of the switching panel unit, 'g' indicates a gap between the switching panel unit and the display unit, and 'z' indicates a distance from a position of a user view to the display unit. In case that two images are synthesized together by a pixel unit (L, R), as shown in FIG. 7, the switching panel unit can operate by receiving visions in a manner that visions of right and left eyes correspond to pixels included in right and left images, respectively.

In case of attempting to output a 3D stereoscopic image, the switching panel unit is turned on to separate incident visions. In case of attempting to output a 2D image, the switching panel unit is turned off to let the incident visions pass through without being separated. Therefore, if the switching panel unit is turned off, the binocular parallax is not separated.

2) Lenticular

The lenticular scheme relates to a method of using a lenticular screen provided between a display and both eyes. In particular, a propagating direction of light is refracted via lens on the lenticular screen, whereby different images arrive at both eyes, respectively.

3) Polarized Glasses

According to the polarized glasses scheme, polarizing directions are set orthogonal to each other to provide different images to both eyes, respectively. In case of circular polarization, polarization is performed to have different rotational direction, whereby different images can be provided to both eyes, respectively.

4) Active Shutter

This scheme is a sort of the glasses scheme. In particular, a right eye image and a left eye image are alternately displayed on a display unit with prescribed periodicity. And, user's glasses close its shutter in an opposite direction when an image of a corresponding direction is displayed. Therefore, the image of the corresponding direction can arrive at the eyeball in the corresponding direction. Namely, while the left eye image is being displayed, a shutter of the right eye is closed to enable the left eye image to arrive at the left eye only. On the contrary, while the right eye image is being displayed, a shutter of the left eye is closed to enable the right eye image to arrive at the right eye only.

For clarity and convenience, assume that the mobile terminal mentioned in the following description includes at least one of the components shown in FIG. 1. Specifically, the mobile terminal, to which the present invention is applicable, includes a display unit capable of providing a 3D stereoscopic image to a user by at least one of the above-mentioned 3D stereoscopic image implementing schemes.

First Embodiment

According to the present embodiment, a selected object image can be displayed as a 3D image via the switching panel.

In the following description, a method of displaying a 3D icon in a mobile communication terminal according to the present invention is explained with reference to flowcharts shown in FIGS. 8 to 10.

Figure 8:
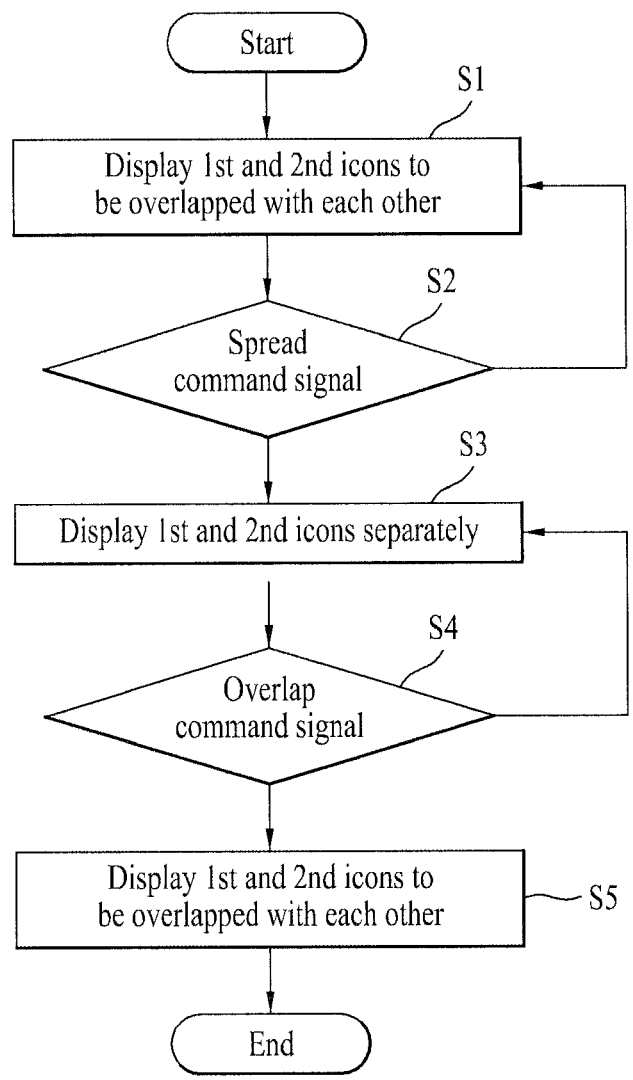
FIG. 8 is a flowchart for explaining a first aspect of a 3D icon displaying method in a mobile communication terminal according to one embodiment of the present invention.
Figure 9:
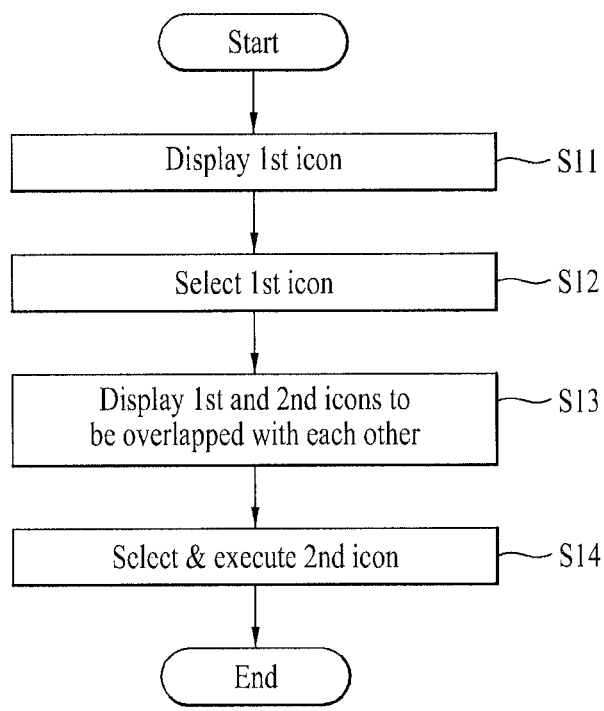
FIG. 9 is a flowchart for explaining a second aspect of a 3D icon displaying method in a mobile communication terminal according to one embodiment of the present invention.
Figure 10:
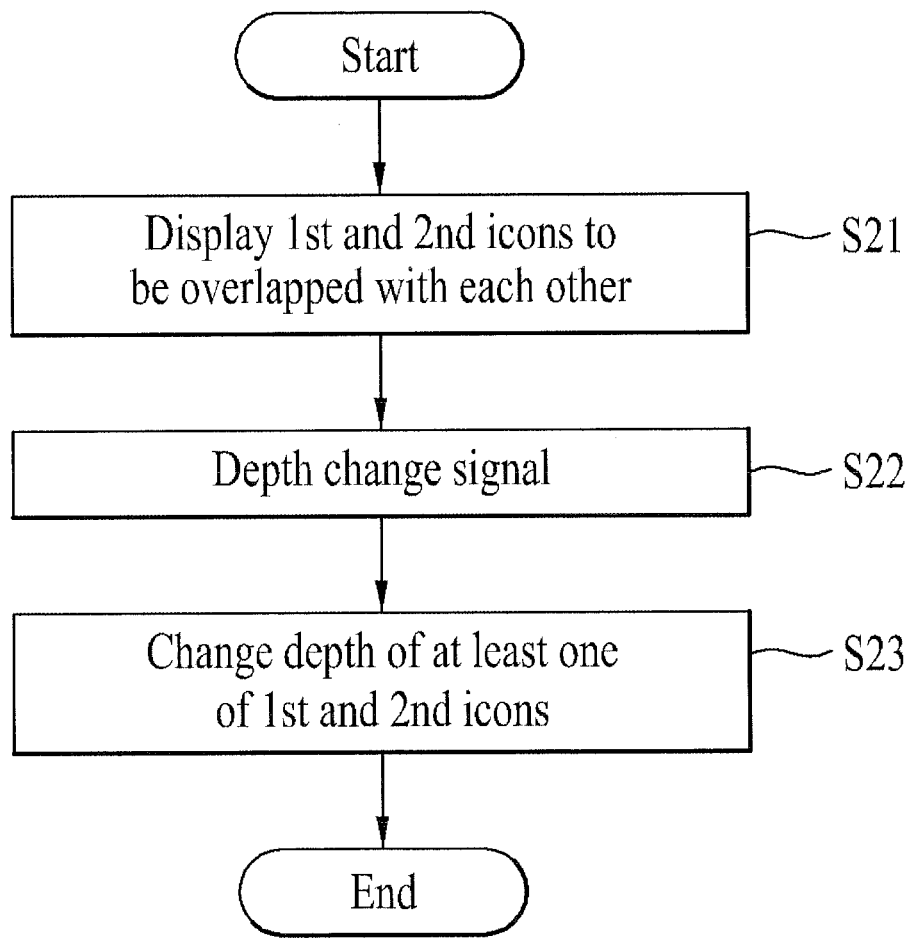
FIG. 10 is a flowchart for explaining a third aspect of a 3D icon displaying method in a mobile communication terminal according to one embodiment of the present invention.

FIG. 8 is a flowchart for explaining a first aspect of a 3D icon displaying method in a mobile communication terminal according to one embodiment of the present invention, FIG. 9 is a flowchart for explaining a second aspect of a 3D icon displaying method in a mobile communication terminal according to one embodiment of the present invention, and FIG. 10 is a flowchart for explaining a third aspect of a 3D icon displaying method in a mobile communication terminal according to one embodiment of the present invention.

[First Aspect]

FIG. 8 is a flowchart for explaining a first example of a 3D icon displaying method in a mobile communication terminal according to one embodiment of the present invention.

Referring to FIG. 8, 3D icons, and more particularly, a first icon and a second icon are displayed on the touchscreen, which is the display unit, in a manner of being overlapped with each other [S1]. In doing so, as the switching panel unit is turned on, both the first icon and the second icon are displayed as the 3D icons, respectively. In this case, the second icon can include a menu icon at the same level of the first icon in a menu tree. And, each of the first and second icons can include an indicator icon in an indicator region. In this case, the first icon has a first 3D depth and the second icon has a second 3D depth. Particularly, the first 3D depth corresponds to a 3D depth higher than the second 3D depth. If the second 3D depth of the second icon is set to 0, the second icon becomes a 2D icon. The first 3D depth and the second 3D depth are adjustable by a user input signal via the user input unit 130. While the first and second icons are displayed in a manner of being overlapped with each other, the first and second icons can be displayed in a manner that 3D depths of the first and second icons are changed according to an icon sequence change signal from a user. Moreover, the first icon has a first transparency and the second icon has a second transparency. In this case, each of the first and second transparencies is adjustable. Meanwhile, while the first and second icons are overlapped with each other, if a spread command signal from a user is generated, the overlapping between the first and second icons is released in a manner that the first and second icons are spread out [S2, S3]. Afterwards, if an overlap command signal is generated again [S4], the first and second icons are displayed in a manner of being overlapped with each other [S5].

According to the above described first embodiment, 3D icons are displayed in a manner of being overlapped with each other. The 3D icons are then spread out according to a user request. Therefore, it is able to use a small-size touchscreen more efficiently.

[Second Aspect]

FIG. 9 is a flowchart for explaining a second aspect of a 3D icon displaying method in a mobile communication terminal according to one embodiment of the present invention.

Referring to FIG. 9, a first icon is displayed on the touchscreen [S11]. While the first icon is displayed on the touchscreen, if a user selects the first icon, the controller 180 displays a second icon in a manner that the second icon is overlapped [S12, S13]. In doing so, the second icon is overlapped with the first icon or a plurality of second icons are displayed in a manner of being overlapped with each other. In this case, the second icon can include a submenu icon of the first icon. If the user generates a spread command signal for the second icon displayed by being overlapped, the overlapping is released so that the first and second icons are displayed by being separated from each other. Meanwhile, a user is able to select and execute the second icon [S14].

According to the second aspect of the present embodiment, while the first icon is being displayed, since the second icon can be displayed, a user is facilitated to access a menu at the same level of the second icon.

[Third Aspect]

FIG. 10 is a flowchart for explaining a third aspect of a 3D icon displaying method in a mobile communication terminal according to one embodiment of the present invention.

Referring to FIG. 10, a first icon and a second icon are displayed on the display unit including the touchscreen in a manner of being overlapped with each other [S21]. As mentioned in the foregoing description, the first icon includes a 3D icon having a first 3D depth and the second icon includes a 3D icon having a second 3D length. While the first and second icons are displayed by being overlapped with each other, if a 3D depth change signal is generated for at least one of the first and second icons by a user [S22], the controller 180 controls the touchscreen to display the corresponding icon by changing the 3D depth [S23].

According to the third application example, since the 3D depths of the overlapped 3D icons are adjustable according to a user selection, a user is able to set the 3D depth most suitable for the user with best visibility.

In the following description, application examples of a mobile terminal, to which the aforesaid 3D icon displaying method in the mobile terminal is applied, are explained in detail with reference to FIGS. 11 to 18.

FIRST APPLICATION EXAMPLE

FIG. 11 is an image diagram for a first application example of a mobile communication terminal to which a 3D icon displaying method in a mobile communication terminal according to one embodiment of the present invention is applied.

First of all, assume that icons shown in FIG. 11 include indicator icons. FIG. 11A shows icons overlapped in FIGS. 11B to 11D. A reference number '201' indicates a first indicator icon, a reference number '202' indicates a second indicator icon, and a reference number '203' indicates a third indicator icon.

Figure 11A:
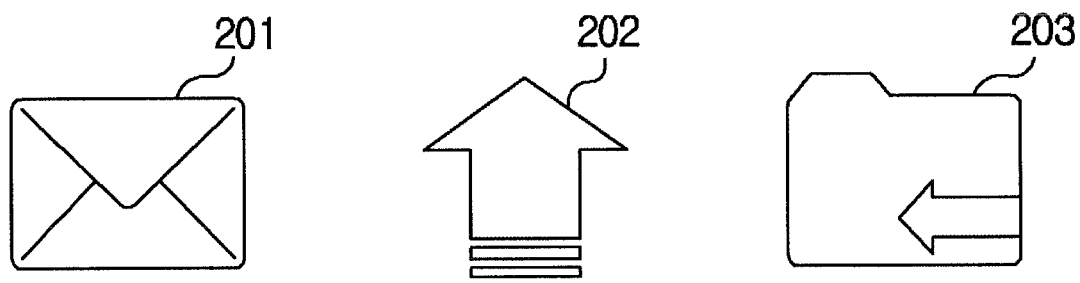
FIG. 11 is an image diagram for a first application example of a mobile communication terminal to which a 3D icon displaying method in a mobile communication terminal according to one embodiment of the present invention is applied.
Figure 11B:
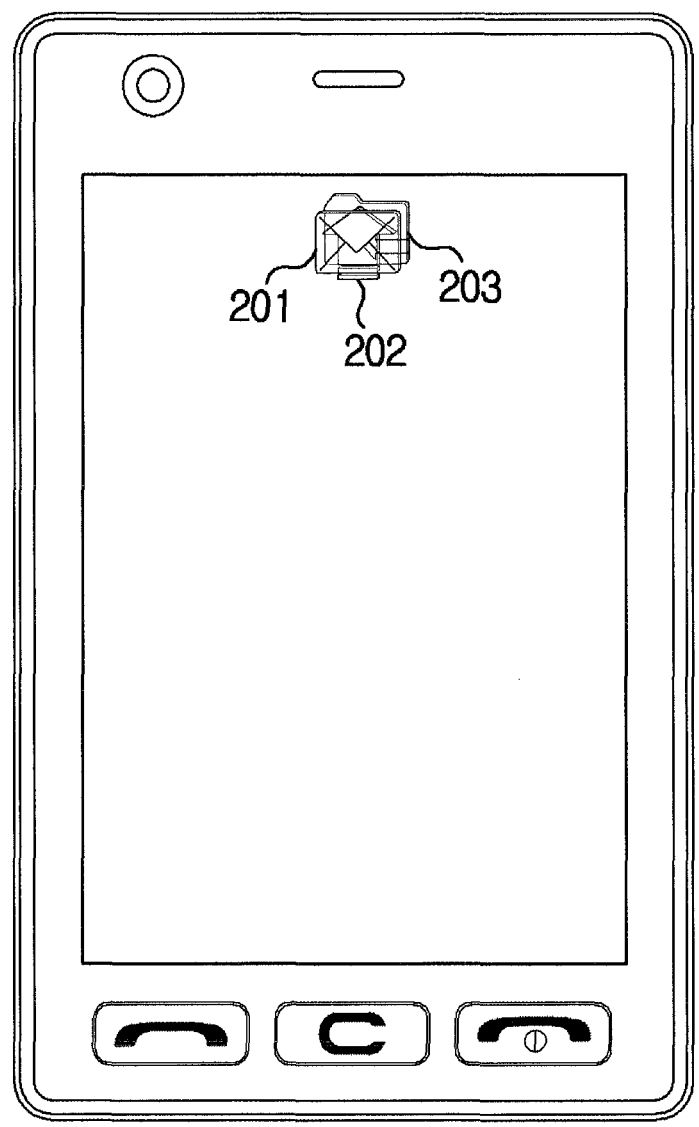
Figure 11C:
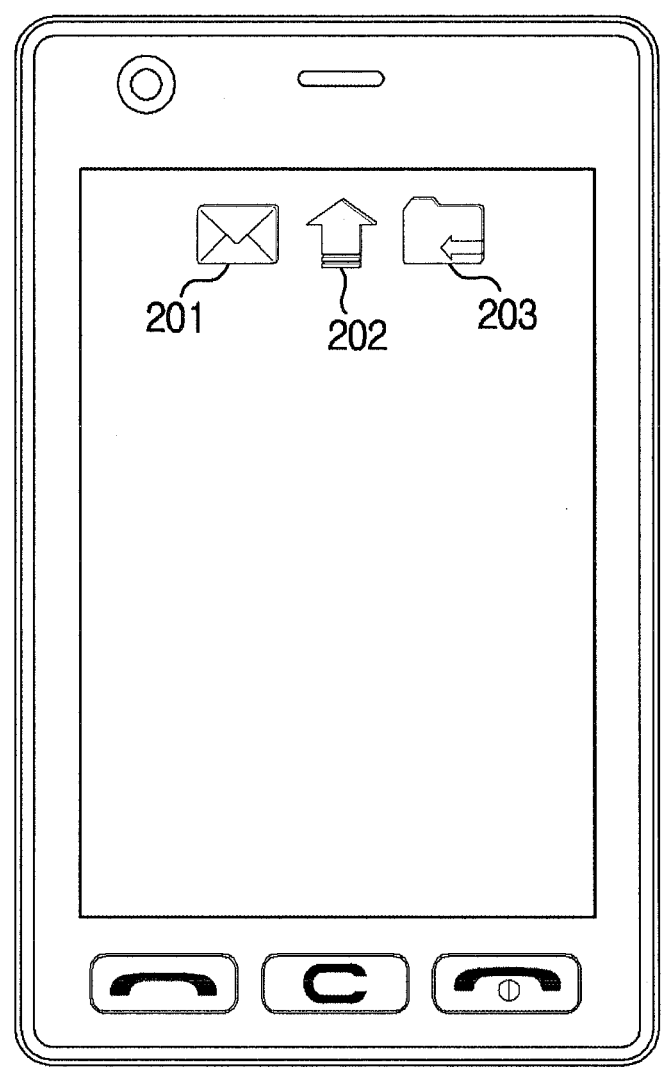

Referring to FIG. 11B, first to third indicator icons 201 to 203 are displayed on an indicator region in a manner of being overlapped with one another. In this case, the first to third indicator icons 201 to 203 include 3D icons differing from each other in depth, respectively. An arranged sequence of the indicators depends on a preset priority or a time sequence. In particular, the first icon is arranged at the top, while the second and third icons are represented as 3D indicator icons located in different distances, respectively. Thus, while the first to third indicator icons 201 to 203 are displayed by being overlapped with one another, if a spread command signal is generated, as shown in FIG. 11C, the controller 180 displays the first to third indicator icons in a manner that the first to third indicator icons are separated from each other [overlapping release]. In this case, the spread command signal for the overlapping release can include one of a long touch input, a proximity touch input over predetermined duration and the like.

Figure 11D:
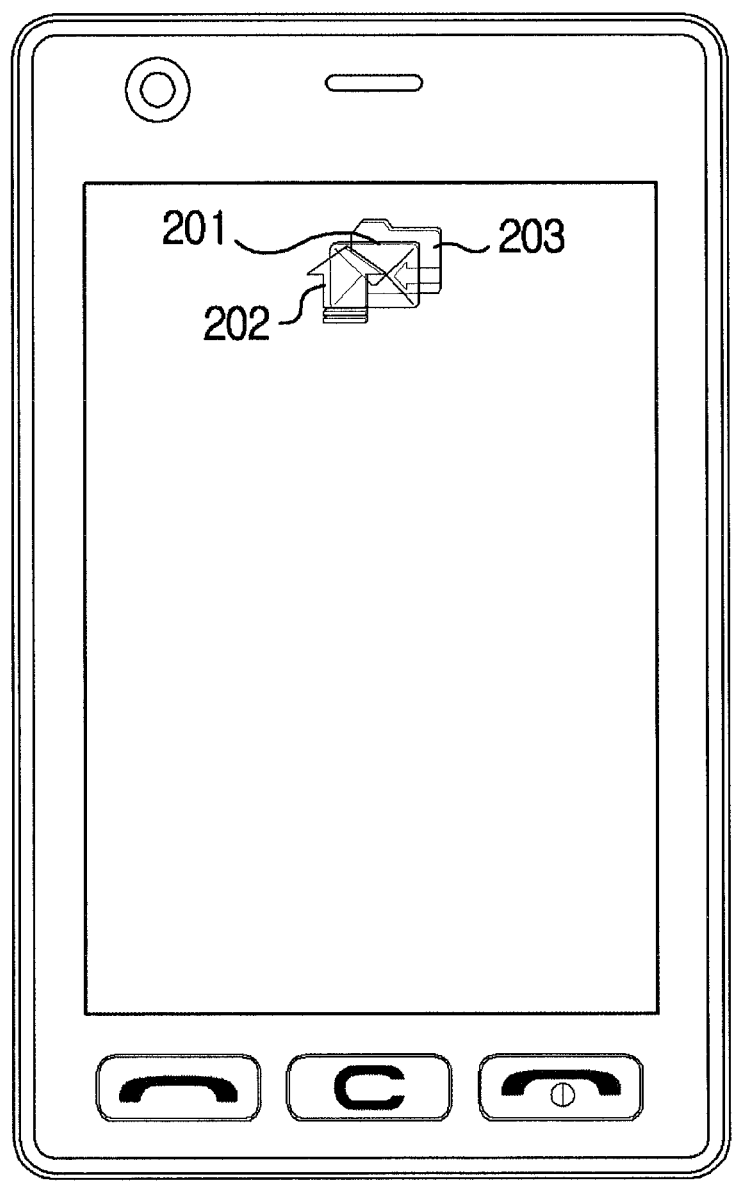

Referring to FIG. 11D, if an icon sequence change signal is generated, the second icon is displayed at the topside and the first and second icons are arranged as icons differing from each other in 3D depth under the second icon. In this case, the icon sequence change signal can include one of a flicking signal, a touch & drag signal and the like. In case that the touch & drag signal is generated, the first to third icons can be spread out from a position of recognizing the touch to a position of completing the drop action.

Besides, the first to third icons can display semitransparent stereoscopic icons. In this case, one of left and right images is processed into semi-transparency and the other is processed into non-transparency, whereby transparency can be represented differently according to a viewing angle.

Meanwhile, in order to facilitate the overlapped first to third icons to be checked, in case of a long touch input, an indicator can be displayed in a manner of enlarging a size of the indicator.

According to the aforesaid first embodiment, it is able to display more indicators on an indicator region. And, a user is facilitated to select a specific indicator icon by spreading out the indicator icons.

SECOND APPLICATION EXAMPLE

FIG. 12 is an image diagram for a second application example of a mobile communication terminal to which a 3D icon displaying method in a mobile communication terminal according to one embodiment of the present invention is applied.

Figure 12A:
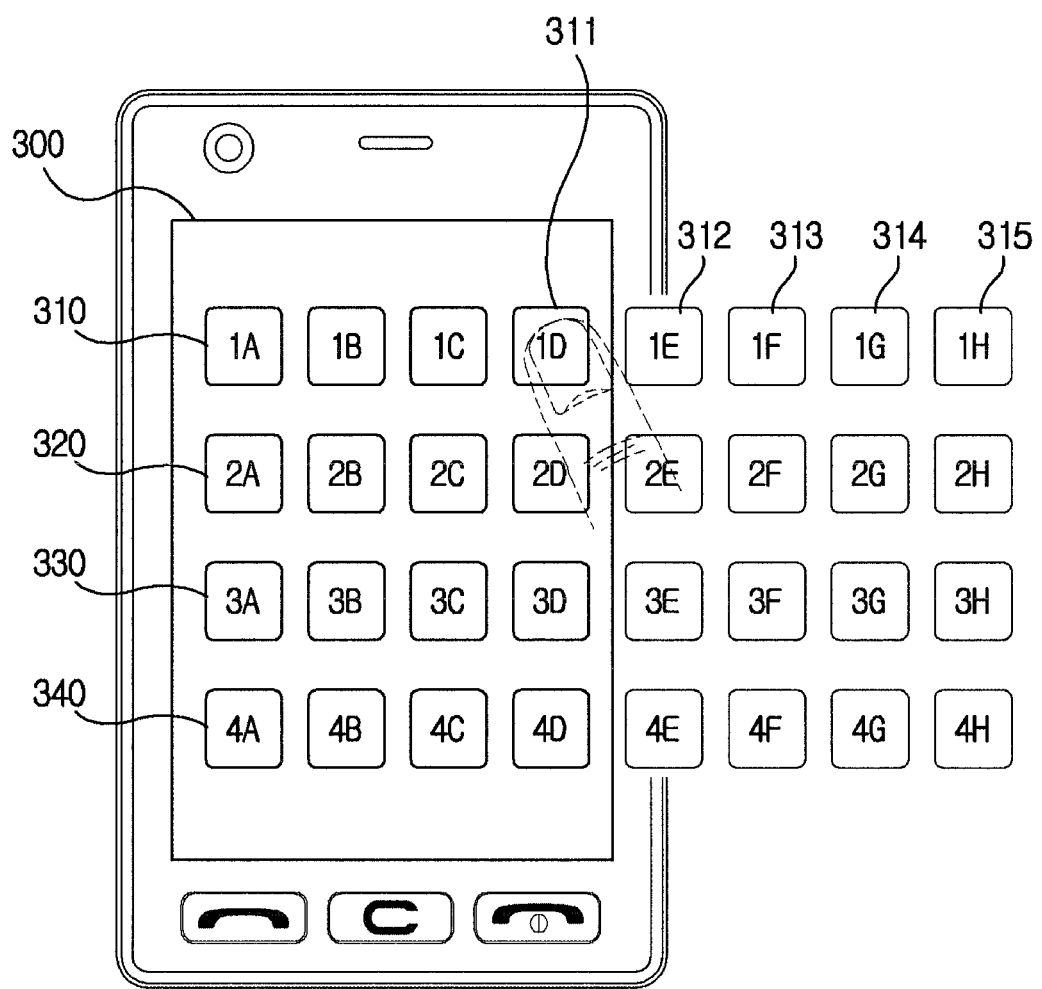
FIG. 12 is an image diagram for a second application example of a mobile communication terminal to which a 3D icon displaying method in a mobile communication terminal according to one embodiment of the present invention is applied.

Referring to FIG. 12A, a menu screen 300 is displayed. And, the menu screen 300 includes a $1^{st}$ manual 310, a $2^{nd}$ manual 320, a $3^{rd}$ manual and a $4^{th}$ manual 340. Each of the manuals is provided with a plurality of icons. And, the icons 312 to 315 in a non-displayable virtual image region, as shown in FIG. 12A, are included in each of the manuals. In particular, although icons up to the column to which the icon 311 belongs are displayed on the display unit, icons beyond the column are not displayed on the display unit. In order to display the non-displayed icons, a scroll box can be provided to a bottom of the screen.

Figure 12B:
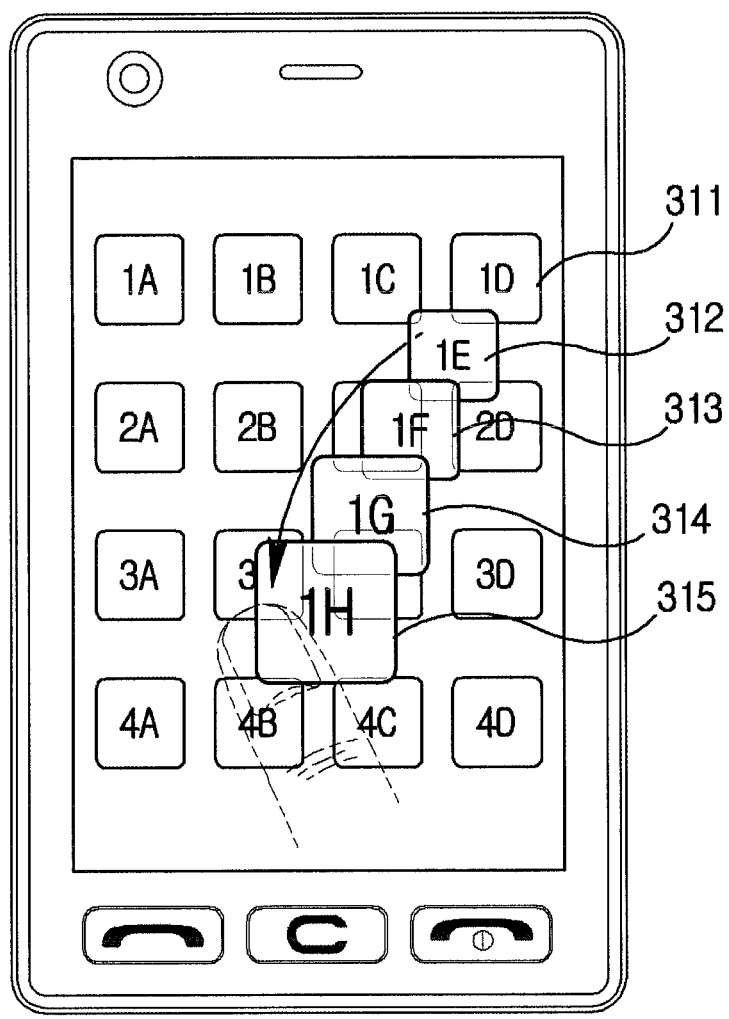
Figure 12C:
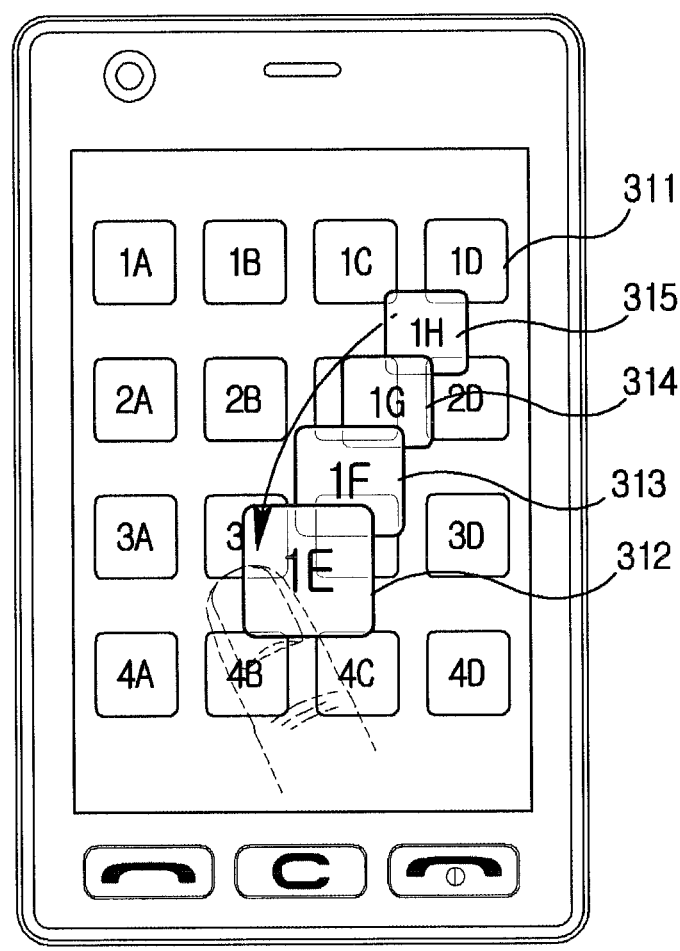
Figure 12D:
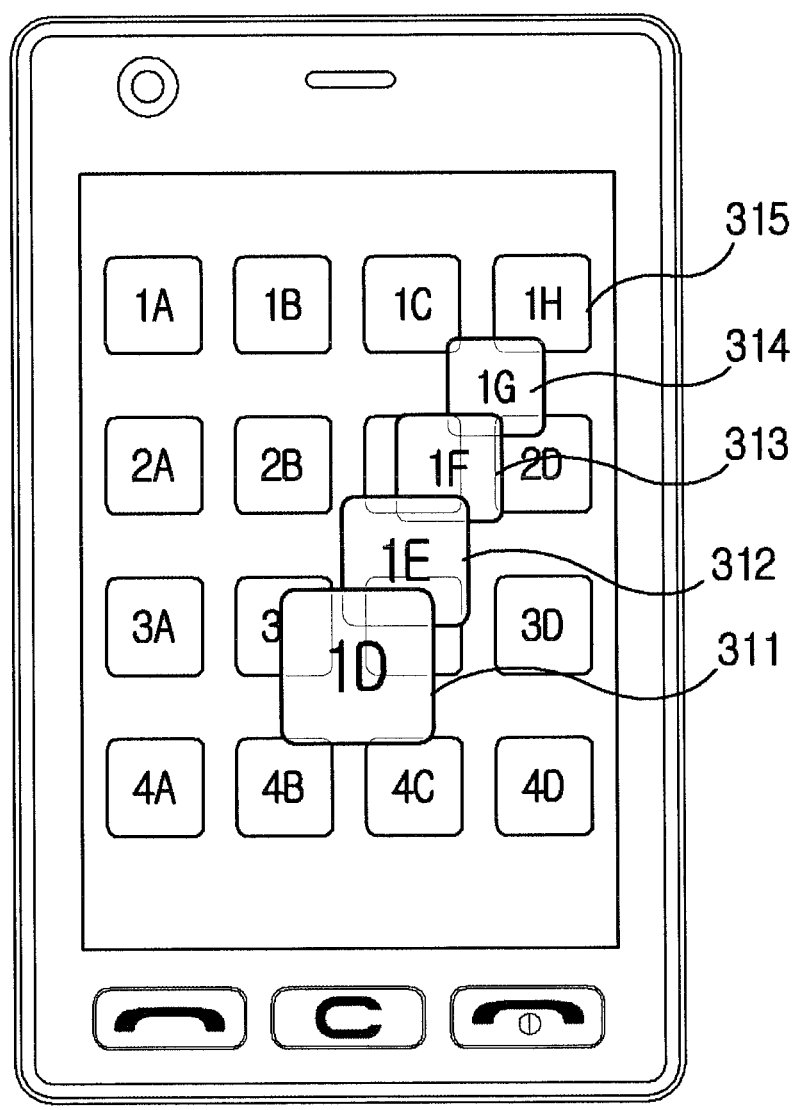

Afterwards, if a long touch input for one 311 of the icons arranged a far left side is generated, the icons 312 and 313, as shown in FIG. 12B, are displayed as 3D icons in a manner of being partially overlapped with each other. Alternatively, virtual icons can be displayed as 3D images by a flicking signal instead of the long touch input signal. In doing so, the icon display of the rest of the end to $4^{th}$ manuals 320, 330 and 340 can be erased. Thus, while the icons 312 to 315 in the virtual region are displayed by being partially overlapped with each other, if an icon sequence change signal (a flocking signal or a long touch input signal for the icon 311) is generated, the arrangement sequence of the 3D icons can be changed as shown in FIG. 12C. Alternatively, one of the icons 312 to 315 in the virtual region can be displayed by substituting for the selected icon 311 (cf. FIG. 12D). Alternatively, one of the icons 312 and 313 in the virtual region is selected and is then substituted for the menu icon at the far right side.

According to the aforesaid second application example, more menus can be displayed on the display unit via the overlapping display of icons. And, the menu icons in the virtual region can be displayed on the display unit in a simple manner.

THIRD APPLICATION EXAMPLE

FIG. 13 is an image diagram for a third application example of a mobile communication terminal to which a 3D icon displaying method in a mobile communication terminal according to one embodiment of the present invention is applied.

Figure 13A:
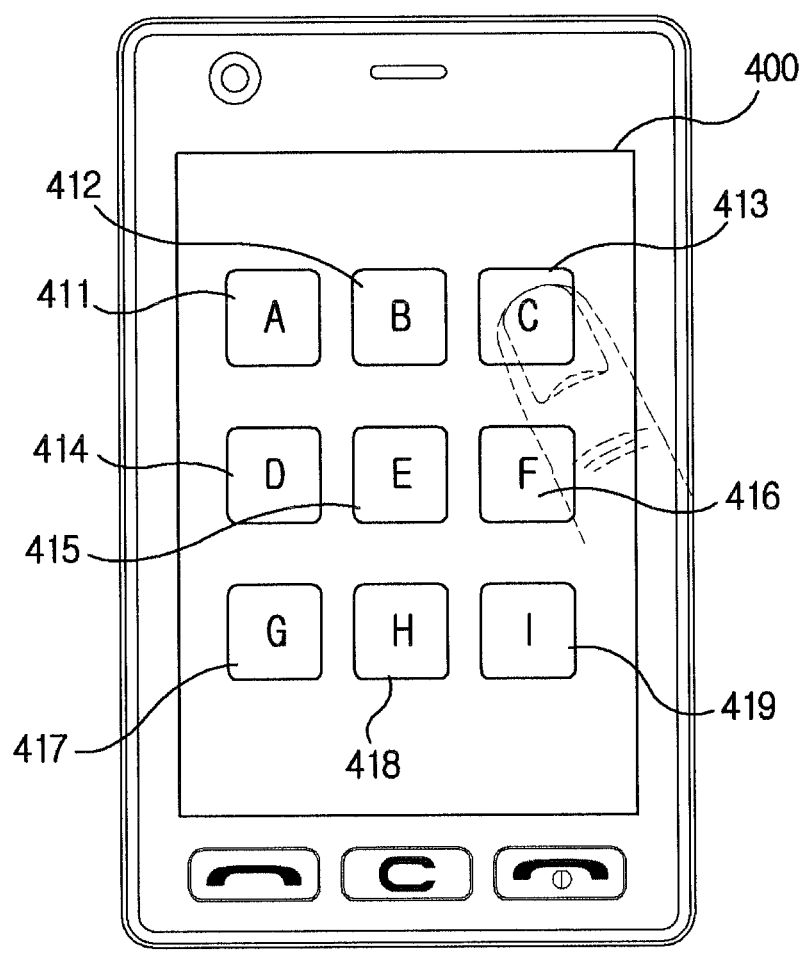
FIG. 13 is an image diagram for a third application example of a mobile communication terminal to which a 3D icon displaying method in a mobile communication terminal according to one embodiment of the present invention is applied.
Figure 13B:
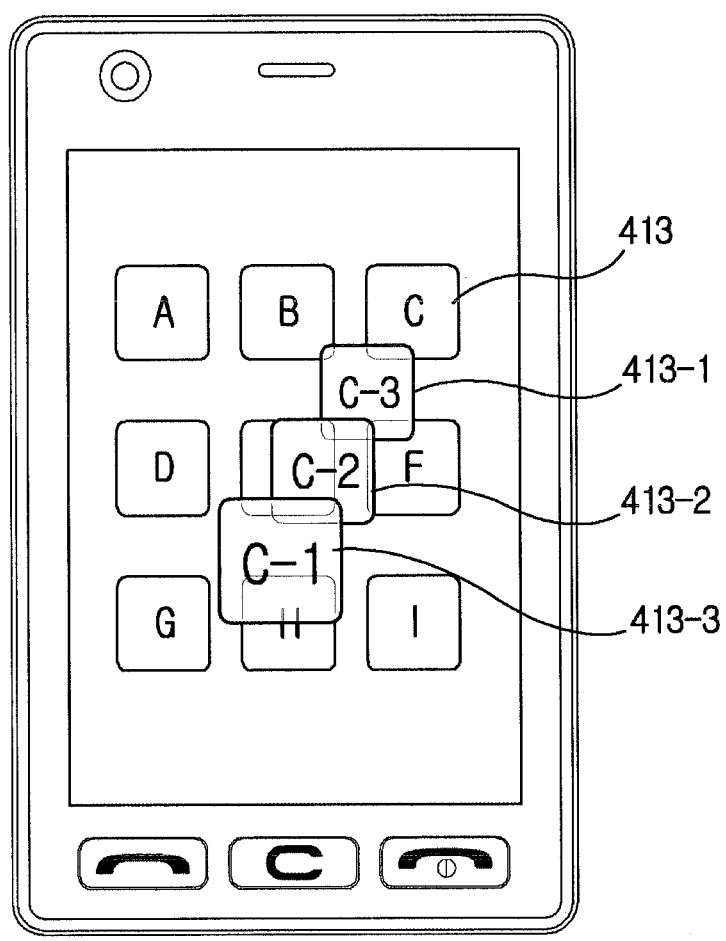

Referring to FIG. 13A, a menu screen 400 is displayed. In this case, unlike the first application example, icons in a virtual region are not displayed. The menu screen 400 includes a plurality of menu icons 411 to 419. In this case, one 413 of the menu icons is selected. If a long touch input is performed on the selected menu icon 413, sub-icons 413-1, 413-2 and 413-3 of the selected menu icon 413, as shown in FIG. 13B, are displayed on the touchscreen. In particular, the sub-icons 413-1, 413-2 and 413-3 can be displayed as 3D icons in a manner of being overlapped with one another. In doing so, the display of the unselected menu icons 411, 412 and 411 to 419 can be erased. Afterwards, if a spread command signal is generated (e.g., a one-direction flicking signal), the overlapping is released so that the sub-icons 413-1, 413-2 and 413-3 are spread out not to be overlapped with each other.

If an icon sequence change signal is generated for the sub-icons 413-1, 413-2 and 413-3, a display sequence of the sub-icons can be changed. This is explained in the foregoing descriptions of the first and second application examples and its details shall be omitted from the following description.

FOURTH APPLICATION EXAMPLE

Figure 14:
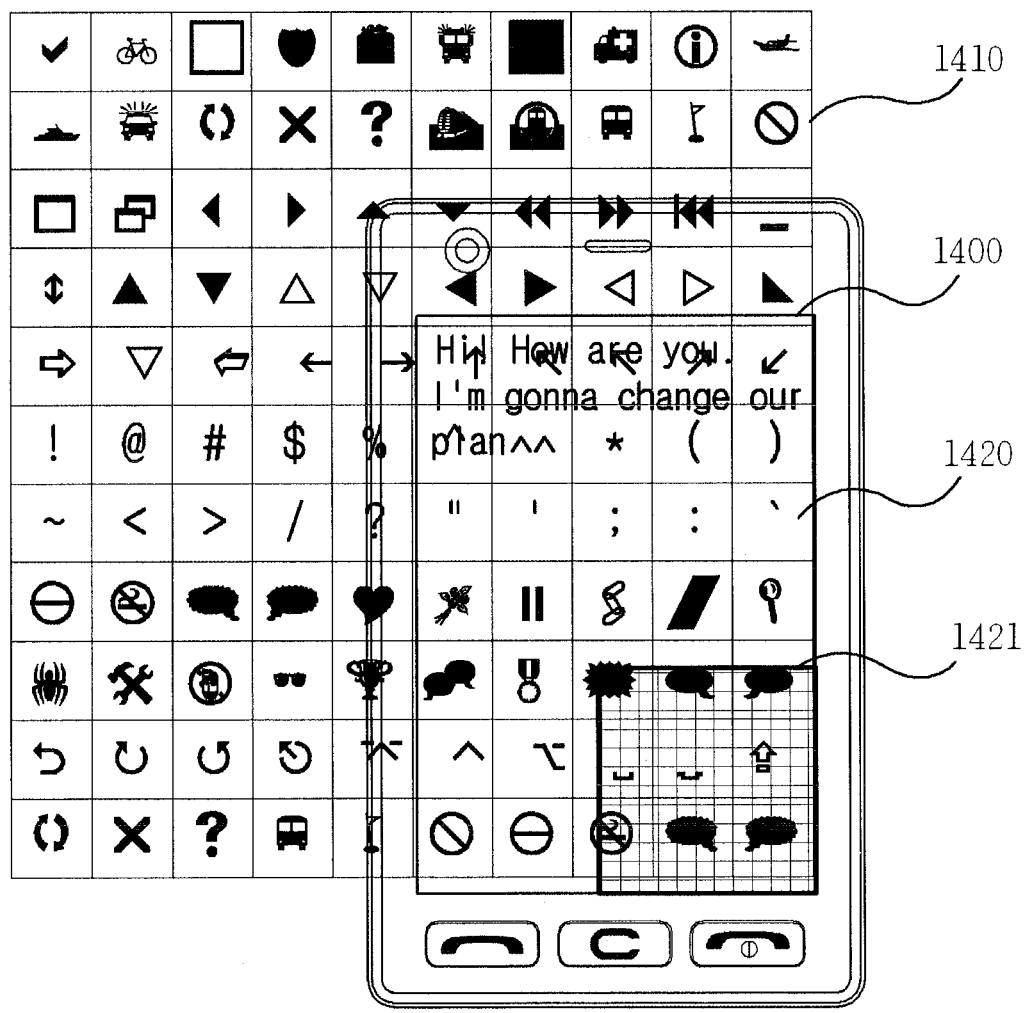
FIG. 14 is an image diagram for a fourth application example of a mobile communication terminal to which a 3D icon displaying method in a mobile communication terminal according to one embodiment of the present invention is applied.

FIG. 14 is an image diagram for a fourth application example of a mobile communication terminal to which a 3D icon displaying method in a mobile communication terminal according to one embodiment of the present invention is applied.

In particular, FIG. 14 shows the concept for explaining a symbol window according to one embodiment of the present invention.

Referring to FIG. 14, if a display of a symbol window is performed in the course of writing a text message, the symbol window is displayed by being overlapped with a text message write screen 1400. A reference number '1410' indicates a 3D plane that is a virtual image space (i.e., a virtual symbol window region) for displaying symbols. And, a reference number '1420' indicates a region (i.e., a real symbol window region) actually displayed on the display unit 151. In this case, if a flicking signal is generated from the real symbol window region 1420, the real symbol window region is shifted along the flicking direction to display a symbol, which was not displayed in the virtual symbol window region, on the display unit 151. Moreover, a mini-map 1421 is displayed on a portion of the real symbol window region 1420 to enable a user to check that the real symbol window 1420 corresponds to which region of the virtual symbol window 1410. And, it is able to shift the real symbol window 1420 using the mini-map 1421.

FIFTH APPLICATION EXAMPLE

Figure 15:
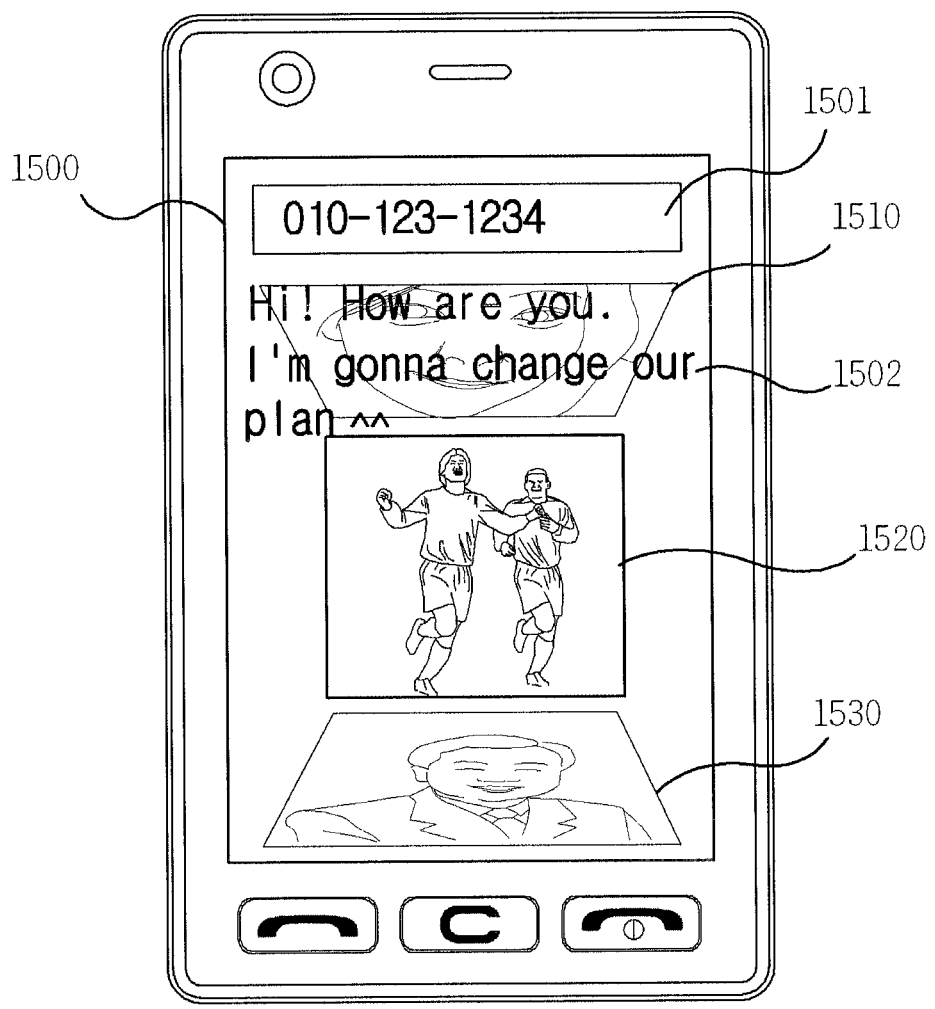
FIG. 15 is an image diagram for a fifth application example of a mobile communication terminal to which a 3D icon displaying method in a mobile communication terminal according to one embodiment of the present invention is applied.

FIG. 15 is an image diagram for a fifth application example of a mobile communication terminal to which a 3D icon displaying method in a mobile communication terminal according to one embodiment of the present invention is applied.

The fifth application example is to provide a 3D preview screen to an MMS (multimedia message system).

Referring to FIG. 15, an MMS write screen 1500 includes a recipient block 1501, a message write block 1502 and image blocks 1510, 1520 and 1530 displayed in a manner of being overlapped with the message write block 1502. Each of the image blocks is a 3D image (e.g., a semitransparent 3D image) having a prescribed 3D depth. And, the image blocks include a previous image block 1510, a current image block 1520 and a next image block 1530. Transparency and 3D depth of each of the image blocks 1510, 1520 and 1530 are adjustable according to a user selection. And, the image of each of the image blocks can include an image stored in a gallery menu. In this case, the image of the corresponding image block can be changed by a flicking signal for the corresponding image block.

Therefore, a user is able to write an MMS message using the MMS write screen 1500. In particular, a user is facilitated to display a specific image, which is to be attached, using a 3D image block.

SIXTH APPLICATION EXAMPLE

Figure 16:
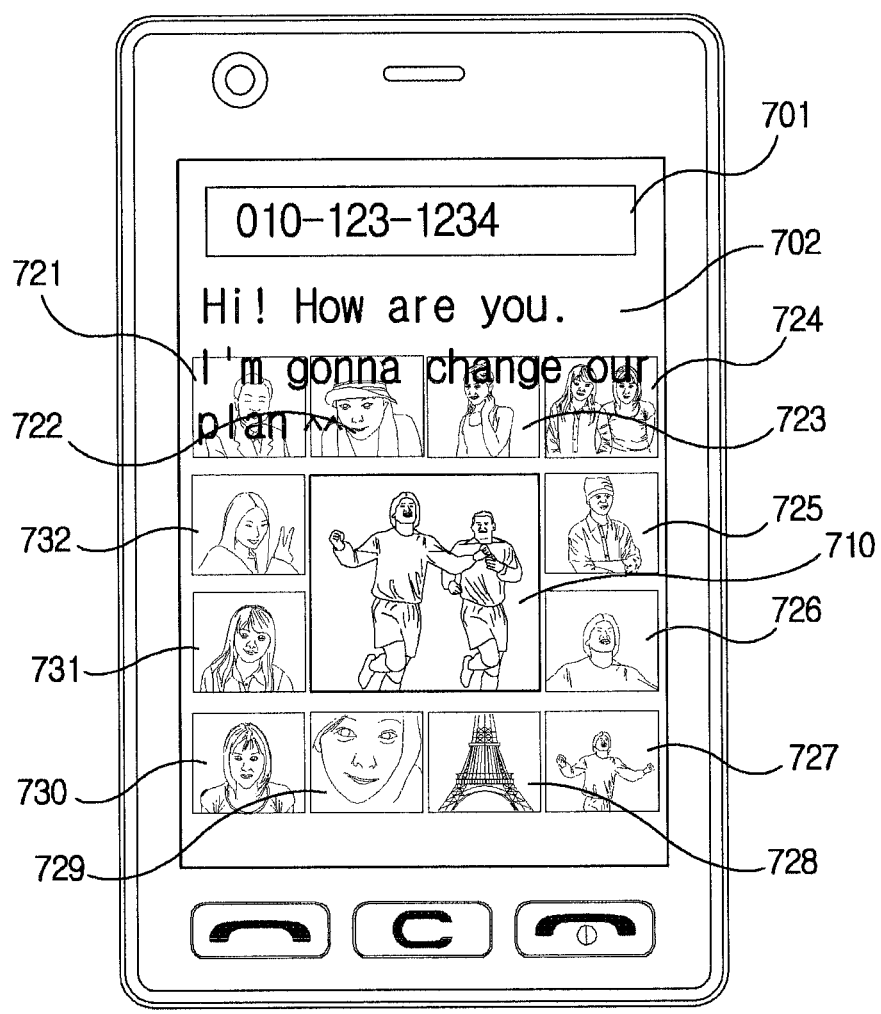
FIG. 16 is an image diagram for a sixth application example of a mobile communication terminal to which a 3D icon displaying method in a mobile communication terminal according to one embodiment of the present invention is applied.

FIG. 16 is an image diagram for a sixth application example of a mobile communication terminal to which a 3D icon displaying method in a mobile communication terminal according to one embodiment of the present invention is applied.

The sixth application example is to provide a 3D preview screen to an MMS (multimedia message system).

Referring to FIG. 16, an MMS write screen 700 includes a recipient block 701, a message write block 702 and an image window 710 displayed in a manner of being overlapped with the message write block 702. A currently selected image 711 is displayed at the center of the image window 710. And, thumbnails 721 to 736 of attachable images are displayed around the center. A user selects one of the thumbnails and is then able to substitute the selected thumbnail for the image displayed at the center (e.g., by a drag & drop action). The image window 710 is a 3D image (e.g., a semitransparent 3D image) having a prescribed 3D depth. Transparency and 3D depth of the image window 710 are adjustable according to a user selection. And, the images 711 and 721 to 732 of the image window 710 can include the images stored in a gallery menu. In this case, the image of the corresponding image block can be changed by a flicking signal for the corresponding image block.

Therefore, a user is able to write an MMS message using the MMS write screen 700. In particular, a user is facilitated to display a specific image, which is to be attached, using a 3D image block.

SEVENTH APPLICATION EXAMPLE

Figure 17:
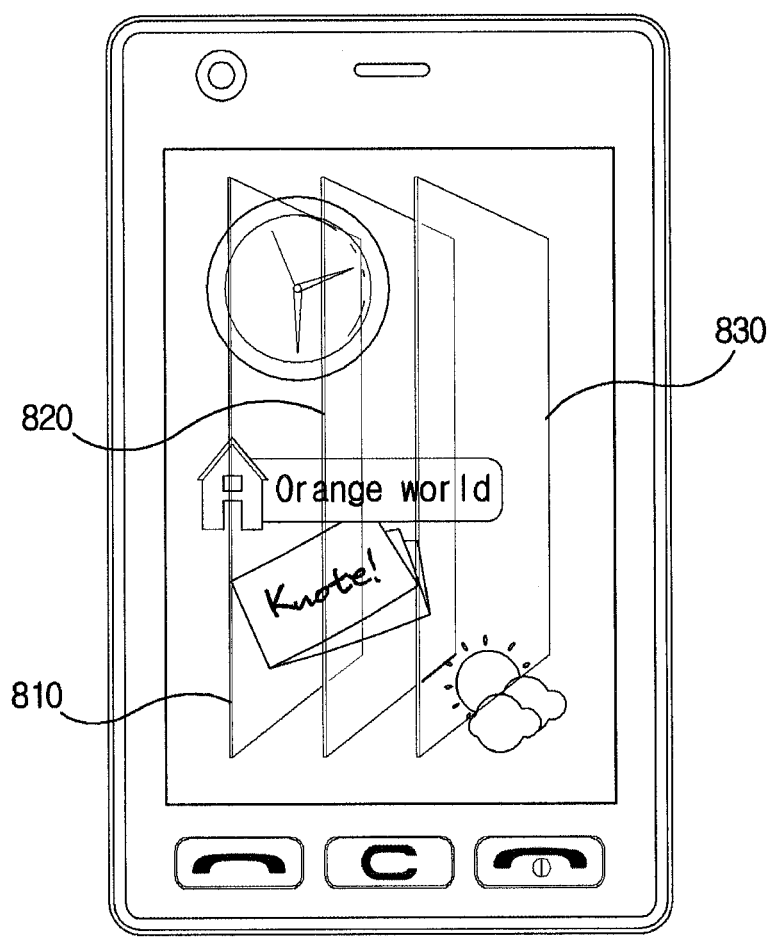
FIG. 17 is an image diagram for a seventh application example of a mobile communication terminal to which a 3D icon displaying method in a mobile communication terminal according to one embodiment of the present invention is applied.

FIG. 17 is an image diagram for a seventh application example of a mobile communication terminal to which a 3D icon displaying method in a mobile communication terminal according to one embodiment of the present invention is applied.

Referring to FIG. 17, a background screen 800 is displayed. In this case, the background screen 800 includes a first navigation pane 810, a second navigation pane 820 and a third navigation pane 830. In this case, each of the navigation panes 810 to 830 can include a widget navigation panel available for the background screen 800. The navigation panes 810 to 830, as shown in the drawing, can be displayed as 3D images in a manner of being overlapped with one another. If a user generates a flicking signal for the navigation panes 810 to 830, a sequence of the navigation panes 810 to 830 is changed to enable the user to check the navigation pane having a specific widget. The navigation panes 810 to 830 have the same 3D depth, as shown in the drawing, and can be arranged in parallel with each other. Alternatively, the navigation panes 810 to 830 can differ from each other in 3D depth and/or transparency.

If a user selects one of the first to third navigation panes 810 to 830, the selected navigation pane is changed into a 2D screen. The user selects a specific widget via a 2D navigation pane and is able to set the selected widget to be displayed on the background screen.

EIGHTH APPLICATION EXAMPLE

Figure 18:
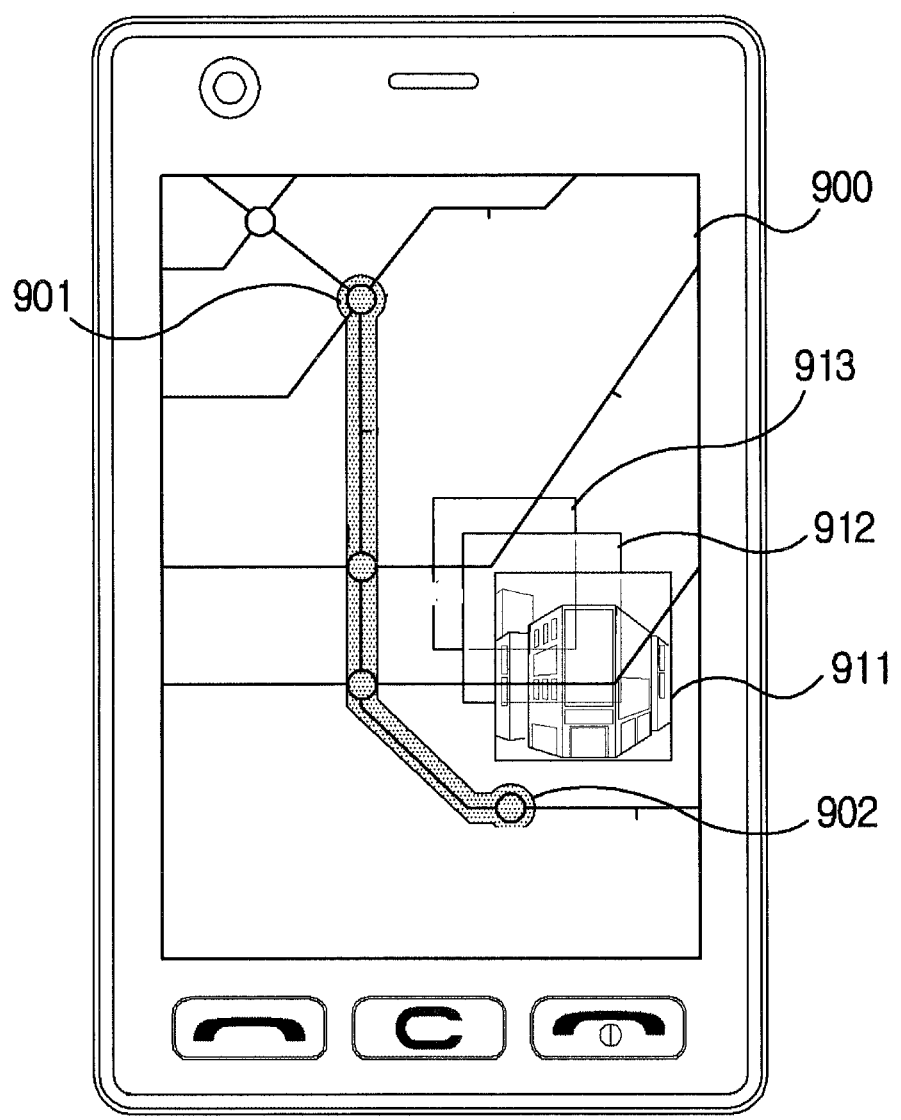
FIG. 18 is an image diagram for an eighth application example of a mobile communication terminal to which a 3D icon displaying method in a mobile communication terminal according to one embodiment of the present invention is applied.

FIG. 18 is an image diagram for an eighth application example of a mobile communication terminal to which a 3D icon displaying method in a mobile communication terminal according to one embodiment of the present invention is applied. According to the eighth application example, one embodiment of the present invention is applied to a subway route map.

Referring to FIG. 18, while a subway route map 900 is displayed, if a user designates a departure station and an arrival station, the controller 180 controls the switching panel unit 155 to display a path from the departure station 901 to the arrival station 902 as a 3D image. Accordingly, the path is displayed as the 3D image on the subway route map 900. Therefore, the user is able to check the path with good visibility.

In case that the user attempts to obtain detailed information on a specific station, the controller 180 controls station information windows 911 to 913 to be displayed in a manner of being overlapped with one another as the 3D images. The overlapping of the station information windows 911 to 913 displayed by being overlapped with one another can be released according to a spread command signal in a manner of being spread out. Moreover, a sequence of the station information windows 911 to 913 can be changed according to an icon sequence change signal.

Besides, transparency and 3D depth of the station information windows 911 to 913 are changeable according to a user selection.

Second Embodiment

A mobile terminal according to another embodiment of the present invention is able to provide a stereoscopic user interface. In particular, the stereoscopic user interface displays at least one 3D object in a virtual stereoscopic space and enables the displayed at least one 3D object to be manipulated in various ways.

[First Aspect]

FIG. 19 is a diagram for one example of a method of selecting a 3D object in a stereoscopic user interface implemented in a mobile terminal according to another embodiment of the present invention.

In the drawings of the following display configuration diagrams including FIG. 19, planar images are shown due to the limited representation of the drawings. Yet, assume stereoscopic images provided to a user according to the aforesaid 3D stereoscopic image implementation schemes.

Referring to FIG. 19, total 3 virtual layers including $0^{th}$ layer L0 to $2^{nd}$ layer L2 are arranged in a stereoscopic space in a manner of being stacked on each other by being spaced apart from each other with a predetermined gap. In particular, the L1 is arranged by being spaced apart from the L0 with a gap d1 and the L2 is arranged by being spaced apart from the L0 with a gap d2. The arrangement of the layers is configured as follows. First of all, the direction from L2 to L0 is set to get closer to the direction of the display unit. Secondly, the direction from L0 to L2 is set to get closer to the direction of a user.

And, 3D objects can be arranged on the above configured virtual layers.

Figure 19A:
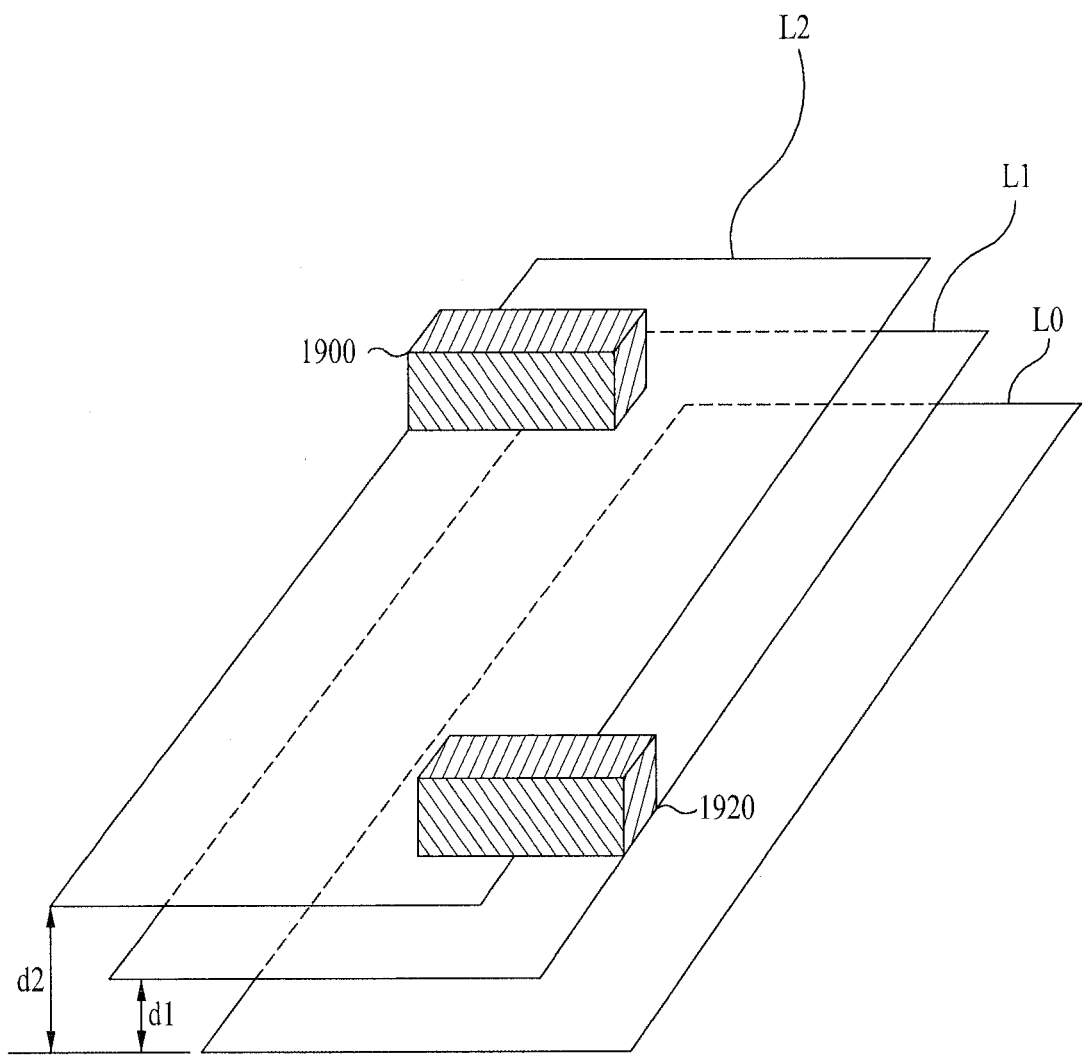
FIG. 19 is a diagram for one example of a method of selecting a 3D object in a stereoscopic user interface implemented in a mobile terminal according to another embodiment of the present invention.

Referring to FIG. 19A, assume a case that cubes 1900 and 1920 are arranged as 3D objects on the L2 and the L1, respectively. In this case, the layers are separated to indicate a 3D depth of the arrangement of the corresponding 3D object. When the arrangement status of the 3D objects is actually implemented as a 3D stereoscopic image via the display unit 151, the separation of the layers can be set not to be seen by a user.

In viewpoint of a user, the 3D object 1900 located on the L2 is arranged at the top and the user is able to sense that the corresponding 3D object 1900 is located closer. The 3D object located on the L1 has an arrangement height lower by d2-d1 than that of the 3D object 1900 located on the L2 and the user is able to sense that the corresponding 3D object 1920 is located far from the user. In this case, the 3D object 1900 located on the L2 can be regarded as having the 3D depth lower than that of the 3D object 1920 located on the L1.

Arrangement position and/or 3D depth of each of the 3D objects are adjustable by a prescribed command input via the user input unit. A command input for manipulating the layer objects can be performed using the camera 121 for photographing a position of a pointer, the proximity sensor 140 for recognizing a proximity distance of a pointer, the touchscreen 151 for recognizing a contact touch and a proximity touch distinguishably and the like.

In case of using the camera 121, it is preferable that the camera 121 is arranged in the same plane of the display unit 151, on which the stereoscopic user interface according to the present invention is implemented, on the mobile terminal body in a direction for photographing a pointer. And, the controller 180 is able to recognize a position and/or a moving pattern of the pointer as a corresponding command input from a user by a method of recognizing a position of the pointer in an image taken via the camera 121.

In the following description, when a plurality of 3D objects are displayed via a stereoscopic user interface according to the present invention, a method of selecting one of the 3D objects is explained with reference to FIG. 19B.

Figure 19B:
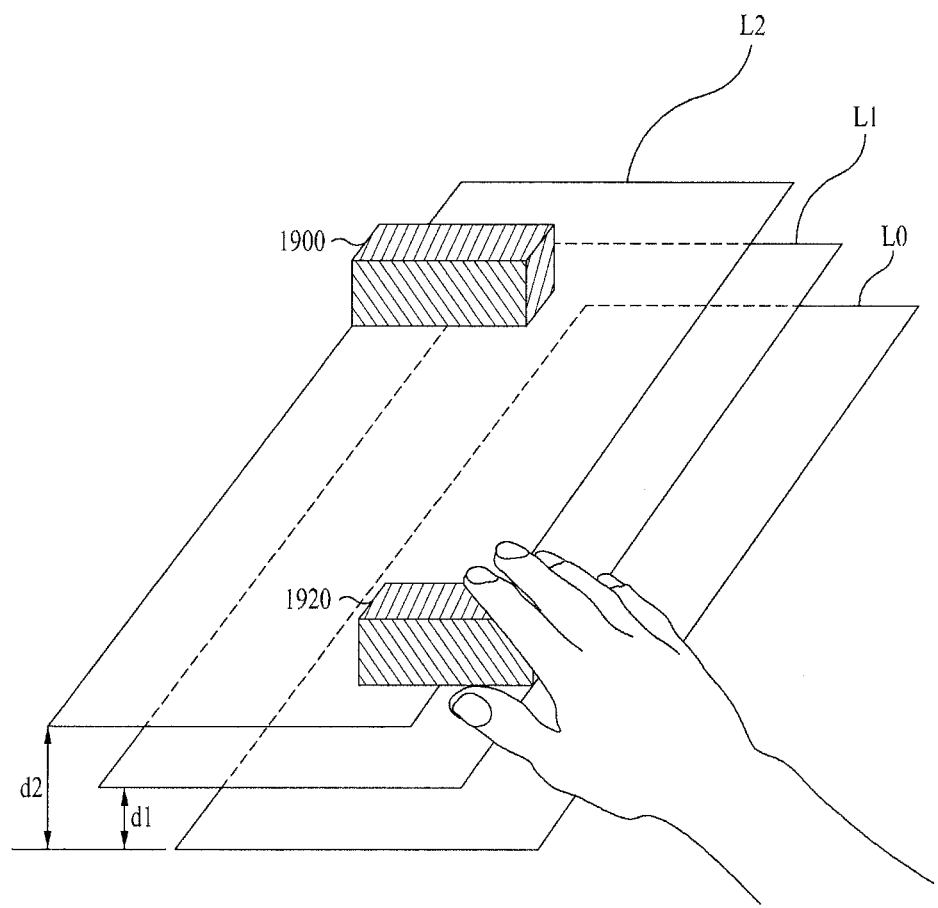

Referring to FIG. 19B, the same situation shown in FIG. 19A is assumed. In this situation, a user is able to select a 3D object 1920 by touching the corresponding 3D object 1920 located on L1 with a pointer, e.g., a hand (proximity touch). In doing so, in order to prevent the malfunction in the course of the selection, the mobile terminal can be set to recognize the selection only if the hand keeps touching the corresponding 3D object over a predetermined duration. In order for the mobile terminal to recognize the selection, as mentioned in the foregoing description, the position of the pointer needs to be obtained via the proximity sensor 140, the camera 121 and the touchscreen 151.

Yet, the object selecting method described with reference to FIG. 19 may cause a problem to the selection if at least two 3D objects are arranged in a manner of being partially overlapped with one another at least by differing from each other in 3D depth only. This is explained with reference to FIG. 20 as follows.

FIG. 20 is a diagram for another example of a method of selecting a 3D object in a stereoscopic user interface implemented in a mobile terminal according to another embodiment of the present invention.

Figure 20A:
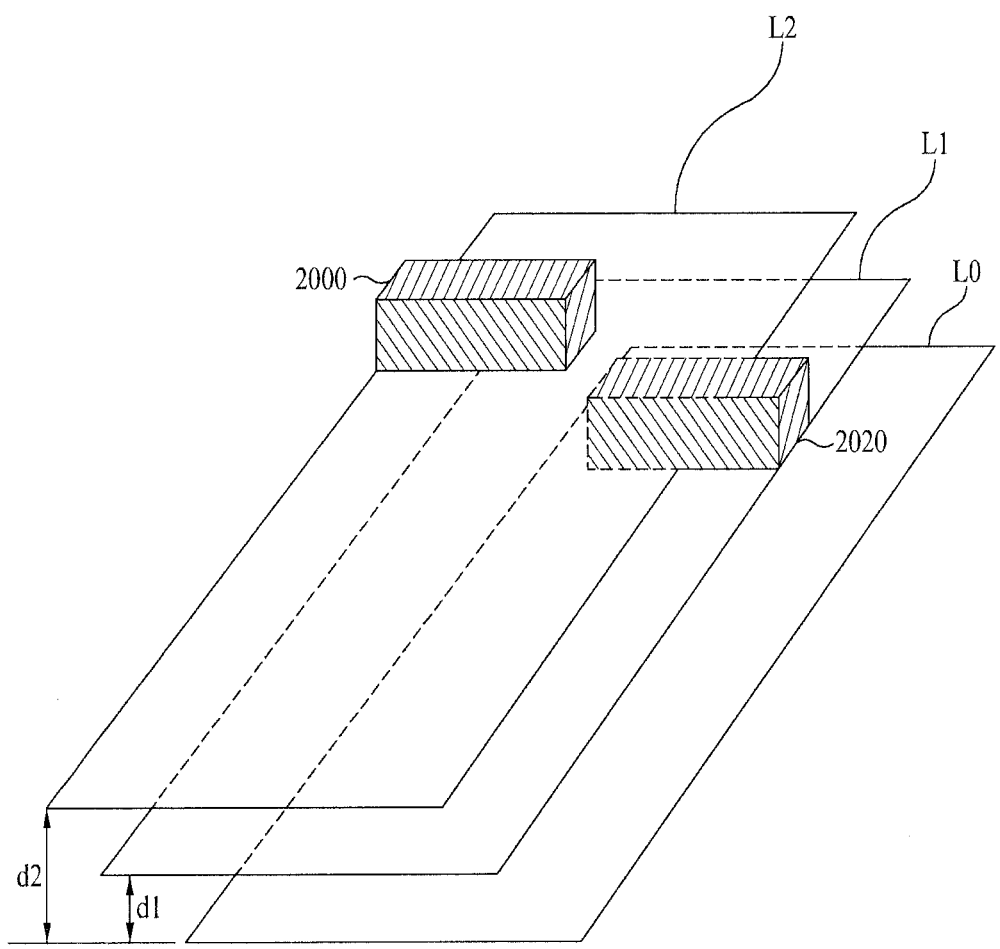
FIG. 20 is a diagram for another example of a method of selecting a 3D object in a stereoscopic user interface implemented in a mobile terminal according to another embodiment of the present invention.

Referring to FIG. 20A, a pair of 3D objects 2000 and 2020 differ from each other in 3D depth (i.e., layer) of arrangement. In viewpoint of a user, a right lateral side of the 3D object

2000 arranged on L2 is arranged adjacent to a left lateral side of the 3D object 2020 arranged on L1. If the 3D object selecting method described with reference to FIG. 19 is applied, a malfunction may occur in the adjacent area between a pair of the 3D objects.

In order to prevent this malfunction, a method of selecting an object using a proximity depth according to one embodiment of the present invention is proposed. This is explained with reference to FIG. 20B as follows.

Figure 20B:
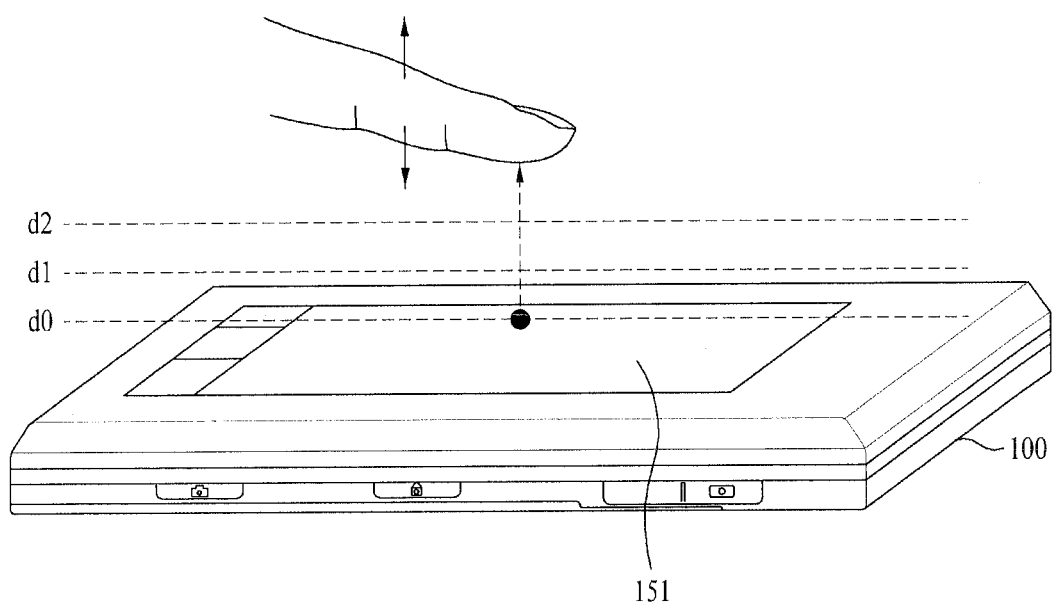

Referring to FIG. 20B, the mobile terminal can be provided with the touchscreen 151 for recognizing at least two steps of a proximity touch made by a user. In this case, a distance d0 is set to correspond to L0, a section between d1 and d2 is set to correspond to L1, and a distance after d2 can be set to correspond to L2.

Accordingly, in selecting one of 3D objects arranged adjacent to each other in viewpoint of a user, malfunction is prevented in a manner of differentiating a depth of a proximity touch and a 3D object on a specific layer can be set to be selected. Of course, in this method, in order to prevent the malfunction in the course of moving a pointer to a proximity depth corresponding to a layer on which the corresponding object is arranged, the selection can be set to be performed only if the pointer pints at the corresponding object over predetermined duration.

[Second Aspect]

In the following description, a method of selecting a 3D object and then manipulating the selected 3D object according to another embodiment of the present invention is explained in another aspect.

FIG. 21 is a diagram for one example of a method of selecting and manipulating a 3D object in a stereoscopic user interface implemented in a mobile terminal according to another embodiment of the present invention.

Figure 21A:
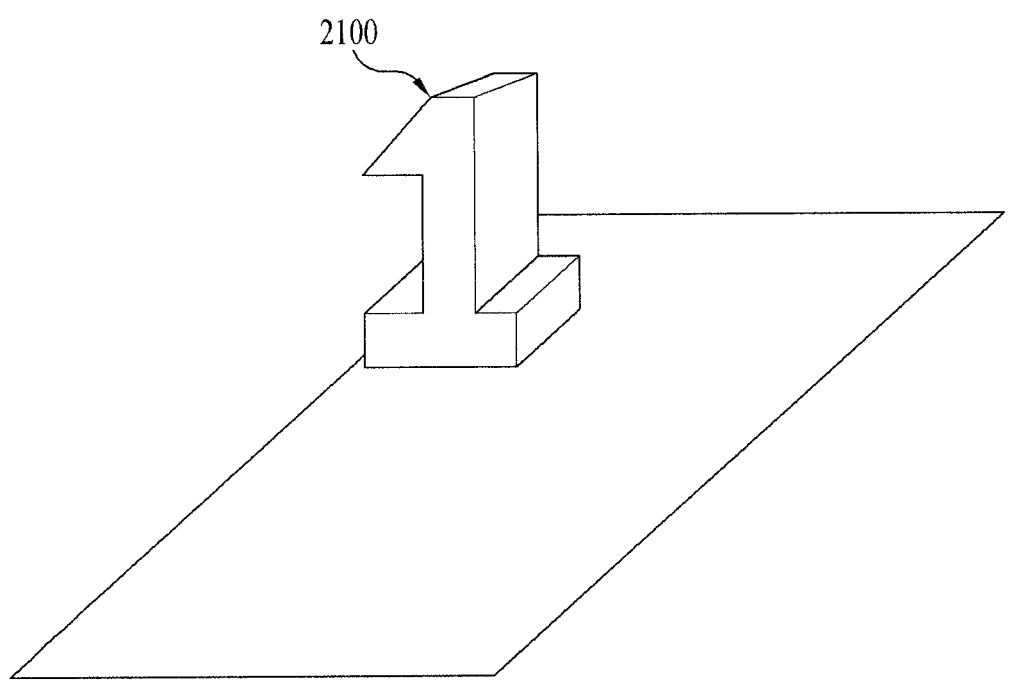
FIG. 21 is a diagram for one example of a method of selecting and manipulating a 3D object in a stereoscopic user interface implemented in a mobile terminal according to another embodiment of the present invention.

Referring to FIG. 21A, a 3D object 2100 in a shape of a stereographed '1' on a layer having a prescribed 3D depth is displayed via a stereoscopic user interface according to the present invention.

Figure 21B:
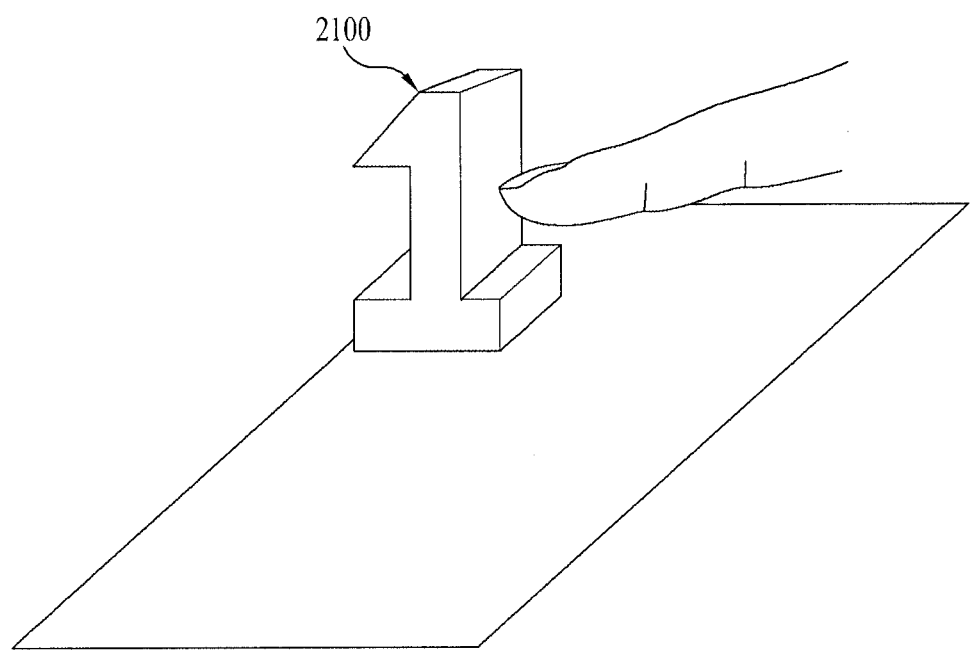
Figure 21C:
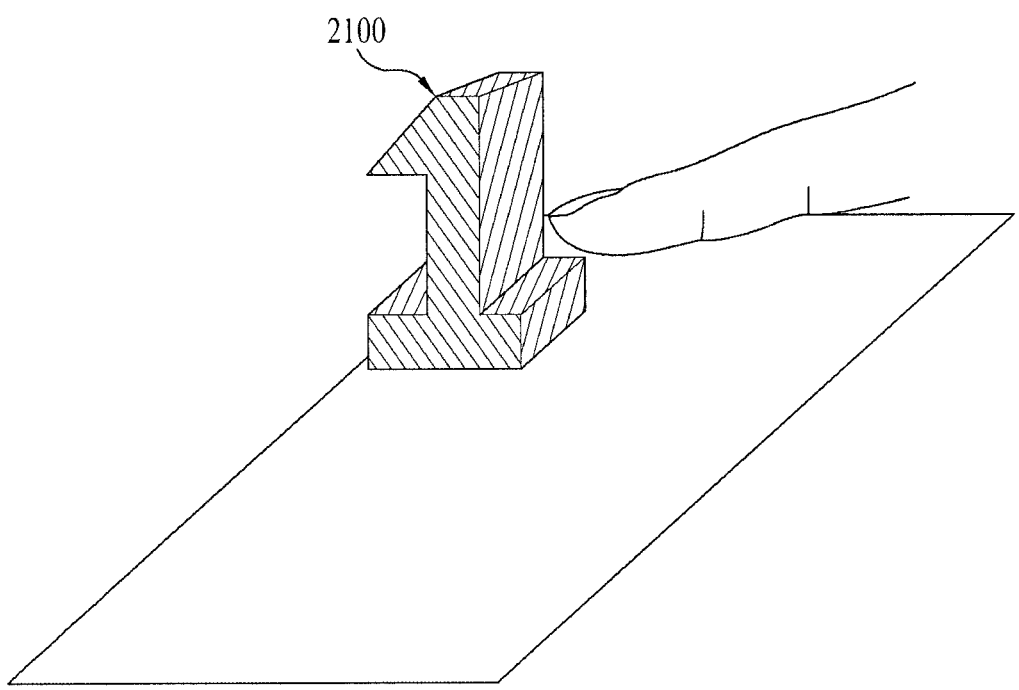

If a user brings a pointer (e.g., finger) to the 3D object, as shown in FIG. 21B, a prescribed visual effect can be given to indicate that the corresponding object has been selected. For example of this visual effect, referring to FIG. 21C, a color of the 3D object or a pattern of a texture on a surface of the 3D object can be changed. The visual effect shown in FIG. 21C is exemplary, by which the present invention is non-limited. Alternatively, one of various effects including flickering, size variation, shape transform of at least one part and the like can be given to the 3D effect to indicate the selection.

Figure 21D:
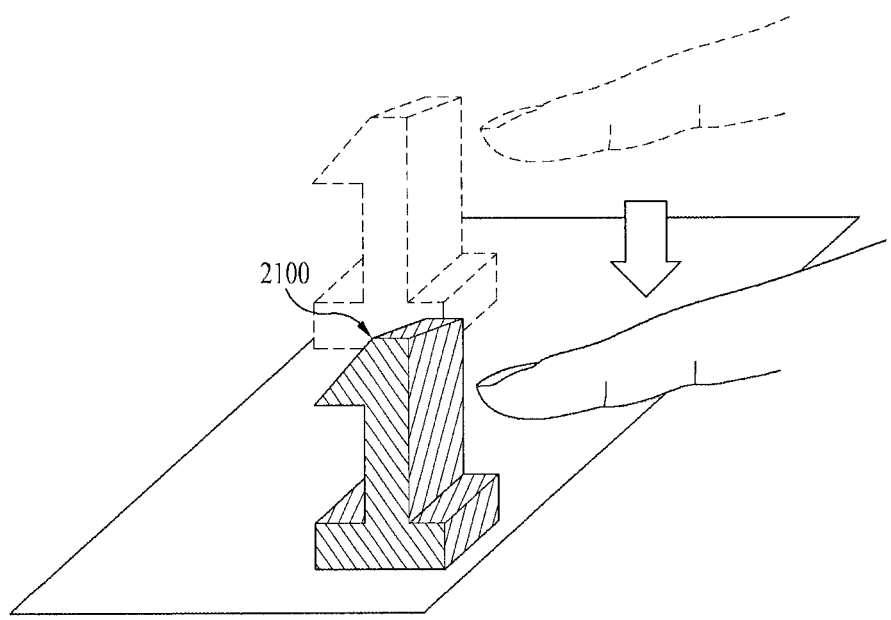

After the corresponding 3D object has been selected, if the user shifts his finger in a manner shown in FIG. 21D, the controller 180 is able to control the corresponding object 2100 to move to correspond to a motion of the finger.

If an indication of a pointer over prescribed duration is required for the selection of a specific 3D object, a reverse method is usable for the selection release of the selected object. For instance, if the requirement for the pointer to point at a specific 3D object over 2 seconds is met, the selection is set to be performed. The release from the selected state can be set to be performed if the pointer stays at the same point over 2 seconds.

FIG. 22 is a diagram for another example of a method of selecting and manipulating a 3D object in a stereoscopic user interface implemented in a mobile terminal according to another embodiment of the present invention.

In the following description, according to other embodiments of the present invention including the embodiment shown in FIG. 22, proposed is to perform the selection of an object via a gesture using such a pointer as a finger and the like. To recognize the gesture, the camera 121 is preferably provided to a position for photographing a pointer moving on the display unit 151, on which a stereoscopic user interface according to the present invention is implemented, in the mobile terminal. Alternatively, a touchscreen capable of recognizing a multi-touch (e.g., touch inputs applied to at least two points simultaneously) is preferably provided to the mobile terminal. Accordingly, the controller 180 is able to determine a position of a user's hand or whether the user makes a gesture of clamping (e.g., action for picking up an object using at least two fingers), via the camera 121 or the touchscreen.

Figure 22A:
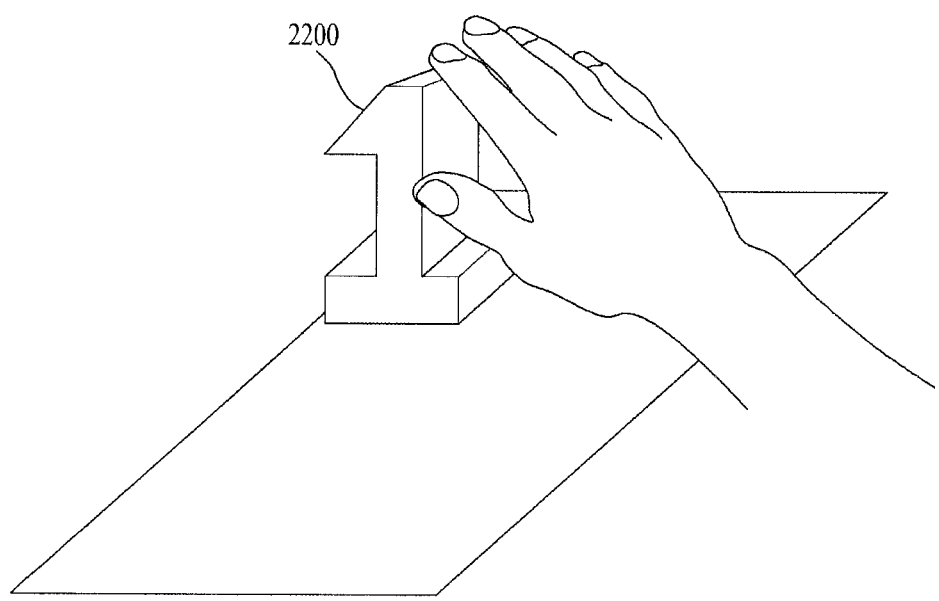
FIG. 22 is a diagram for another example of a method of selecting and manipulating a 3D object in a stereoscopic user interface implemented in a mobile terminal according to another embodiment of the present invention.
Figure 22B:
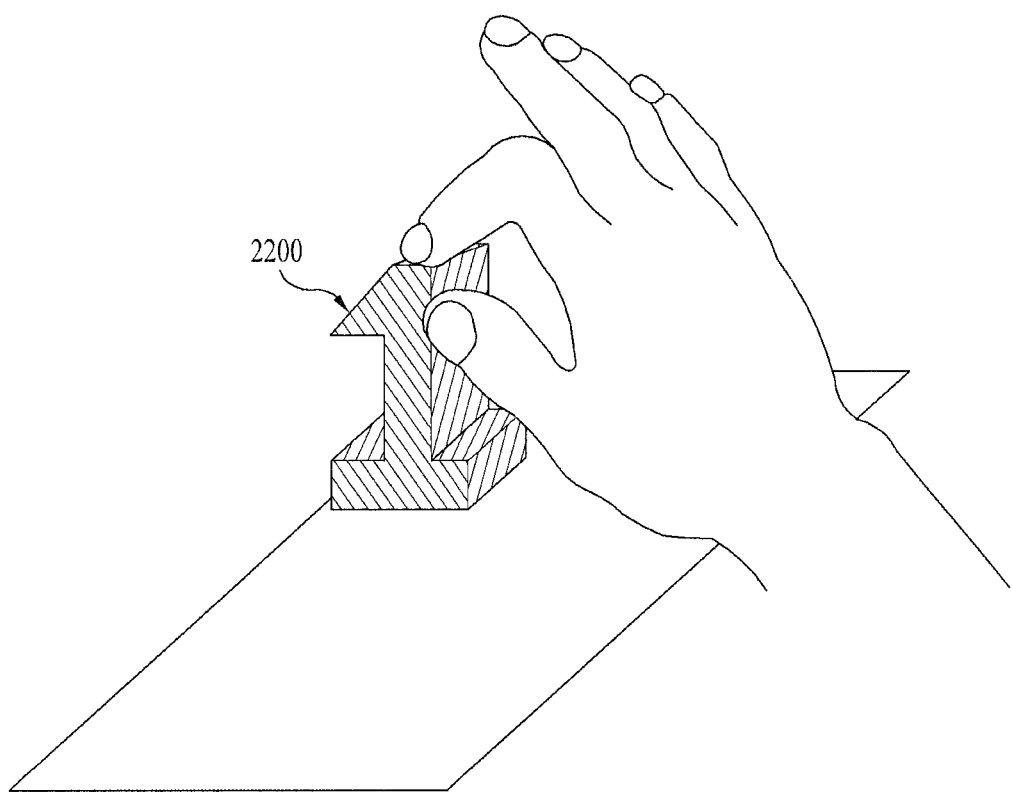
Figure 22C:
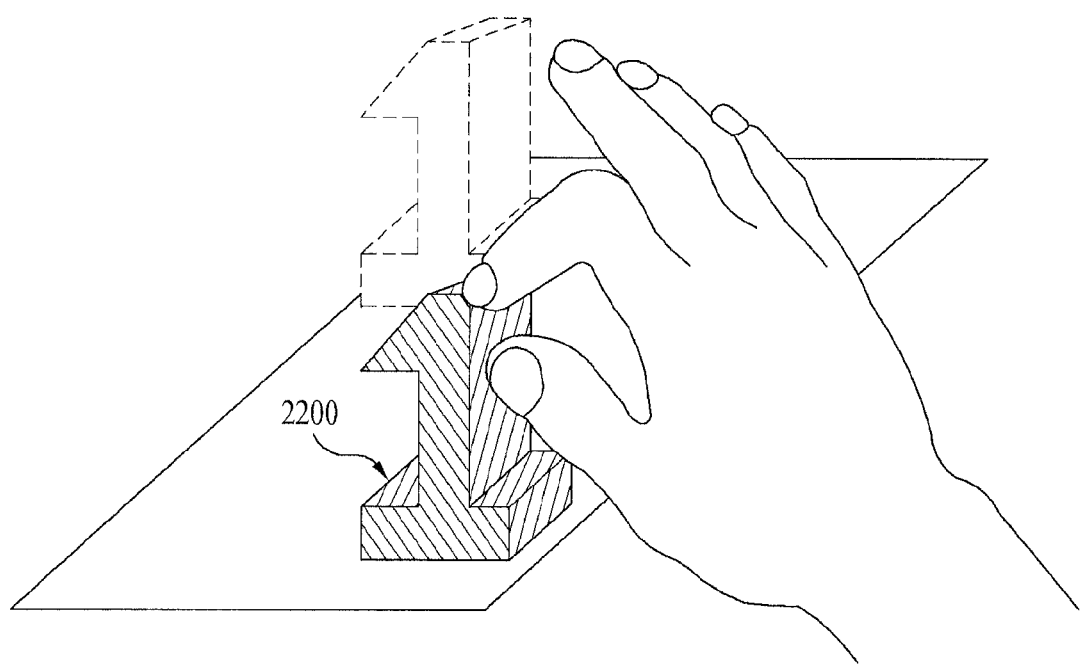

Referring to FIG. 22A, like FIG. 21, a stereographed shape of '1' is displayed as a 3D object 2200 on a stereoscopic user interface according to the present invention. In this case, even if a user brings his hand to the 3D object 2200, it is unable to select the corresponding 3D object. Afterwards, referring to FIG. 22B, if the user makes a gesture of clamping the 3D object 2200, the controller 180 is able to recognize the clamping gesture as a selection of the corresponding 3D object 2200. And, a prescribed visual effect can be correspondingly given to the corresponding 3D object.

Figure 22D:
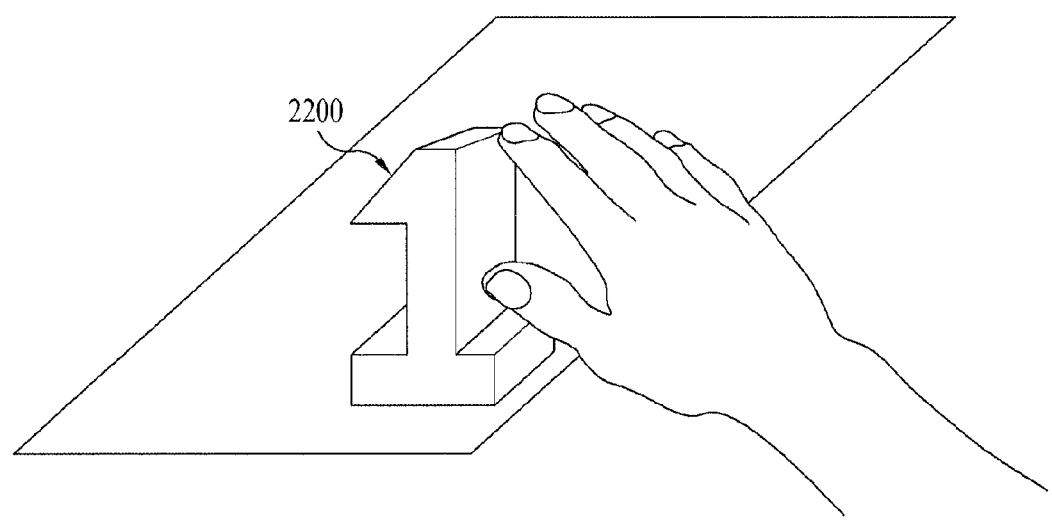

After the corresponding 3D object 2200 has been selected via the clamping gesture, as the user moves his hand by keeping the clamping gesture, the selected object 2200 can move to correspond to a motion of the hand. After completion of the manipulation of the corresponding 3D object, the user is able to release the clamping gesture to release the selected state. If so, the selection is released, as shown in FIG. 22D, to remove the visual effect from the corresponding 3D object 2200.

FIG. 23 is a diagram for a further example of a method of selecting and manipulating a 3D object in a stereoscopic user interface implemented in a mobile terminal according to another embodiment of the present invention.

Figure 23A:
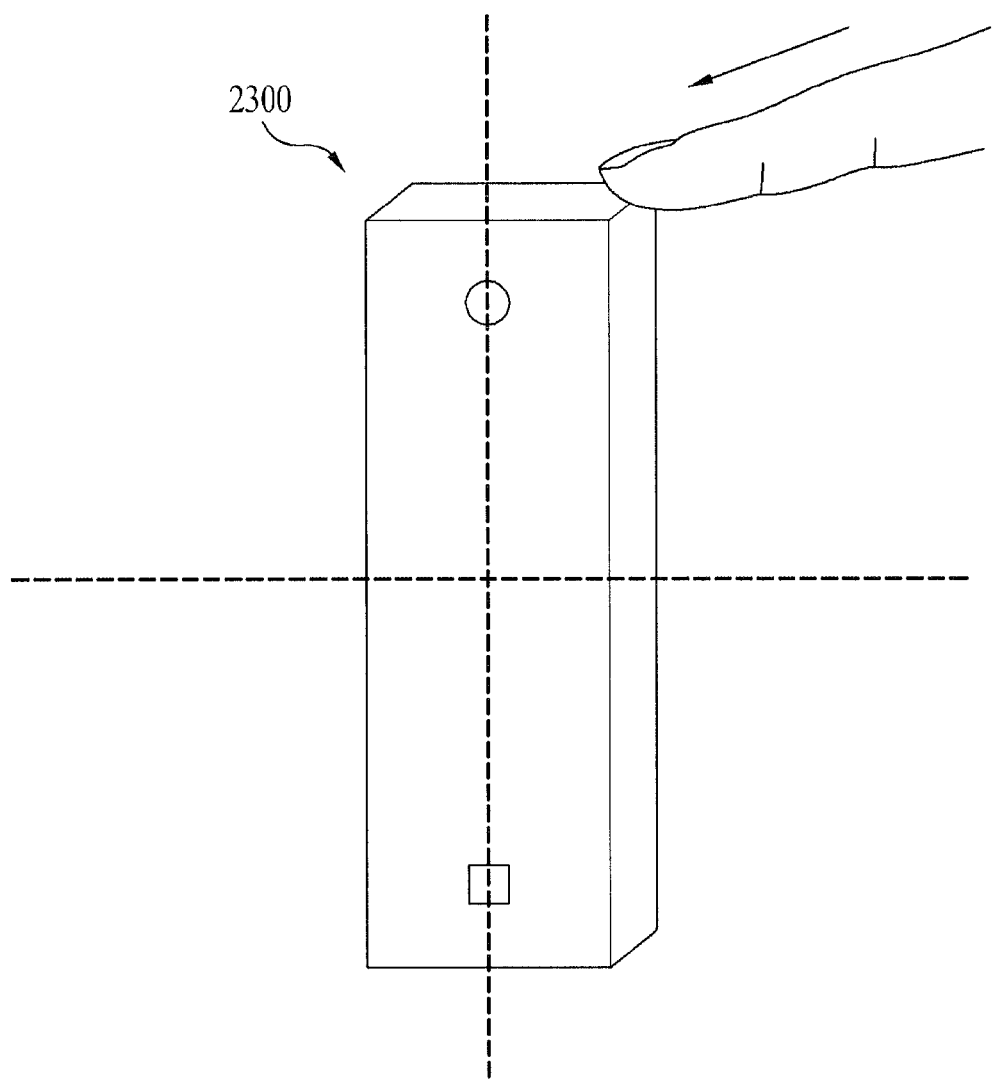
FIG. 23 is a diagram for a further example of a method of selecting and manipulating a 3D object in a stereoscopic user interface implemented in a mobile terminal according to another embodiment of the present invention.
Figure 23B:
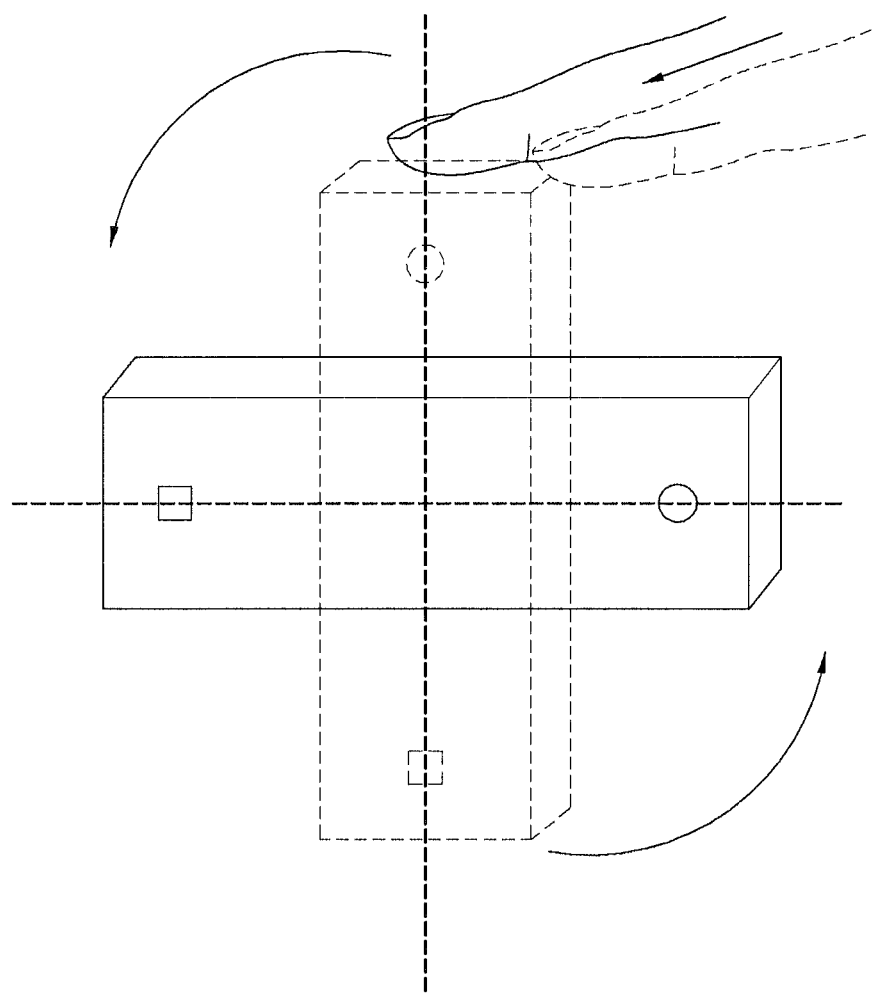

Referring to FIG. 23A, a 3D object 100 in a square pillar shape is displayed via a stereoscopic user interface according to the present invention on the display unit of the mobile terminal. If a user makes a gesture of pushing a let top of the 3D object 1100 using a pointer (e.g., finger), the controller 180 is able to rotate the 3D object 1100 with reference to a center axis 1110 [FIG. 23B]. In doing so, the controller 180 is able to control a degree of the rotation to be determined in accordance with a speed of the push gesture and/or a distance spaced apart from the center axis 1100. For instance, the degree of the rotation increases if a distance between the center axis 110 and the push point increases, and vice versa. For another instance, the degree of the rotation increases more if the speed of the push gesture becomes faster, and vice versa.

If a gesture of flicking a 3D object with a finger tip is made instead of a push gesture (e.g., go-straight of pointer), the controller 180 is able to shift the corresponding 3D object in a direction of the flicking by giving a rotation effect to the corresponding 3D effect.

In the following description, detailed examples for applying the aforesaid object manipulating methods to the mobile terminal are explained.

Figure 24:
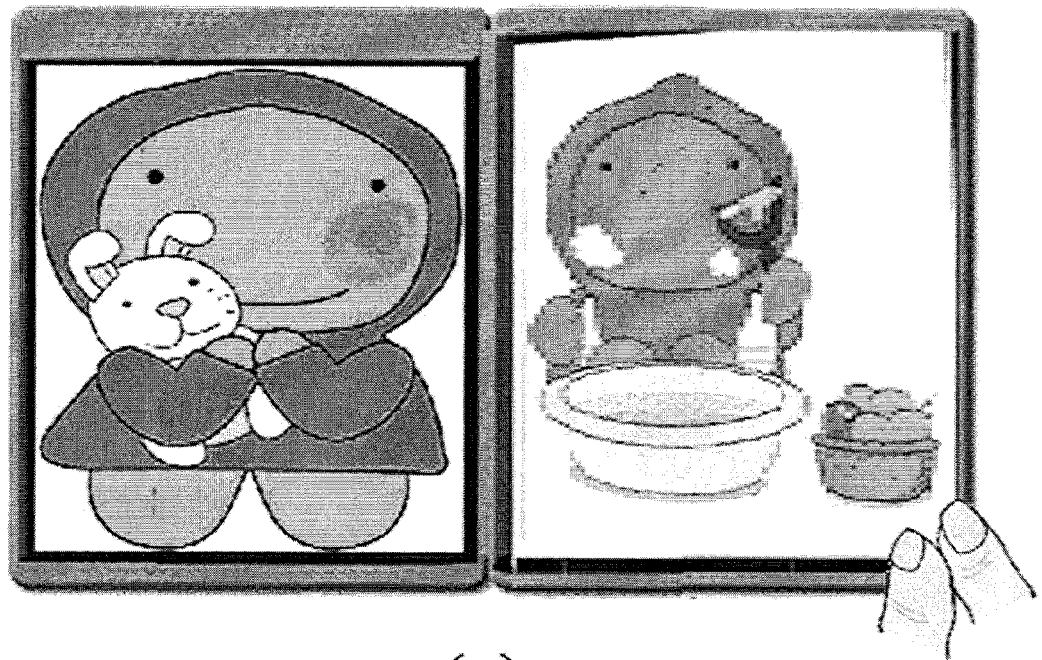
FIG. 24 is a diagram for displaying an e-book viewing screen implemented on a stereoscopic user interface according to another embodiment of the present invention.
Figure 24:
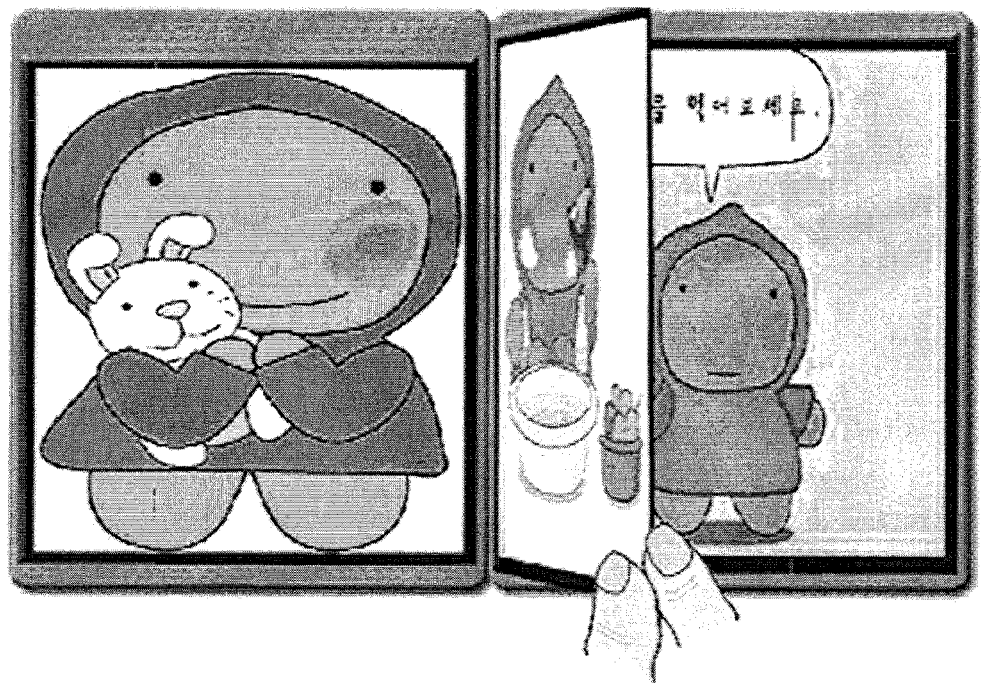

FIG. 24 is a diagram for displaying an e-book viewing screen implemented on a stereoscopic user interface according to another embodiment of the present invention.

Referring to FIG. 24 (*a*), an e-book application is executed via a display unit on which a stereoscopic user interface according to the present invention can be implemented. Afterwards, a user makes a clamping gesture on a right lower end of an e-book to go to a next page. As the user moves his hand to the left by keeping the clamping gesture, a page turning operation can be performed [FIG. 24 (b)].

FIG. 25 is a diagram for displaying a board game implemented on a stereoscopic user interface according to another embodiment of the present invention.

Figure 25A:
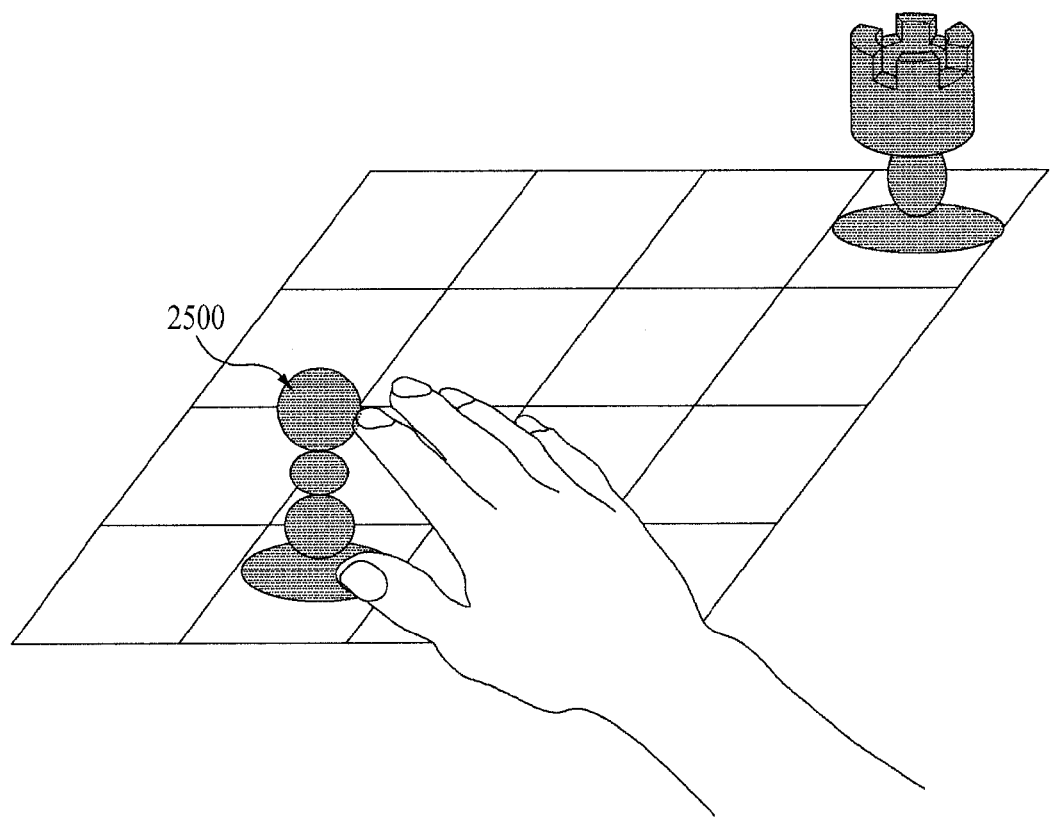
FIG. 25 is a diagram for displaying a board game implemented on a stereoscopic user interface according to another embodiment of the present invention.

Referring to FIG. 25A, a board game is executed via a stereoscopic user interface according to the present invention on the display unit of the mobile terminal. In this case, a game board if displayed on a layer having a prescribed 3D depth. And, horses used for the game can be displayed as 3D objects.

Figure 25B:
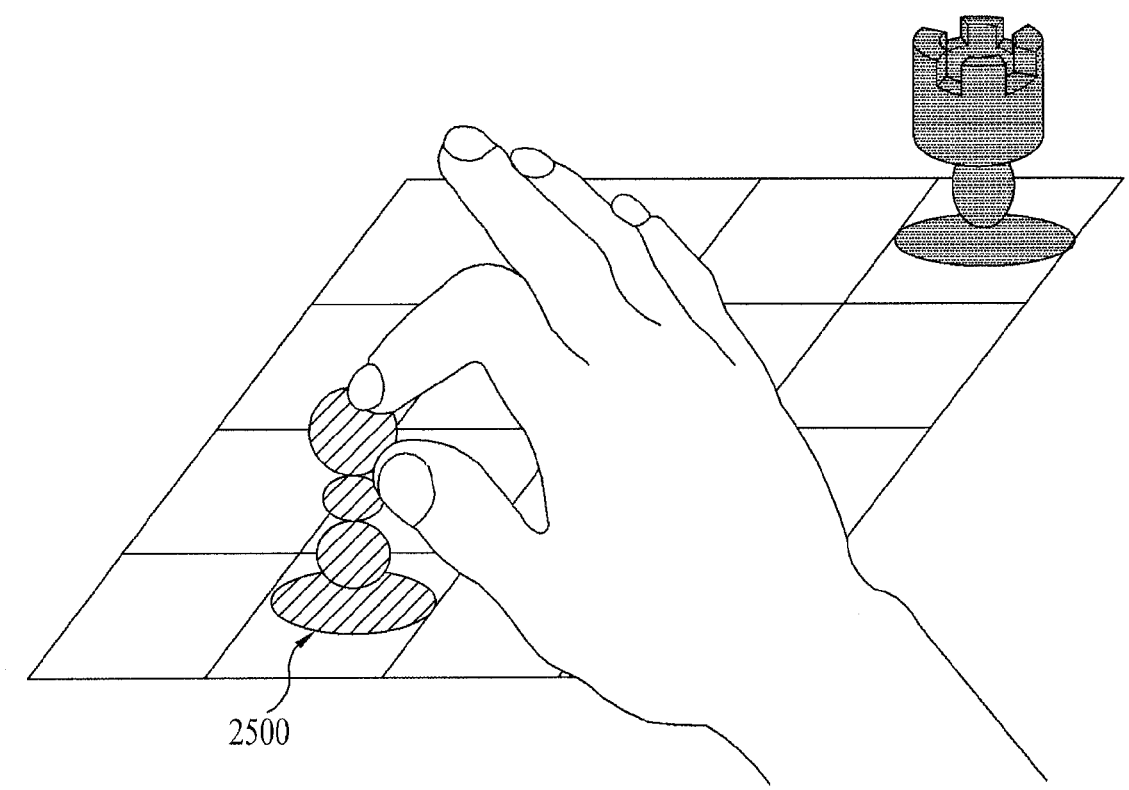
Figure 25C:
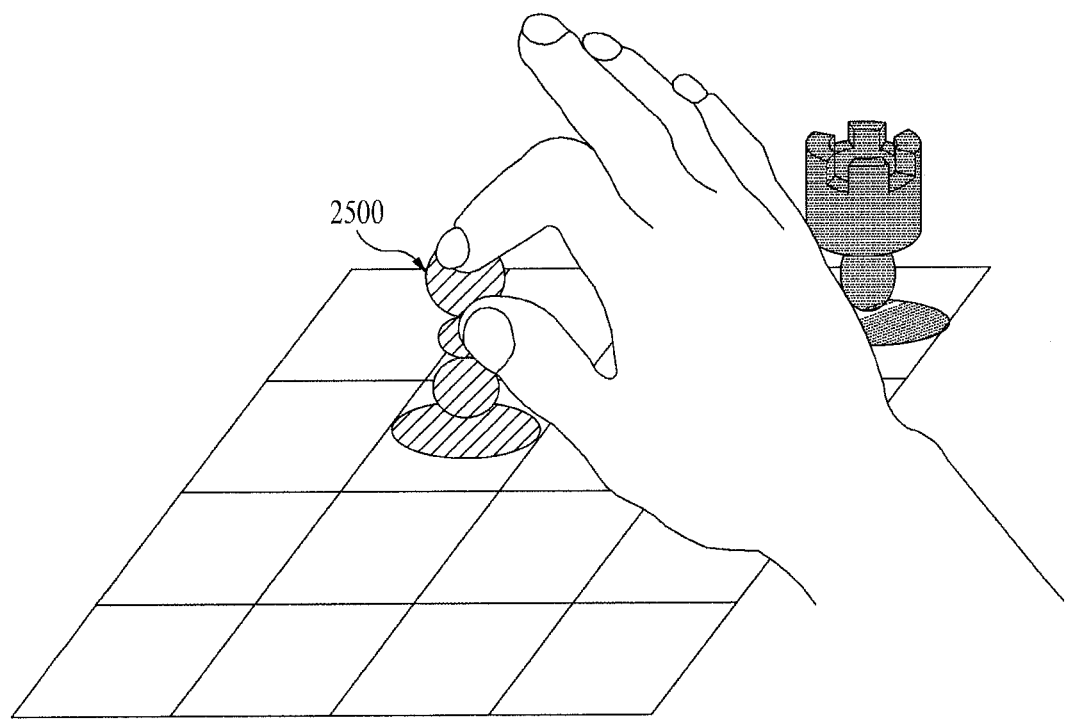
Figure 25D:
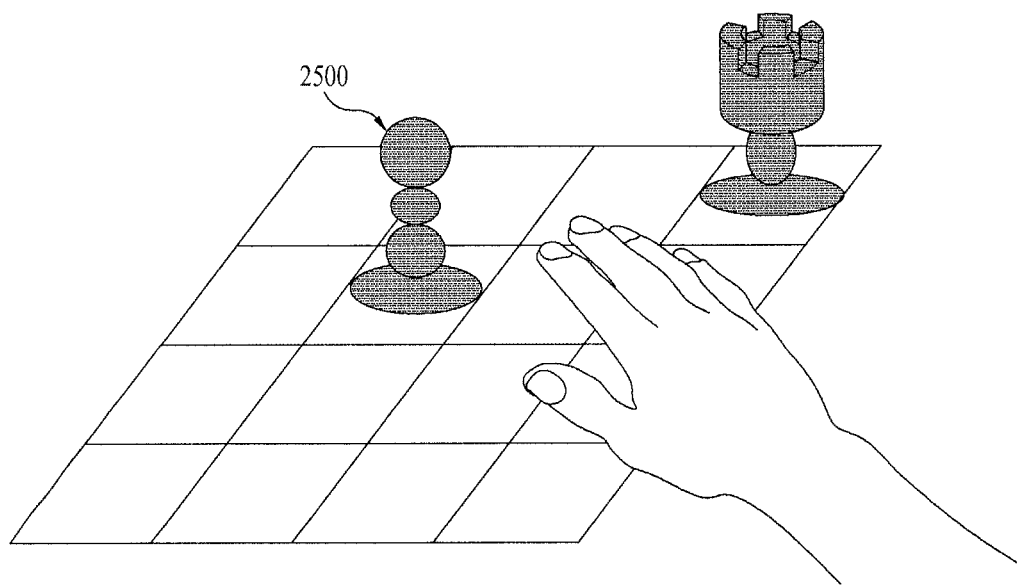

After the user has brought his hand to the horse 2500 to shift the corresponding horse 2500, the user is able to select the corresponding horse 2500 via a clamping gesture [FIG. 25B]. And, a prescribed visual effect can be given to the selected horse to indicate that the corresponding horse is selected. After the user has shifted the horse 2500 to a specific position by moving his hand while keeping the clamping gesture [FIG. 25C], the user is able to release the selected state of the corresponding horse 2500 by releasing the clamping gesture [FIG. 25D].

Of course, in order to manipulate the board game, the method with reference to FIG. 19 is applicable as well. In particular, if a pointer of the user points at a specific horse (i.e., a manipulation target) over a predetermined duration, the specific horse is selected. After the specific horse has been selected, if the pointer keeps staying at the same point over a prescribed duration, the selection can be released.

Figure 26:
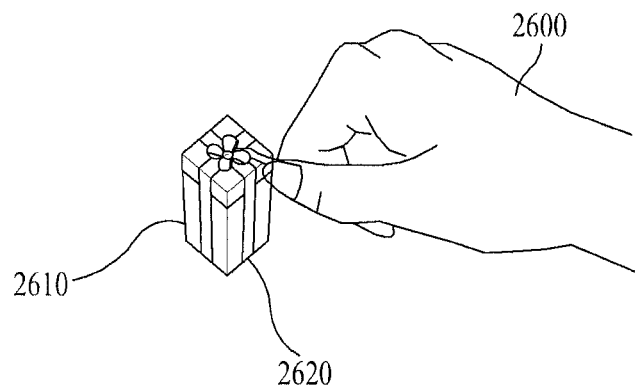
FIG. 26 is a diagram for displaying a gift box function implemented on a stereoscopic user interface according to another embodiment of the present invention.
Figure 26:
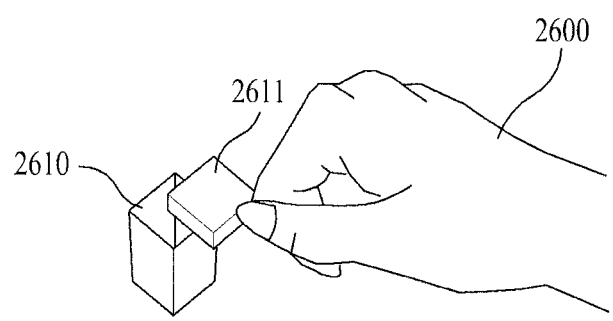
Figure 26:
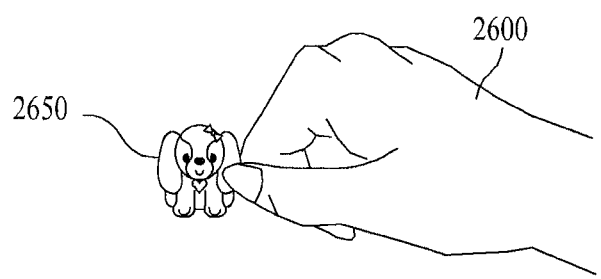

FIG. 26 is a diagram for displaying a gift box function implemented on a stereoscopic user interface according to another embodiment of the present invention.

Referring to FIG. 26A, a gift box function e is executed via a stereoscopic user interface according to the present invention on the display unit of the mobile terminal. In this case, the gift box function is usable in the course of checking one of an email, a text message and the like or in the course of checking a multimedia content (e.g., a background image, an icon package, a gift barcode, etc.) presented on line by another user. As the gift ox function is executed, a gift box 2610 is displayed as a 3D object on the display unit. If a user makes a clamping gesture on a ribbon tying the box 210 with his hand 2600 and then pulls the ribbon 2620, the ribbon 2620 can be removed.

Afterwards, the user makes a clamping gesture on a cover 2611 of the gift box 2610 and then pulls up the cover 2611 to remove [FIG. 26 (b)]. Accordingly, a gift 2650 in a puppy shape can be displayed [FIG. 26 (c)]. Afterwards, the user is able to manipulate the puppy 2650 using one of the aforesaid 3D object manipulating methods.

Third Embodiment

A mobile terminal according to a further embodiment of the present invention is able to provide a stereoscopic user interface using a plurality of layer objects differing from each other in 3D depth in a virtual stereoscopic space.

[First Aspect]

Figure 27:
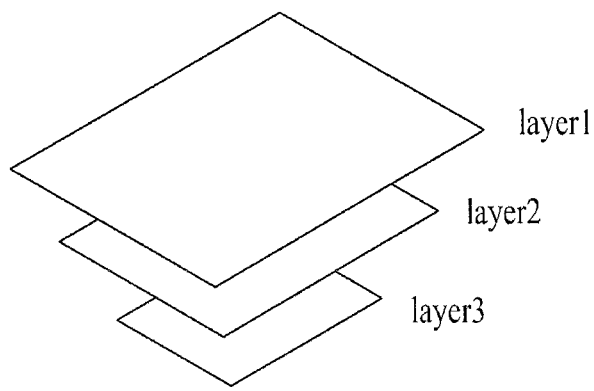
FIG. 27 is a diagram for displaying a stereoscopic user interface implemented in a mobile terminal according to a further embodiment of the present invention.
Figure 27:
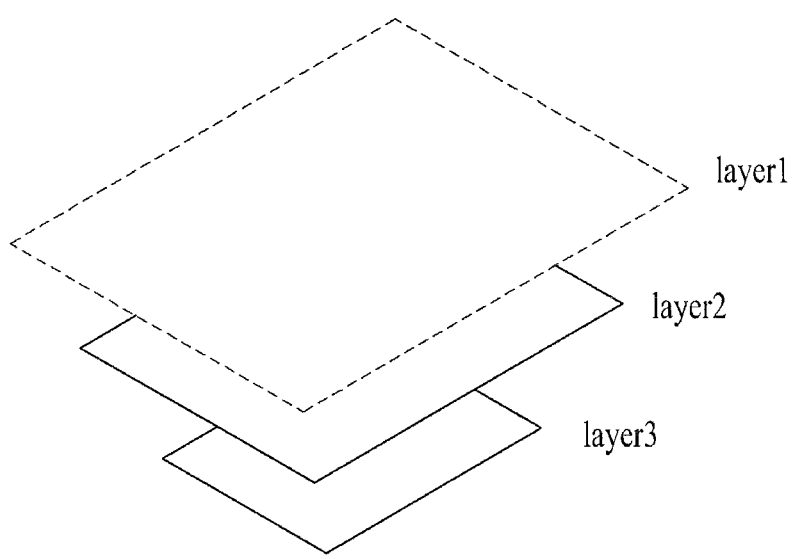

FIG. 27 is a diagram for displaying a stereoscopic user interface implemented in a mobile terminal according to a further embodiment of the present invention.

In the drawings of the following display configuration diagrams including FIG. 27, planar images are shown due to the limited representation of the drawings. Yet, assume stereoscopic images provided to a user according to the aforesaid 3D stereoscopic image implementation schemes.

Referring to FIG. 27 (a), total 3 layer layers including $1^{st}$ layer (layer1) to $3^{rd}$ layer (layer3) are arranged in a stereoscopic space in a manner of being stacked on each other by being spaced apart from each other with a predetermined gap. When the layer objects are implemented into a 3D stereoscopic image via the display unit 151, the $1^{st}$ layer is located at the top in viewpoint of a user and has a shallow 3D depth to be sensed closer by the user. An arrangement depth is gradually lowered toward the $3^{rd}$ layer via the $2^{nd}$ layer. And, the layer is set to have a deeper 3D depth to be sensed farther by the user.

An arrangement position and/or 3D depth of each of the layer objects can be changed according to a prescribed command input via the user input unit. A command input for manipulating the corresponding layer object can be performed using the camera 121 for photographing a position of a pointer, the proximity sensor 140 for recognizing a proximity distance of a pointer, the touchscreen 151 for recognizing a contact touch and a proximity touch distinguishably and the like. A detailed command inputting method using them shall be described later in this disclosure.

For example of changing the 3D depths of the above-described layer objects, a 3D depth change via a scroll manipulation is available.

In particular, assume that a surface of the layer object having the 3D depth corresponding to a position of the $1^{st}$ layer (layer1) is clearly displayed in the arrangement state of the layer objects shown in FIG. 27 (a). And, assume that surfaces of the layer objects (i.e., the $2^{nd}$ and $3^{rd}$ layers) located to the 3D depths deeper than the position of the $1^{st}$ layer are covered by the layer object (i.e., the $1^{st}$ layer) located to the 3D depth shallower than each of the 3D depths of the $2^{nd}$ and $3^{rd}$ layers.

On the above assumptions, 3D depths can be lowered to enable a user to sense that the entire layer objects are located closer to the user in a manner of scrolling the entire layer objects by a prescribed manipulation via the user input unit [FIG. 27 (b)].

If so, the $2^{nd}$ layer has the 3D depth corresponding to the $1^{st}$ layer in FIG. 27 (a). And, the $3^{rd}$ layer has the 3D depth corresponding to the $2^{nd}$ layer in FIG. 27 (a). In this case, like the above assumptions, since the surface of the layer object located to the depth of the $1^{st}$ layer shown in FIG. 27 (a) is clearly displayed only, a surface of the $2^{nd}$ layer is displayed most clearly in FIG. 27 (b). And a surface of the $3^{rd}$ layer is covered with the surface of the $2^{nd}$ layer.

Meanwhile, the $1^{st}$ layer has the 3D depth lower than its position in FIG. 27 (a). In this case, the controller 180 enables the $1^{st}$ layer to become more transparent or semitransparent if the $1^{st}$ layer becomes farther from the 3D depth of the $2^{nd}$ layer.

Through the above mentioned operation of the mobile terminal, a user is able to see the surface of the $2^{nd}$ layer clearly by avoiding the interference of the $1^{st}$ layer. If the user scrolls the entire layer objects to deepen their 3D depths again, the state shown in FIG. 27 (a) can be displayed. If the scroll is performed to further lower the 3D depths of the entire layer objects, both of the $1^{st}$ and $2^{nd}$ layers become transparent or semitransparent to clearly display the surface of the $3^{rd}$ layer.

In the following description, for clarity and convenience, the 3D depth, which enables a surface of a layer object, which is located to a corresponding depth like the 3D depth of the $1^{st}$ layer shown in FIG. 27 (a), to be clearly displayed without being blocked by another clear layer object shall be named 'reference depth'.

In the following description, detailed examples of applying a scroll action of the stereoscopic user interface described with reference to FIG. 27 to a menu manipulation of the mobile terminal are explained with reference to FIGS. 28 to 31.

Figure 28:
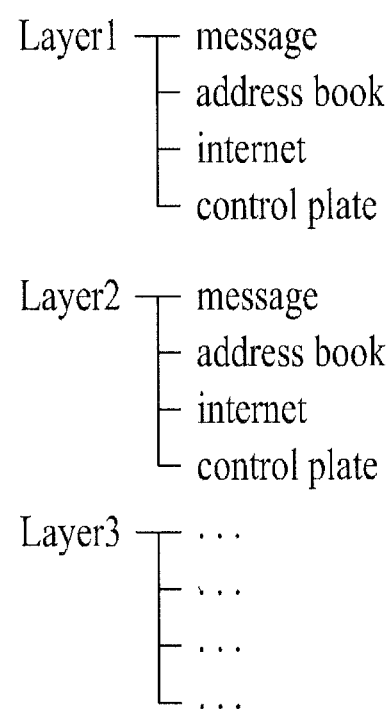
FIG. 28 is a diagram for one example of a menu list classified per layer of a stereoscopic user interface implemented in a mobile terminal according to a further embodiment of the present invention.

FIG. 28 is a diagram for one example of a menu list classified per layer of a stereoscopic user interface implemented in a mobile terminal according to a further embodiment of the present invention.

Referring to FIG. 28, menus in horizontal relation are mapped to a layer 1 and a layer 2, respectively. In particular, the menus mapped to the layer 1 and the menus mapped to the layer 2 are not in the relation of an upper menu versus a lower menu but can be independently selected.

A method of selecting a menu list through a scroll manipulation of a layer in the mapping relation shown in FIG. 28 is explained with reference to FIG. 29 as follows.

Figure 29:
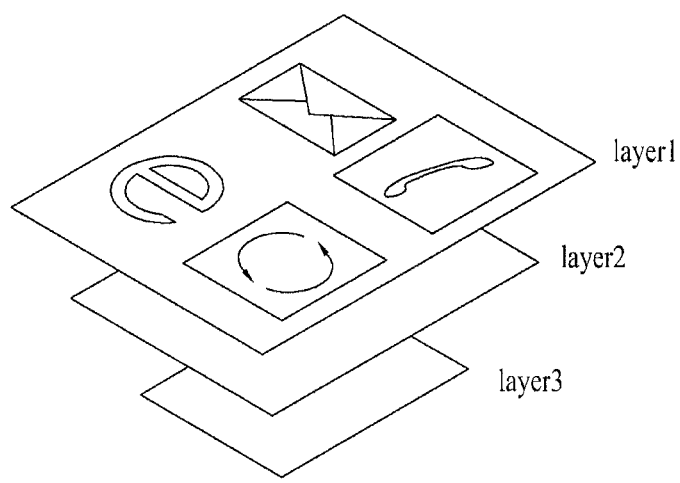
FIG. 29 is a diagram for one example of a menu selection via a stereoscopic user interface implemented in a mobile terminal according to a further embodiment of the present invention.
Figure 29:
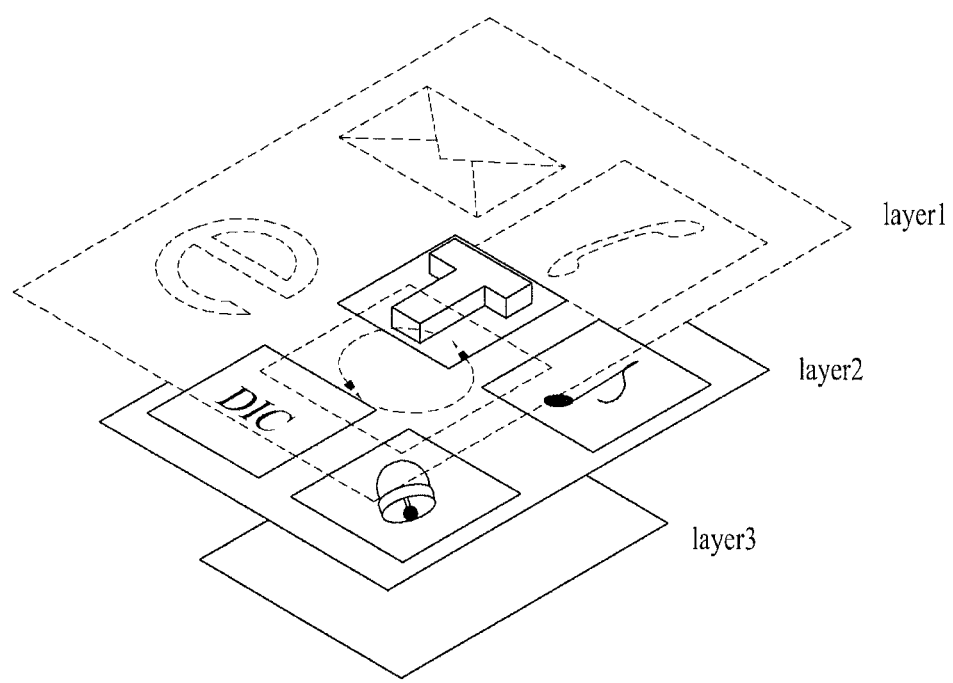

FIG. 29 is a diagram of display concepts for one example of a menu selection via a stereoscopic user interface implemented in a mobile terminal according to a further embodiment of the present invention.

For clarity and convenience, the basic assumption in FIG. 29 is similar to that in FIG. 27 and its redundant description shall be omitted from the following description. Yet, icons corresponding to the menus mapped to each layer, as show in FIG. 28, are displayed on the surface of each layer object.

Referring to FIG. 29 (a), since a layer 1 is located to a reference depth, menu icons (i.e., message, address book, internet, and control plate) mapped to the layer 1 are clearly displayed. Yet, since layers 2 and 3 are blocked by the layer 1, surfaces of the layers 2 and 3 are not visible.

In this case, a user is able to perform a prescribed scroll manipulation to arrange the layer 2 to the reference depth by lowering 3D depths of the entire layer objects.

Accordingly, referring to FIG. 29 (b), the depth of the layer 1 becomes lower than the reference depth, whereby the layer 1 becomes semitransparent. As the layer 2 is located to the reference depth, the menu icons (i.e., game, music play, dictionary and alarm) mapped to the layer 2 can be clearly displayed. Since the surface of the layer 3 is still blocked by the layer 2, it may not be seen.

In the following description, a case of mapping menus in vertical relation to layers is explained.

Figure 30:
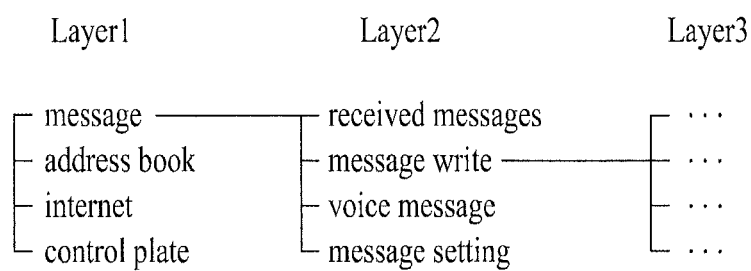
FIG. 30 is a diagram for another example of a menu list classified per layer of a stereoscopic user interface implemented in a mobile terminal according to a further embodiment of the present invention.

FIG. 30 is a diagram for another example of a menu list classified per layer of a stereoscopic user interface implemented in a mobile terminal according to a further embodiment of the present invention.

Referring to FIG. 30, menus in vertical relation are mapped to a layer 1 and menus in hierarchical relation are mapped to a layer 2. In other words, the menus mapped to the layer 1 and the menus mapped to the layer 2 are in the relation of a menu versus a submenu.

A method of selecting a menu list through a scroll manipulation of a layer in the mapping relation shown in FIG. 30 is explained with reference to FIG. 31 as follows.

Figure 31:
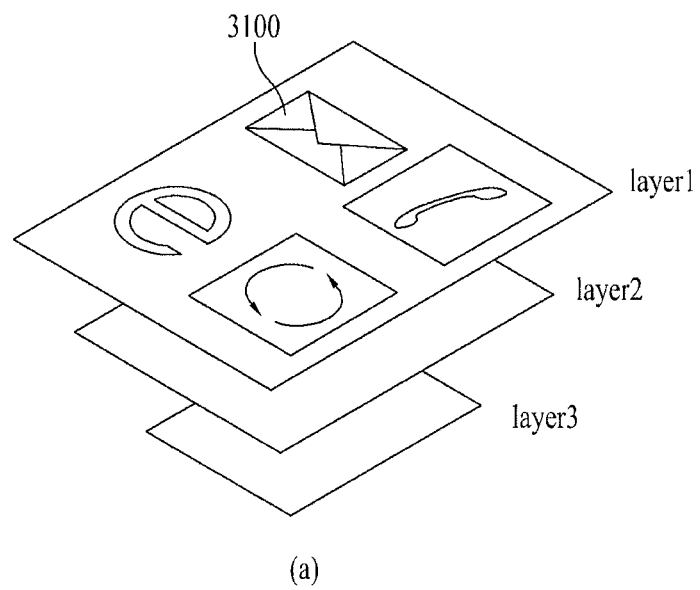
FIG. 31 is a diagram for another example of a menu selection via a stereoscopic user interface implemented in a mobile terminal according to a further embodiment of the present invention.
Figure 31:
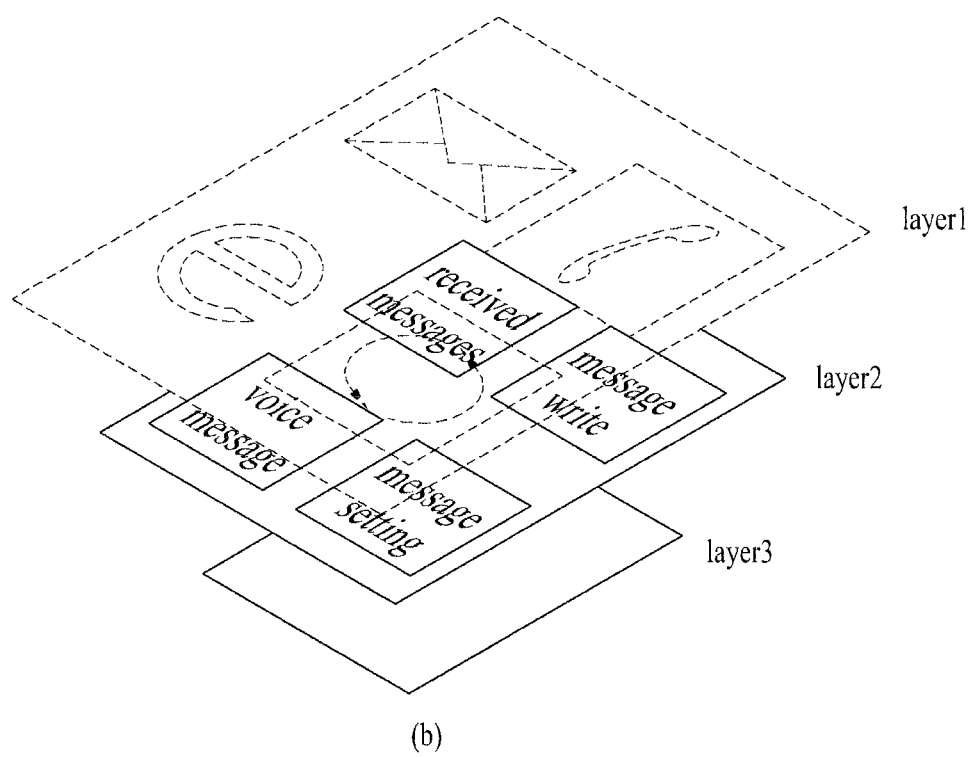

FIG. 31 is a diagram of display concepts for another example of a menu selection via a stereoscopic user interface implemented in a mobile terminal according to a further embodiment of the present invention.

For clarity and convenience, the basic assumption in FIG. 31 is similar to that in FIG. 27 and its redundant description shall be omitted from the following description. Yet, icons corresponding to the menus mapped to each layer, as shown in FIG. 30, are displayed on the surface of each layer object.

Referring to FIG. 31 (a), since a layer 1 is located to a reference depth, menu icons (i.e., message, address book, internet, and control plate) mapped to the layer 1 are clearly displayed. Yet, since layers 2 and 3 are blocked by the layer 1, surfaces of the layers 2 and 3 are not visible.

In this case, while a message icon 3100 is selected via a prescribed command input, a user is able to perform a prescribed scroll manipulation to arrange the layer 2 to the reference depth by lowering 3D depths of the entire layer objects (i.e., to be seen closer to a user).

Accordingly, referring to FIG. 31 (b), the depth of the layer 1 becomes lower than the reference depth, whereby the layer 1 becomes semitransparent. As the layer 2 is located to the reference depth, the menu icons (i.e., received messages, message write, vice message and message setting) corresponding to a submenu of the message menu mapped to the layer 2 can be clearly displayed. Since the surface of the layer 3 is still blocked by the layer 2, it may not be seen. Afterwards, the user selects one of the icons on the layer 2 and is then able to view the submenu of the icon selected from the layer 2 via the layer 3 through another scroll input.

The menu selecting methods described with reference to FIGS. 28 to 31 can be used as a method of selecting or navigating a menu or object in parallel or subordinate relation. For instance, in case of executing a file browser function, an upper folder displayed on an upper layer is selected and a lower folder in the lower layer or file lists included in the upper folder can be searched by scroll.

So far, the above descriptions are made with reference to the configuration that layers are arranged to be overlapped with one another by leaving a predetermined gap in-between, which is just exemplary and by which the present invention is non-limited. Alternatively, the present invention is applicable to various arrangement configurations of layers. This is described with reference to FIG. 32 as follows.

Figure 32:
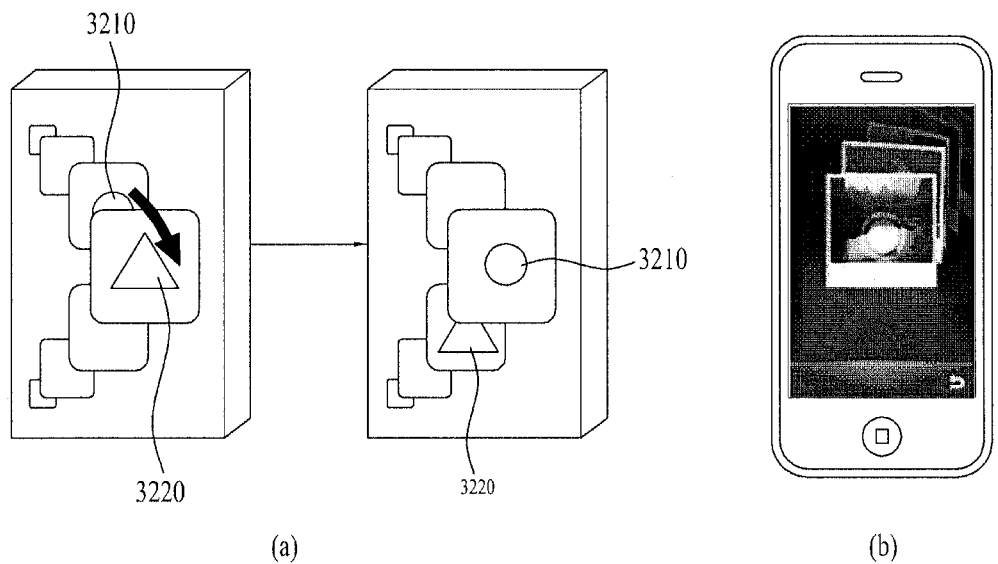
FIG. 32 is a diagram for examples of a layer arrangement formation of a stereoscopic user interface implemented via a display unit of a mobile terminal according to a further embodiment of the present invention.
Figure 32:
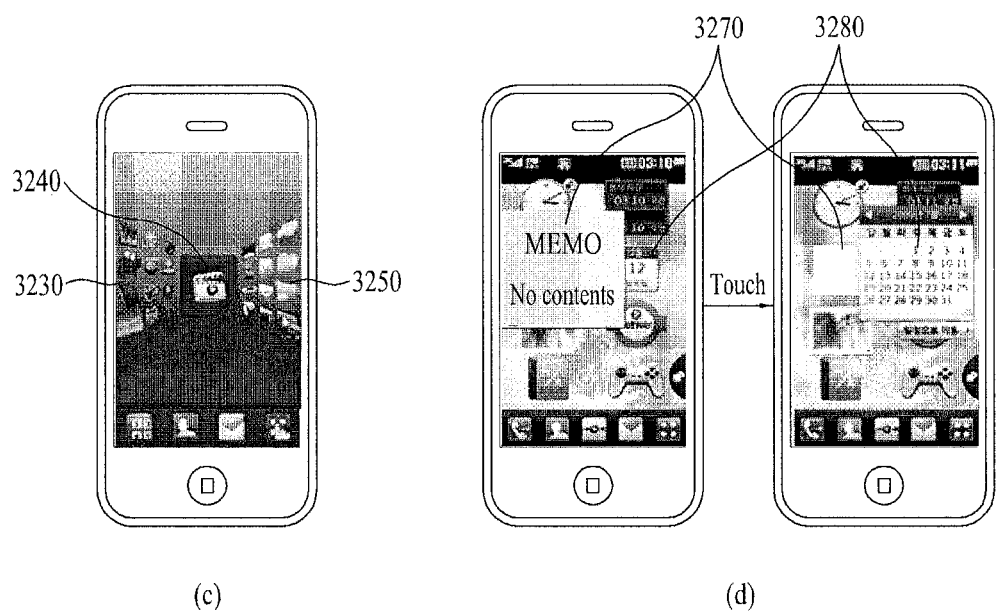

FIG. 32 is a diagram for examples of a layer arrangement formation of a stereoscopic user interface implemented via a display unit of a mobile terminal according to a further embodiment of the present invention.

Referring to FIG. 32 (a), unlike the above described arrangement configurations of the layers, at least two separated layers can be arranged to the same 3D depth. In this case, a reference layer is set to the layer located at the top (i.e., the layer having a lowest 3D depth). If a layer object 3210 having a second lowest 3D depth is shifted to a most upper layer, another layer object 3220 used to be located at the most upper layer can be arranged in a manner of being pushed down to a layer in the below. This layer arrangement configuration is usable to display a shift of menu icons, a rearrangement of menu icons or a stereoscopic display of a photo (or thumbnail of the photo) on a photo album.

Referring to FIG. 32 (b), unlike the above-mentioned layers arranged in parallel by differing in 3D depth only, one layer can be arranged to have at least two 3D depths in a manner of inclining to change its angle.

Referring to FIG. 32 (c), two layers 3230 and 3250 can be arranged to incline next to both lateral sides of a layer 3240 having a deepest 3D depth at the center in a manner of enclosing the layer 3240.

Moreover, in the course of a random display via one layer line a general user interface, a layer having a 3D depth different from that of a previous layer can be additionally displayed in a manner of being popped up according to an occurrence of a click or event. This is described with reference to FIG. 32 (d) as follows. First of all, a memo 3270 among 8 icons arranged on the screen is displayed on a layer having a lower 3D depth to be seen to a user's view by being projected. If the user selects a calendar icon 3280 next to the memo icon 3270, the memo icon 3270 is rearranged to the previous layer and the calendar icon 3280 can be arranged on the popup type layer having a 3D depth lower than that of the previous layer. In doing so, if each icon is displayed by being popped up to the layer having the 3D depth lower than that of the previous layer, it can be zoomed in. Accordingly, the corresponding icon can be changed into a form of displaying information more specific than that located on the previous layer.

[Second Aspect]

In the following description, a method of controlling a stereoscopic user interface using a plurality of layer objects in another aspect according to a further embodiment of the present invention is explained.

Like the above mentioned description with reference to FIG. 29, if 3D depths of the entire layers are changed by a single selection, one example of a method for scrolling layers is described with reference to FIG. 33 as follows.

Figure 33:
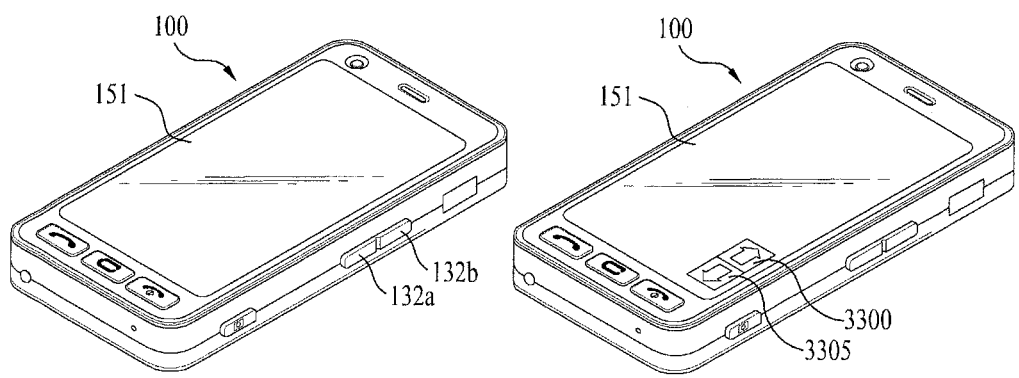
FIG. 33 is a diagram for one example of a method of selecting or scrolling a plurality of layers on a stereoscopic user interface according to a further embodiment of the present invention.
Figure 33:
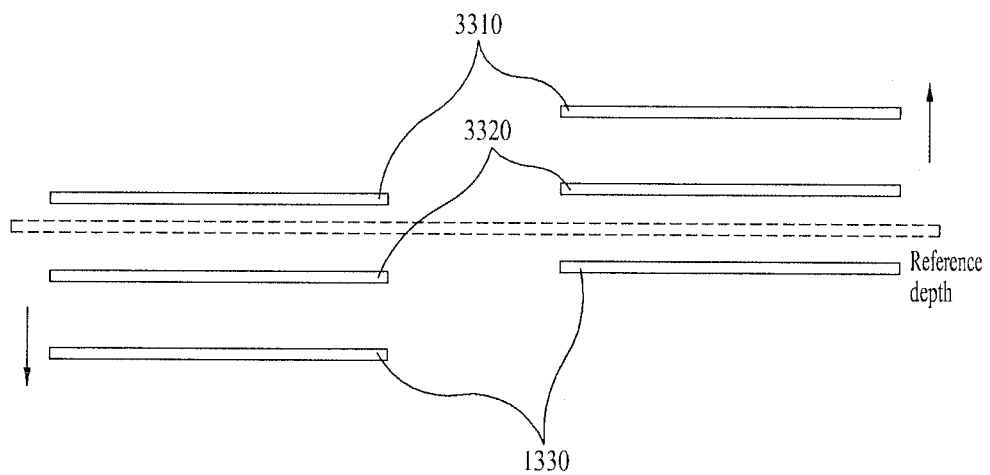

FIG. 33 is a diagram for one example of a method of selecting or scrolling a plurality of layers on a stereoscopic user interface according to a further embodiment of the present invention.

Referring to FIG. 33, the mobile terminal 100 for scrolling a plurality of layers in the configuration of a stereoscopic user interface according to the present invention can includes a pair of hardware key buttons 132a and 132b provided to it one side [FIG. 33 (a)] or a pair of virtual key buttons 3300 and 3305 on the display unit 151 [FIG. 33 (b)].

Referring to FIG. 33 (c), like FIG. 29, assume that 3 layers 3310, 3320 and 3330 differing from each other in 3D depth are arranged by being stacked on each other in parallel. And, assume that the middle layer 3320 is located to a reference depth. If a user manipulates the key button 132a/3305 mapped to a bottom direction, layers can be scrolled in the bottom direction with reference to the reference depth like the left pat shown in FIG. 33 (c). On the contrary, if a user manipulates the key button 132b/3300 mapped to a top direction, layers can be scrolled in the top direction with reference to the reference depth like the right pat shown in FIG. 33 (c).

In doing so, an extent of the scroll is changeable by a prescribed distance unit in proportion to a time for manipulating the corresponding key button or can be changed by an extent corresponding to a single layer gap with a single manipulation 9 i.e., a layer having an order next to that of a current layer located to the reference depth is directly shifted to the reference depth).

Moreover, instead of scrolling the layer, a selected layer (or an activated layer) can be changed through the same manipulation while the arrangement configuration of the layers is maintained. In this case, the selected layer is clearly displayed only, while a transparent or semitransparent effect can be given to the rest of the layers.

Besides, in case of the layer arranged configuration shown in FIG. 32 (a) or FIG. 32 (b), the arrangement can be changed by simply selecting a specific object to arrange at the most upper layer or inputting a touch & drag action in a random direction via the touchscreen.

In the following description, a method of scrolling or selecting a layer using proximity of a pointer is explained with reference to FIG. 34.

Figure 34:
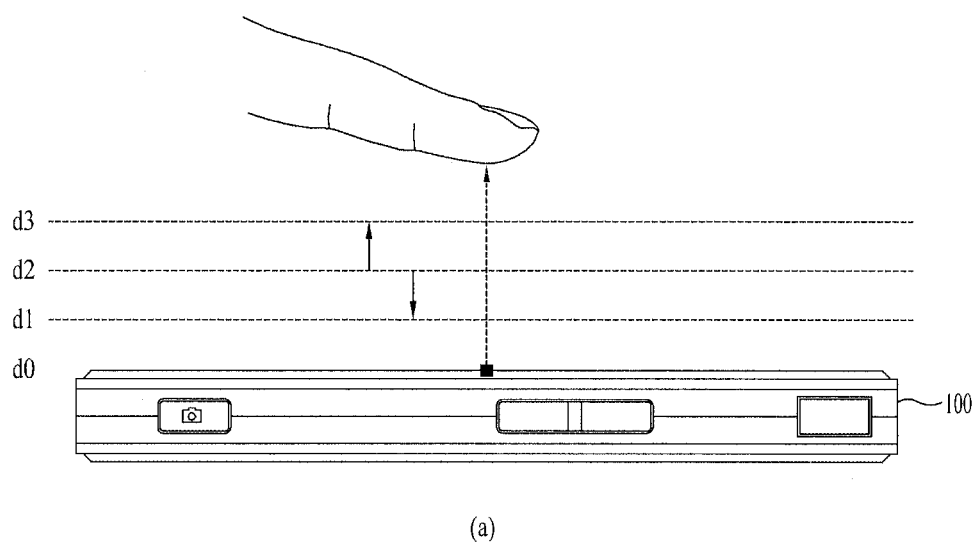
FIG. 34 is a diagram for another example of a method of selecting or scrolling a plurality of layers on a stereoscopic user interface according to a further embodiment of the present invention.
Figure 34:
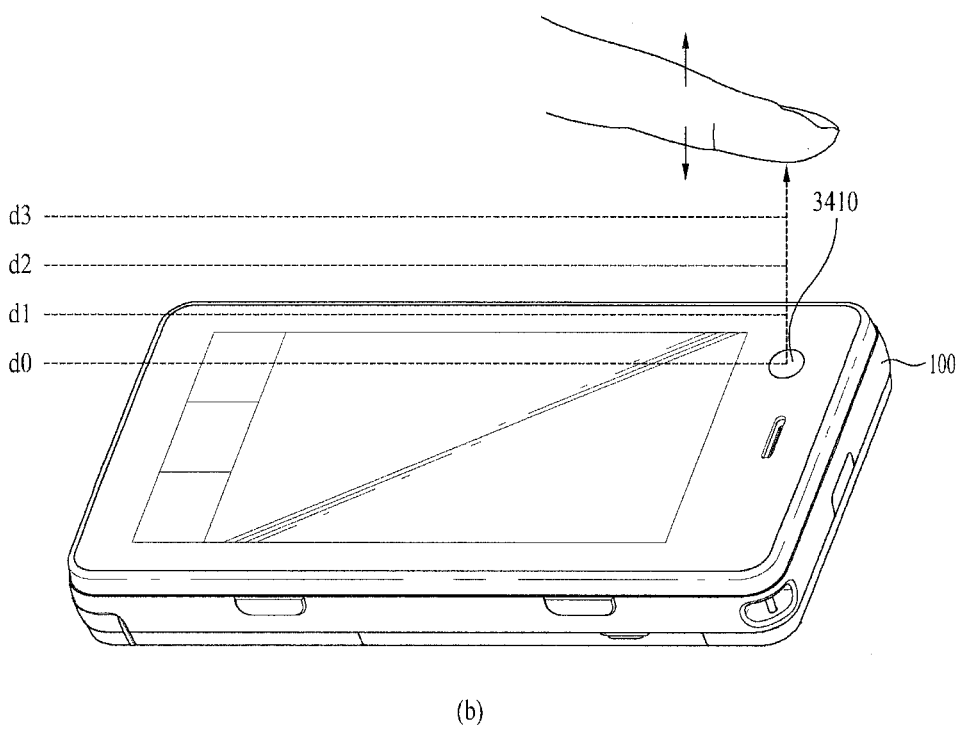

FIG. 34 is a diagram for another example of a method of selecting or scrolling a plurality of layers on a stereoscopic user interface according to a further embodiment of the present invention.

In FIG. 34, assume the layer arrangement configuration (parallel stacked structure) shown in FIG. 9.

Referring to FIG. 34 (a), the mobile terminal 100 can be provided with a touchscreen. In particular, the touchscreen recognizes a user's proximity touch or a user's contact touch by distinguishing them from each other. And, the touchscreen is able to recognize the proximity touch by a plurality of steps (e.g., three steps of d0~d1, d1~d2 and d2~d3) according to a distance of the proximity touch. In this case, a stereoscopic user interface according to the present invention can be manipulated in accordance with a distance between a user's pointer (e.g., finger, stylus pen, etc.) and the touchscreen.

In particular, in case that the pointer is located in the section d2~d3, layers can be scrolled in the top direction (i.e., the direction for lowering the 3D depth) with reference to the reference depth like the user's manipulation of the key button 132b/3300 mapped to the top direction in FIG. 33. In case that the pointer is located in the section d1~d2, layers can be scrolled in the bottom direction with reference to the reference depth like the user's manipulation of the key button 132a/3305 mapped to the bottom direction in FIG. 33. Moreover, in case that the touchscreen is directly touched with the pointer, the controller 180 is able to recognize that a selection command for selecting an icon or menu corresponding to the touch inputted point is inputted.

Referring to FIG. 34 (b), a proximity distance of a pointer can be recognized via a separate detecting device 3410 instead of the touchscreen. In this case, the detecting device 3410 can include one of the proximity sensor 141, the camera 121 and the like.

As mentioned in the foregoing description, in case that a proximity distance of a pointer is recognized as a user's command input, a malfunction may be generated in the course of shifting the pointer to a user-specific proximity depth. Therefore, the command corresponding to a specific distance can be set to be executed only if the pointer keeps staying in the specific distance over prescribed duration.

In the following description, a detailed configuration for applying the above described stereoscopic user interface is explained.

Figure 35:
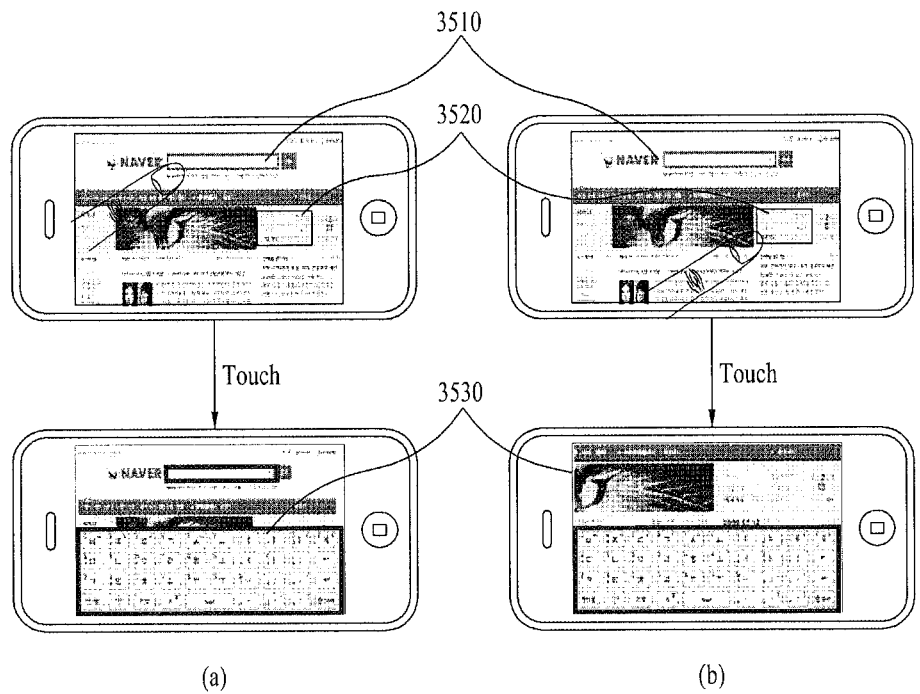
FIG. 35 is a diagram for one example of a popup virtual keypad according to a further embodiment of the present invention.

FIG. 35 is a diagram for one example of a popup virtual keypad according to a further embodiment of the present invention.

Referring to FIG. 35 (a), when a web browser application is executed via the mobile terminal 100, if a text input field 3510 is selected, a virtual keypad 3530 for inputting a text can be displayed. In this case, the selected text input field 3510 and the corresponding virtual keypad 3530 can be displayed in a manner of having a 3D depth lower than that of the rest of the region except the selected text input field 3510 and the corresponding virtual keypad 3530 (i.e., to be seen to a user by being projected).

Referring to FIG. 35 (b), when another text input window 3520 is selected, if a virtual keypad 3530 is displayed, a text input window can be blocked by the virtual keypad 3530. In this case, referring to the lower part of FIG. 35 (b), a webpage can be properly scrolled automatically not to have the text input window 3520 blocked by the virtual keypad. Alternatively, a low 3D depth is given to a region corresponding to a virtual keypad and the virtual keypad is processed semitransparent.

Figure 36:
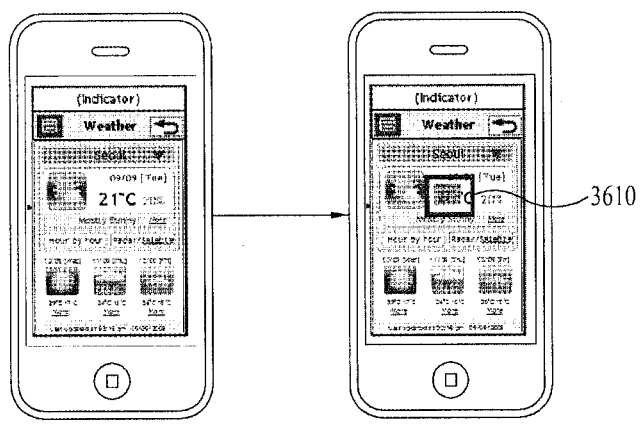
FIG. 36 is a diagram for one example of a method of generating an object differing in 3D depth automatically according to a further embodiment of the present invention if a preset condition is met.

FIG. 36 is a diagram for one example of a method of generating an object differing in 3D depth automatically according to a further embodiment of the present invention if a preset condition is met.

Referring to FIG. 36, assume a case that weather information is displayed on the display unit of the mobile terminal. And, assume a case that the weather information is updated by real time or with prescribed periodicity. In case that temperature information is updated, a 3D depth lower than that of the surrounding is given to the updated information 3610 so that the updated information can be seen to a user by being projected. Thus, the user is facilitated to recognize whether the corresponding information is updated or not. In this case, the weather information is just exemplary. And, the updated information displaying method is applicable to a reception of a new message, an arrival of a preset alarm hour, and the like.

Figure 37:
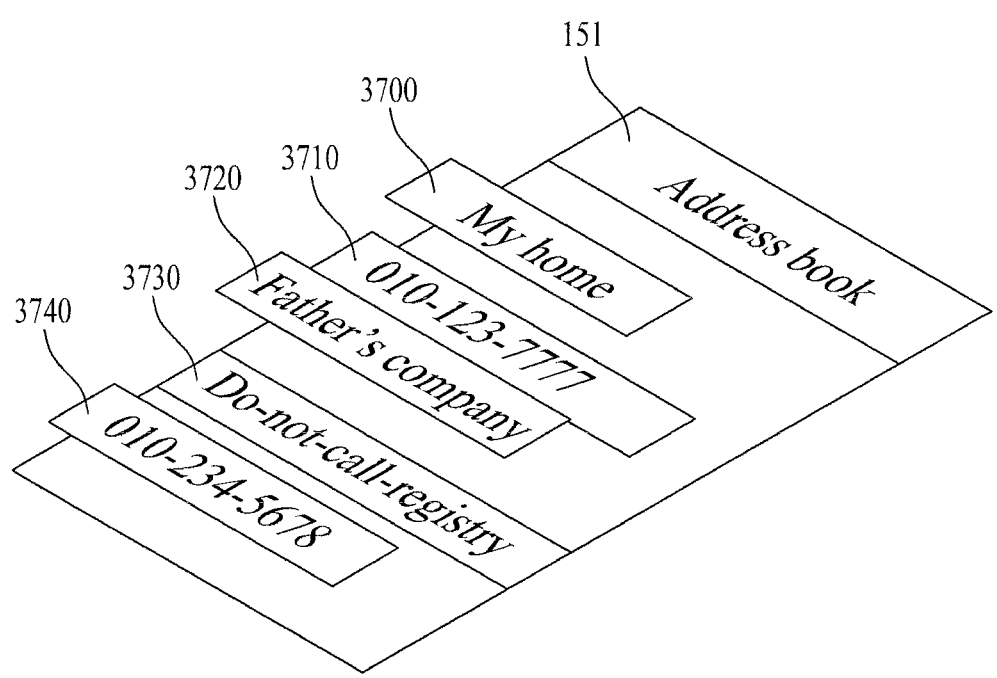
FIG. 37 is a diagram for one example of a method of displaying an object in a different depth per individual priority of the object according to a further embodiment of the present invention.

FIG. 37 is a diagram for one example of a method of displaying an object in a different depth per individual priority of the object according to a further embodiment of the present invention.

Referring to FIG. 37, when a call list of an address book is displayed on the display unit 151 o the mobile terminal 100 according to the present invention, a different 3D depth can be given to each item according to a priority based on a prescribed reference.

In particular, a lowest 3D depth is given to numbers 3700 and 3720 previously stored in the memory 160 of the mobile terminal so that the numbers 3700 and 3720 can be seen in a manner of being most projected. And, an intermediate 3D depth can be given to the non-stored numbers 3710 and 3740. Moreover, a highest 3D depth can be given to a number registered with a do-not-call-registry.

The above mentioned reference for the 3D depth classification is exemplary. Optionally, the reference for the 3D depth classification can be set by a user in various ways according to a recent call order, a group classification or the like.

Preferably, the display unit provided to the aforesaid mobile terminal according to the present invention generates binocular disparity or parallax in both of the horizontal and vertical length directions irrespective of the arranged direction of the terminal body. If the sensing module 140 capable of detecting the arranged direction of the mobile terminal is provided to the corresponding mobile terminal, the controller 180 is able to determine whether the mobile terminal body is currently arranged in the horizontal length or the vertical length. Therefore, as the controller 180 is able to change the parallax generating direction of the parallax generating means of the display unit by 90 degrees, it is preferable that images are newly generated for both eyes, respectively.

According to one embodiment of the present invention, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of controlling a mobile terminal comprising:

displaying, on a display of the mobile terminal, at least one first object on a perceived three-dimensional (3D) space having at least a first layer and a second layer, wherein the first layer is a topmost layer of the 3D space, the third layer is a bottommost layer of the 3D space, and the second layer is between the first layer and the third layer, wherein the first layer has a 3D level of a first depth and the second layer has a 3D level of a second depth, and wherein the at least one first object is arranged on the first layer provided at a reference depth;

receiving a user input for selecting one of the at least one first object at the mobile terminal while displaying the at least one first object on the first layer provided at the reference depth;

automatically arranging at least one second object on the second layer when the 3D level of the second layer changes to the first depth and the second layer is provided at the reference depth;

changing the 3D level of the first layer from the first depth to the third depth by changing a visual characteristic of the first layer, wherein the visual characteristic is a translucency of an object displayed on the first layer; and displaying the at least one second object on the second level of the display, as the 3D level of the first layer changes from the first depth to the third depth, automatically varying a translucency of the at least one second object on the second layer as the second layer is provided at the reference depth, wherein the first layer becomes translucent as the first layer is removed from the reference depth and is provided at another depth such that the at least one second object on the second layer provided at the reference depth can be seen through the first layer, and wherein each of the at least one second object corresponds to a sub-menu of a menu corresponding to the selected one of the at least one first object, wherein the first layer and the second layer are planar layers, and the first layer and the second layer are parallel to each other, wherein the first depth is perceived to be seen closer to a user than the second depth, and the second depth is perceived to be seen closer to the user than the third depth, and wherein the display displays the perceived 3D space in a stereoscopic manner.

2. The method of claim 1, wherein the user input for selecting one of the at least one first object includes a clamping gesture.

3. The method of claim 1, further comprising changing the 3D level of the first layer from the first depth to the third depth, when the 3D level of the second layer changes to the first depth and the second layer is provided at the reference depth.

4. The method of claim 1, wherein the user input for selecting one of the at least one first object is determined by a proximity sensor of the mobile terminal.

5. The method of claim 1, wherein the user input for selecting one of the at least one first object is determined by a touchscreen of the mobile terminal.

6. The method of claim 1, wherein the second layer is invisible while the 3D level of the first layer corresponds to the first depth and the first level is provided at the reference depth.

7. A mobile terminal, comprising:
- a display to display at least one first object on a perceived three-dimensional (3D) space having at least a first layer and a second layer, wherein the 3D space includes the first layer as a topmost layer of the 3D space, the third layer as a bottommost layer of the 3D space and the second layer is between the first layer and the third layer, wherein the first layer has a 3D level of a first depth and the second layer has a 3D level of a second depth, and wherein the at least one first object is arranged on the first layer provided at a reference depth;
- an input device to receive a user input for selecting one of the at least one first object while the display displays the at least one first object; and
- a controller to automatically arrange at least one second object on the second layer when the 3D level of the second layer changes from the third depth to the first depth and the second layer is provided at the reference depth, the controller to change the 3D level of the first layer from the first depth to the third depth by changing a visual characteristic of the first layer, wherein the visual characteristic is a translucency of an object displayed on the first layer, and
- the controller to display the at least one second object on the second level of the display as the 3D level of the first layer changes from the first depth to the third depth, the controller to automatically vary a translucency of the at least one second object on the second layer as the second layer is provided at the reference depth, wherein the first layer becomes translucent as the first layer is removed from the reference depth and is provided at another depth such that the at least one second object on the second layer provided at the reference depth can be seen through the first layer,
- wherein each of the at least one second object corresponds to a sub-menu of a menu corresponding to the selected one of the at least one first object,
- wherein the first layer and the second layer are planar layers and are parallel to each other,
- wherein the first depth is perceived to be seen closer to a user than the second depth, and the second depth is perceived to be seen closer to the user than the third depth, and
- wherein the display displays the perceived 3D space in a stereoscopic manner.

8. The mobile terminal of claim 7, wherein the user input for selecting one of the at least one first object includes a clamping gesture.

9. The mobile terminal of claim 7, wherein the controller changes the 3D level of the first layer from the first depth to the third depth, when the 3D level of the second layer changes to the first depth and the second layer is provided at the reference depth.

10. The mobile terminal of claim 7, wherein the input device includes a proximity sensor, and the controller determines the user input for selecting one of the at least one first object based on the proximity sensor.

11. The mobile terminal of claim 7, wherein the input device includes a touch screen, and the controller determines the user input for selecting one of the at least one first object based on the user input at the touch screen.

12. The mobile terminal of claim 7, wherein the second layer is invisible while the 3D level of the first layer corresponds to the first depth and the first level is provided at the reference depth.

* * * * *